US009138652B1

(12) United States Patent
Thompson et al.

(10) Patent No.: US 9,138,652 B1
(45) Date of Patent: Sep. 22, 2015

(54) FANTASY SPORTS INTEGRATION WITH VIDEO CONTENT

(71) Applicants: David S. Thompson, Spokane, WA (US); David A. Divine, Spokane, WA (US)

(72) Inventors: David S. Thompson, Spokane, WA (US); David A. Divine, Spokane, WA (US)

(*) Notice: Subject to any disclaimer, the term of this patent is extended or adjusted under 35 U.S.C. 154(b) by 0 days.

(21) Appl. No.: 14/550,906

(22) Filed: Nov. 21, 2014

Related U.S. Application Data

(63) Continuation-in-part of application No. 14/285,607, filed on May 22, 2014, now Pat. No. 9,056,253.

(60) Provisional application No. 61/862,089, filed on Aug. 5, 2013, provisional application No. 61/826,485, filed on May 22, 2013.

(51) Int. Cl.
*G06F 19/00* (2011.01)
*A63F 13/828* (2014.01)

(52) U.S. Cl.
CPC .................. *A63F 13/828* (2014.09)

(58) Field of Classification Search
USPC ....................... 700/90–94; 725/135
See application file for complete search history.

(56) References Cited

U.S. PATENT DOCUMENTS

| 7,827,207 | B2* | 11/2010 | Takatsuka et al. ............ 707/802 |
| 8,888,584 | B2* | 11/2014 | Cohen ............................. 463/25 |
| 8,934,758 | B2* | 1/2015 | Meijer ........................... 386/249 |
| 2002/0166123 | A1* | 11/2002 | Schrader et al. ................ 725/58 |
| 2005/0076362 | A1 | 4/2005 | Dukes et al. |
| 2007/0113250 | A1 | 5/2007 | Logan et al. |
| 2008/0201289 | A1 | 8/2008 | Loponen et al. |
| 2010/0211465 | A1 | 8/2010 | Hughes et al. |
| 2013/0290110 | A1 | 10/2013 | LuVogt et al. |
| 2013/0290339 | A1 | 10/2013 | LuVogt et al. |
| 2013/0290905 | A1 | 10/2013 | LuVogt et al. |

OTHER PUBLICATIONS

International Search Report for PCT Application No. PCT/US2014/039253, mailed Oct. 16, 2014, 7 pages.
U.S. Appl. No. 14/285,607, filed May 22, 2014, entitled "Fantasy Sports Interleaver," 163 pages.
Office Action dated Feb. 23, 2015, from U.S. Appl. No. 14/285,607, filed May 22, 2014, entitled "Fantasy Sports Interleaver," 10 pages.

* cited by examiner

*Primary Examiner* — Ronald Laneau

(57) ABSTRACT

Fantasy sports information may be integrated with video content of games or sporting events. An example technique includes determining one or more athletes on a roster of a fantasy sports team of a user, receiving video content of a game or sporting event, and identifying at least one athlete of interest that is on the roster of the fantasy sports team of the user depicted in the video content of the game or sporting event. The video content may then be displayed along with a visual indicator associated with the at least one athlete of interest to indicate that the athlete of interest is on the roster of the fantasy sports team of the user. The visual indicator may be selectable to control playback of the video content and/or to display a fantasy roster of the user.

21 Claims, 32 Drawing Sheets

FANTASY SPORTS INTEGRATION WITH VIDEO CONTENT

RELATED APPLICATIONS

This application is a continuation-in-part of U.S. patent application Ser. No. 14/285,607, filed May 22, 2014, titled "Fantasy Sports Interleaver," which claims priority to U.S. Provisional Patent Application No. 61/862,089, titled "Fantasy Sports Interleaver," filed on Aug. 5, 2013, and to U.S. Provisional Patent Application No. 61/826,485, titled "Fantasy Sports Interleaver," filed on May 22, 2013, all of which are incorporated herein by reference.

BACKGROUND

Fantasy sports have become increasingly popular. This is particularly true of fantasy football (based on the National Football League (NFL)), but is also true of other sports. When creating fantasy teams, participants today typically go to a fantasy sports website or application, create an account, and then specify a league that they wish to join, frequently organized by their friends. Depending on the sport, there may be an opportunity for participants to select or draft athletes at the beginning of a fantasy season. Thereafter, participants may select the athletes from their roster that they want to play on a given day/week, while benching other athletes. As actual games are being played in different cities and times across the country or world, fantasy sports participants watch their scores fluctuate relative to an opponent as their athletes do well or poorly in their actual games. Fantasy sports participants may also watch one or more of the actual games, often flipping back and forth between various actual games in which the athletes on their fantasy teams are participating. In fantasy football, the week may conclude with Monday Night Football, after which the winners and losers of that week's play are known.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts and examples, and not to indicate required and/or necessary elements.

DETAILED DESCRIPTION

Overview

Figure 1:
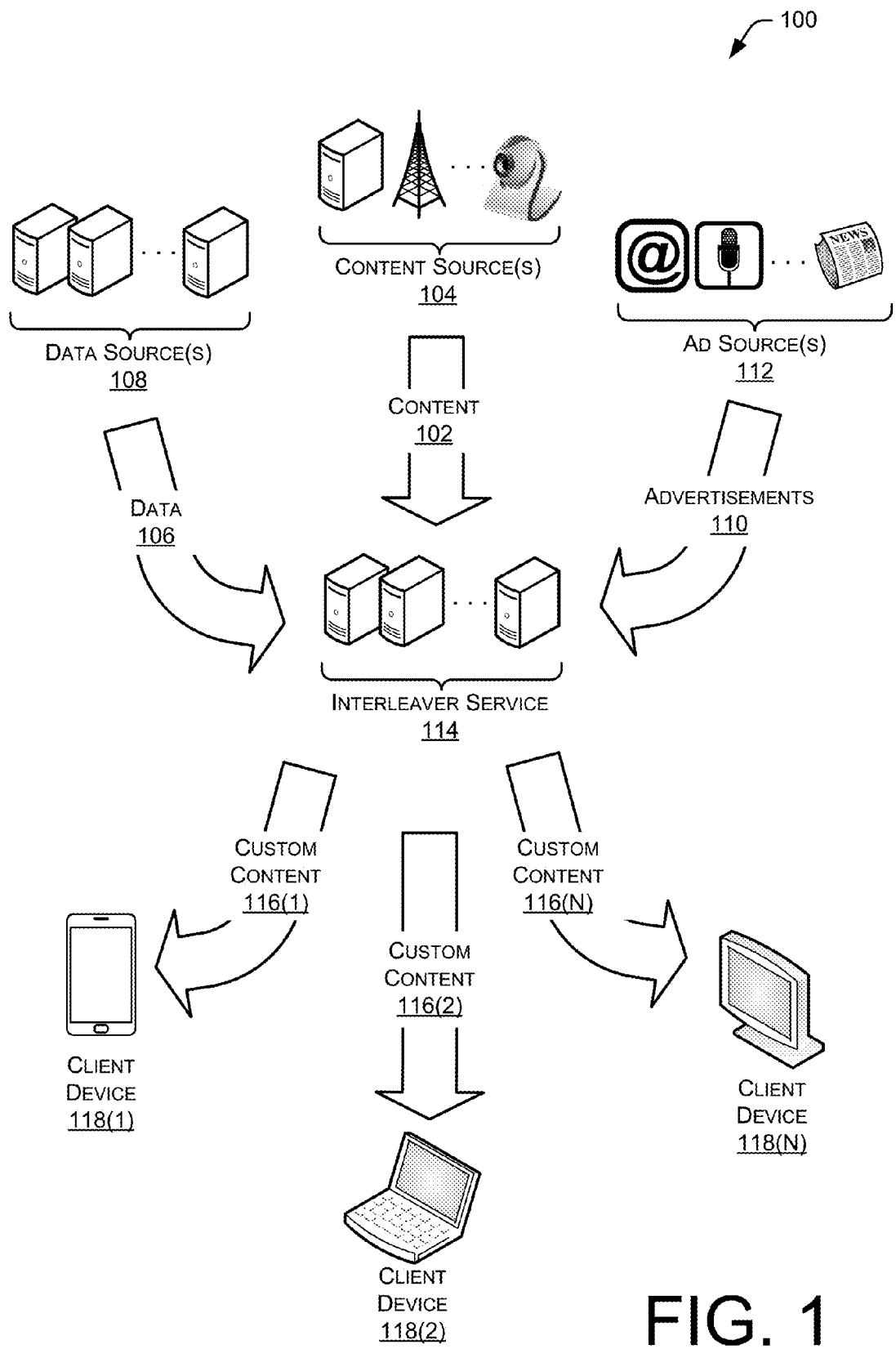
FIG. 1 is a schematic diagram of an example of an architecture usable to provide users with customized streams of content. In the example architecture, an interleaver service receives content from one or more content sources, data from one or more data sources, and advertisements from one or more ad sources, and outputs customized content streams to client devices of each user.

As discussed above, existing fantasy sports outlets (e.g., websites and/or applications) offer very limited ways in which participants can participate in and consume the fantasy sports experience. This application describes techniques and systems for providing a complete fantasy sports experience.

In one aspect, the application describes a content-rich fantasy sports experience in which users are able to consume content (e.g., video, audio, images, articles, etc.) associated with the athletes, teams, and leagues associated with their fantasy teams. For instance, a user may be presented with a stream of video clips or segments associated with the user's fantasy sports team(s). The stream of video segments may be composed of segments showing plays or other events that resulted in points for the user's fantasy team, points for an opposing fantasy team, points for one or more other participants in the user's fantasy league, or otherwise affected a fantasy score of one or more athletes or teams. The stream of video segments may additionally or alternatively include segments corresponding to athletes, teams, leagues, sports cheerleaders, or other topics of interest to the user. The topics of interest may have been explicitly designated by the user and/or may have been implicitly inferred based on one or more criteria. In some examples, the video segments may be augmented by statistics, commentary (e.g., by analysts or other users), images, graphics, articles, or the like that are made available to the user (e.g., via links in the video segments, overlays on the video segments, etc.). In some examples, the stream of video segments may be continuously updated and served, such that there is always a content stream available for the user to consume. The particular segments and the order of their presentation may be unique for each user.

The application also describes various other features that enhance the functionality, ease of use, customizability, interactivity, and numerous other aspects of the complete fantasy sports experience. Fantasy sports users already have a relatively high level of engagement with the existing limited fantasy sports offerings, spending a considerable amount of time and energy researching athletes, managing their fantasy teams, and viewing score updates. However, existing fantasy sports offerings fail to integrate video with user's fantasy sports teams. Rather, existing offerings provide a primarily text based interface for viewing fantasy sports scores and information. The techniques described herein provide numerous enhancements that, in some examples, provide fantasy sports scores along with clips and other rich content tailored to the user's fantasy sports team(s) and other interests. For instance, in some examples, a user's fantasy sports points may be provided in association with one or more clips depicting plays or other events that resulted in awarding of the fantasy sports points to the user. Moreover, in some examples, the techniques described herein may provide users with content customized to them based on things that interest them, such as athletes and other topics related to their fantasy sports teams. The custom content may comprise content from multiple different sources, and may include segments from simultaneously occurring and/or overlapping content. As such, techniques described herein may provide users with a more efficient way of viewing content of interest to them. Additionally, the techniques described herein may allow users to watch clips from multiple different sources and regions via one point of access. These enhancements have the potential to greatly increase the enjoyment of users and their fantasy sports experience.

Also, while many of the examples are described in the context of providing a complete fantasy sports experience, many of the aspects described herein are not limited to the fantasy sports context and have other applicability. For example, while the stream of video segments is described as being related in some way to the user's participation in fantasy sports, in other examples, the stream of video segments may additionally or alternatively include segments that relate to other activities with which the user is associated or interested. For instance, some or all of the stream of video segments may relate to a video game that the user plays, a club or organization that the user belongs to, a movie or television show that the user likes, contacts and social acquaintances of the user, etc. As other examples, the application describes interleaving of commercials or advertisements into the fantasy sports content stream. However, the techniques described herein relating to commercials or advertisements are also applicable to other contexts and are not limited to use with the fantasy sports content stream.

These and numerous other examples are described in detail below with reference to the accompanying figures.

Example System and Techniques

FIG. 1 is a schematic diagram of an example architecture configured to provide users with customized streams of content. The example architecture 100 may be used to generate and serve custom content to one or more subscribers. In the example architecture 100, content 102 from one or more content sources 104, data 106 from one or more data sources 108, and/or advertisements 110 from one or more ad sources 112 are input to an interleaver service 114. The interleaver service 114 processes the received content 102, data 106, and ads 110, and assembles customized content 116(1), 116(2), ... 116(N) (collectively "customized content 116") for each of a plurality of subscribers or users. The interleaver service 114 then causes the customized content 116(1), 116 (2), ... 116(N) to be served to client devices 118(1), 118(2), ... 118(N) (collectively "client devices 118") associated with the plurality of subscribers. In this example, N represents the number of subscribes to which the interleaver service 114 serves custom content and may be any positive integer.

In the illustrated example, the interleaver service 114 communicates with the content sources 104, data sources 108, ad sources 112, and client devices 118 over one or more wireless or wired networks, or a combination thereof. By way of example and not limitation, the networks may comprise over-the-air broadcast networks (e.g., broadcast radio and television), cable networks (e.g., cable television and/or internet networks), telephone networks (e.g., wired and cellular), satellite networks (e.g., satellite television networks), local area networks (e.g., Ethernet, wifi, etc.), fiber optic networks, or any other network capable of transmitting the content 102, data 106, ads 110, and/or custom content 116. The network(s) may be a collection of individual networks interconnected with each other and functioning as a single large network (e.g., the Internet or an intranet). Further, the individual networks may be wireless or wired networks, or a combination thereof. In some instances (e.g., receipt of certain content feeds) the communication may be one-way, while in other instances communication between the interleaver service 114 and the content sources 104, data sources 108, ad sources 112, and/or client devices 118 may be two-way.

In the context of fantasy sports, the content 102 may comprise audio and/or video ("A/V") feeds of televised sporting events, such as football games, baseball games, basketball games, auto races, soccer matches, hockey games, or the like. The content 102 may be live or delayed, and may be obtained from a plurality of games or other events, which are being played simultaneously. The content 102 may include actual game play, instant replays, sideline interviews, discussion by commentators or hosts, and other information. The data 106 may include, fantasy sports information, such as fantasy leagues in which a user participates, rosters of athletes on the user's fantasy team, or the like. The advertisements 110 may comprise advertisements included in the televised sporting events by a national or regional broadcaster of the sporting events, advertisements from an ad agency or marketing firm, internet advertisements, or the like. The interleaver service 114 receives the content 102, data 106, and advertisements 110 as inputs, processes this information as described in detail below, and outputs customized content 116 as clips or streams of clips of the sporting events to each of the client devices 118.

While the interleaver service 114, content sources 104, data sources 108, and ad sources 112 are shown as separate entities disposed at separate locations, in other embodiments, any or all of these components may be combined or integrated in whole or in part. For example, the interleaver service 114 may include an integral content source (e.g., source of original content), data source (e.g., fantasy sports platform), and/or ad source (e.g., ads for the interleaver service or a related business). In other examples, a single source may provide content, data, and/or ads.

Figure 2:
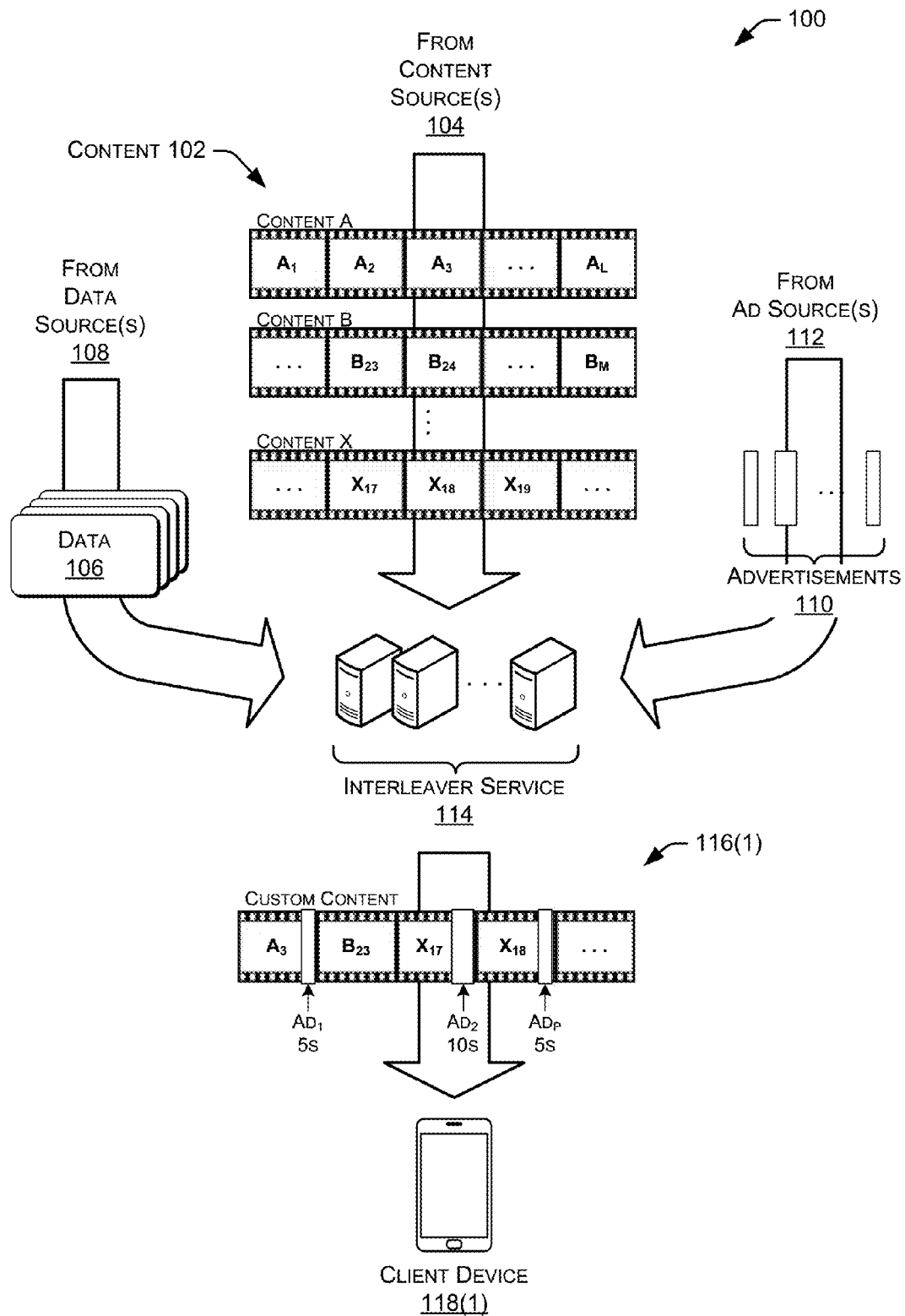
FIG. 2 is a schematic diagram showing an example of how the interleaver service uses the content, data, and ads to generate custom content for output to a client device of a particular user. In this example, the interleaver service receives content (e.g., video recordings of sporting events or sports commentary or analysis) from one or more content sources, data (e.g., fantasy sports data, user data, account information, etc.) from one or more data sources, and advertisements (e.g., internet, television, radio, print ads, etc.) from one or more ad sources. The interleaver service outputs customized content streams to one or more client devices of each user based at least in part on the received data. For instance, the content stream output for each user may be customized based on, for example, a fantasy sports account of the respective user.

FIG. 2 is a schematic diagram showing additional detail of the example architecture 100, including an example of how the interleaver service 114 uses the content 102, data 106, and ads 110 to generate custom content 116 for each subscriber. FIG. 2 illustrates how custom content 116(1) is provided to a particular client device 118(1) of the plurality of client devices 118.

The content 102 may arrive at the interleaver service 114 as A/V feeds already segmented into "clips." Alternatively, the content 102 may be segmented at the interleaver service 114. In the example shown, a plurality of content streams (e.g., Content A, Content B, . . . Content X) are segmented into a plurality of segments (e.g., segments $A_1, A_2, A_3, \ldots A_L, \ldots, B_{23}, B_{24}, \ldots B_M, \ldots, X_{17}, X_{18}, X_{19}, \ldots$, etc.). In the fantasy sports context, each segment may include, for example, a "play" or "down" in football, a pitch and associated play (if any) in baseball, a shot or basket in basketball, a lead change in auto racing, a corner kick in soccer, etc. In some instances, several plays (e.g., a football goal line defense, a baseball strikeout or at-bat, a basketball possession including multiple shots on basket, an auto racing lap, etc.) may be grouped into one segment.

The content 102 may arrive at the interleaver service 114 having metadata, "annotation" or "tagging" that provides information about each clip. Alternatively, the content 102 may be annotated or tagged at the interleaver service 114. The tags or annotations may include, for example, information about the subject matter shown in each clip (e.g., an athlete or athletes shown in the clip or that performed an action for which fantasy points are assigned or decremented, a description of the events of the clip such as a touchdown in football, a description of a game to which the clip corresponds, a location depicted in the clip, etc.). The tags or annotations may be used by the interleaver service 114 to determine specific athletes, teams, or other subjects depicted in each individual clip. In some examples, the clips (e.g., $A_1, \ldots, X_{19}$, etc.) may additionally or alternatively be tagged with fantasy information (e.g., fantasy points attributable to a depicted event).

In the fantasy sports context, the data 106 may include fantasy information related to subscribers' fantasy teams, leagues, rosters, and the like. The data may be obtained from websites (e.g., Yahoo!, ESPN, CBS, FOX, the NFL, Real-Time, etc.) that host fantasy sports leagues. The data 106 may also include league information, such as the names of teams in a user's league, the user's team roster, other teams' rosters, the names of athletes that are fielded (being played), the names of athletes that are benched (not played, but held in reserve). The data may include win-loss records of fantasy teams, league standings, a user's favorite real-life teams, favorite athletes, and other information.

By parsing the fantasy information or other data 106 corresponding to each user/subscriber, the interleaver service 114 may determine subjects of interest to the subscriber. In some examples, the interleaver service 114 may determine that athletes on a user's fantasy roster(s) or rosters of opponents in the user's fantasy leagues would be of interest to the user. The interleaver service 114 may then identify individual clips of incoming content having tags that match the subjects of interest to the user. The interleaver service 114 may then output the clips of interest to the client device 118(1) of the user as the feed of custom content 116(1). The clips of interest may be transmitted to the client device 118(1) individually or may be combined with one or more other clips for transmission to the client device 118(1).

In some examples, the interleaver service 114 may also insert one or more ads 110 at various locations in the custom content 116(1), such as between clips, in the middle of clips, simultaneously with clips, overlaid on top of clips, or the like. The ads 110 may include ads considered complementary or of interest to each particular user based upon the data 106 corresponding to the particular user. The ads may be audio, video, and/or still image ads. In the case of audio and/or video ads, the ads may be of varying length. In some examples, the length of an ad inserted may depend on how long it has been since a previous ad was presented.

In the context of a fantasy football example, the custom content 116(1) may include clips (e.g., audio/video) of football plays relevant to the user's fantasy football team (e.g., touchdowns, interceptions, field goals, etc.), the user's opponent's fantasy team, the user's favorite real-life team, the user's favorite athletes, etc., interspersed with selected advertisements (audio, video, and/or still images). In some examples, the ads may be relatively short ads (e.g., of about 5 seconds to about 30 seconds) inserted every few clips. In some instances, one or more of the ads may be related to one another (e.g., a sequence of related ads). Due to their short length, users are less likely to stop watching because the content will resume very shortly. Additionally, because the ads may be tailored to the user's interests, the ads themselves may be of more interest to the user as well. Thus, in some examples, within a relatively short period of time (e.g., 30 minutes), a user may be presented with a number of relevant clips (e.g., about 20-90 clips) interspersed with a number of ads (e.g., 10-30 ads).

Example Interleaver Service

Figure 3:
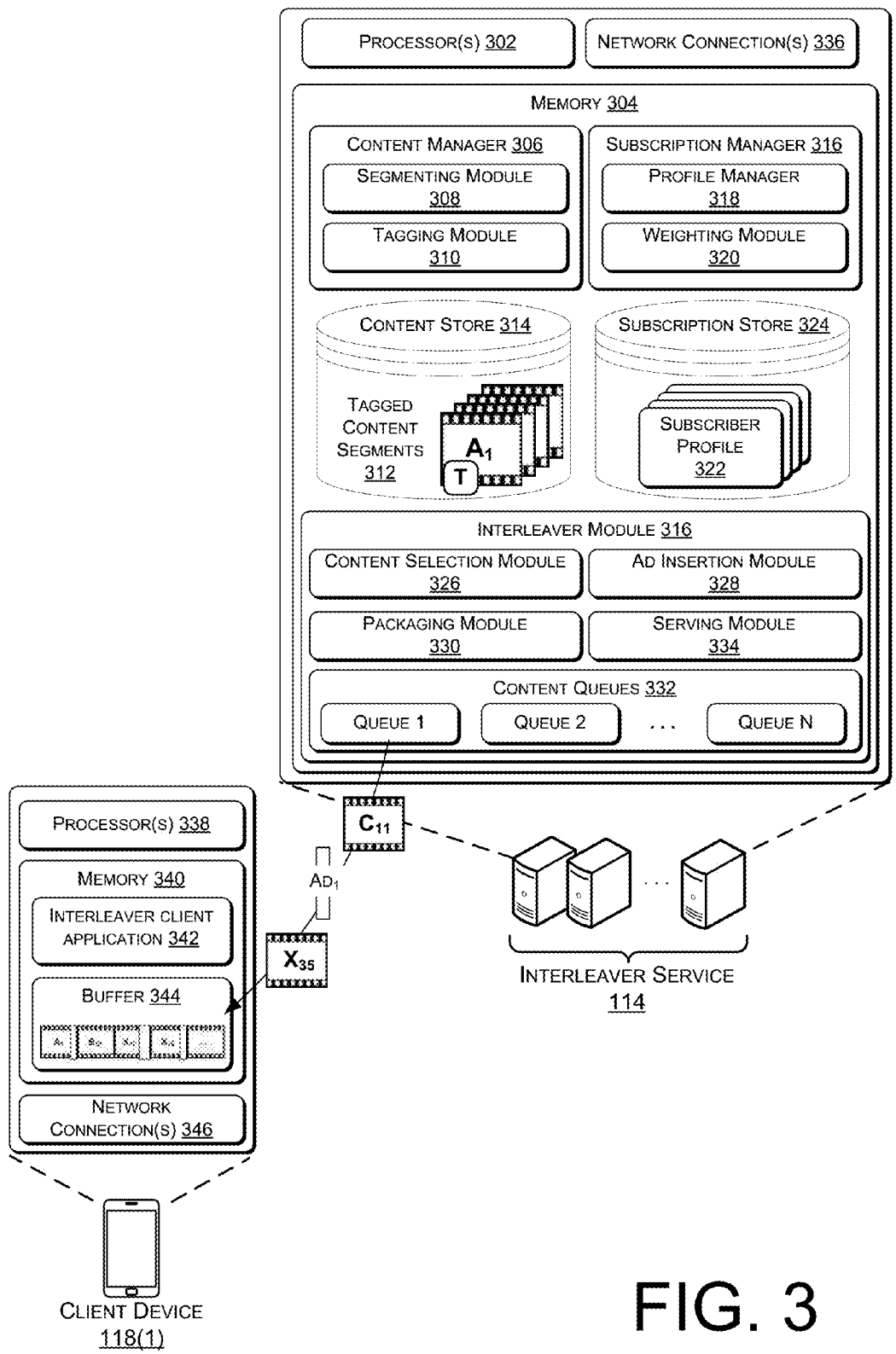
FIG. 3 is a block diagram showing example detail of the interleaver service of FIGS. 1 and 2.

FIG. 3 is a block diagram showing details of the example interleaver service 114 and a representative one of the client devices 118 of FIGS. 1 and 2. As shown in FIG. 3, the interleaver service 114 includes one or more processor(s) 302 communicatively coupled to memory 304. The memory 304 may store one or more software and/or firmware modules, which are executable by the processor(s) 302 to implement various functions.

In the illustrated example, the memory includes a content manager 306 which processes the incoming content 102 from the content sources 104. The incoming content 102 may comprise content from multiple concurrently airing broadcasts of sporting events, for example. The content manager 306 may include a segmenting module 308 configured to segment the incoming content 102 (e.g., to break the content into short clips of individual plays or groups of plays). In some instance, incoming content 102 may already be segmented, in which case the segmenting module 308 may further segment the content or the content may not need to be segmented by the interleaver service 114. The content manager 306 may also include a tagging module 310 to tag the incoming content (e.g., to identify one or more athletes, teams, locations, events, etc. depicted in each segment). The incoming content may be tagged prior to, during, or after the segmenting process. The tagging module 310 may tag untagged segments, add tags to previously tagged segments (e.g., segments that were received with existing tags), or replace previous tags with new tags. Once the incoming content is segmented and tagged (by the content manager 306 or otherwise) the tagged content segments 312 may be stored in a content store 314 in the memory 304 or another location accessible to the interleaver service 114. Segments and/or segmenting information may be saved in the content store 314 as separate files or combined in data structures, or may be saved as metadata to the original incoming content.

The memory 304 also includes a subscription manager 316 which manages subscriptions of one or more users of the interleaver service 114. The subscription manager 316 includes a profile manager 318 and a weighting module 320. The profile manager 318 may be configured to create and maintain a subscriber profile 322 for each user. The subscriber profiles 322 may include user information (e.g., contact information, demographic information, etc.), fantasy sports information (e.g., information about fantasy sports athletes, team(s) league(s) or account(s) of the user), and/or other information (e.g., favorite real athletes or teams, social network information, etc.). The subscriber profiles 322 may also include subscriptions to one or more topics of interest to the user. The topics of interest may have been explicitly identified by the user, or may be inferred based on the user information, the fantasy sports information, or the other information. Each of the subscriptions to the topics of interest may be assigned a weight by the weighting module 320. The weight indicates a relative importance or interest level of the various topics of interest to the user. The weightings may be explicitly set by the user, may be set according to a default weighting, and/or may be inferred based on the user information, the fantasy sports information, a history of user action, or the like. The subscriber profiles 322 may be stored in a subscription store 324 in the memory 304 or another location accessible to the interleaver service 114.

An interleaver module 316 stored in the memory 304 is responsible for identifying tagged segments 312 to serve and/or include in the custom content provided to the various users. The interleaver module 316 includes a content selection module 326 an ad insertion module 328. The content selection module 326 identifies tagged segments 312 that match subscriptions in subscriber profiles 322, prioritizes the segments based on user preferences or weights in the subscriber profiles, and generates a custom content stream for the user. The ad selection module 328 identifies ads relevant to the respective subscriber profiles 322 and inserts them into the custom content stream at appropriate locations.

The interleaver module 316 also includes a packaging module 330 that formats the segments of the custom content stream and prepares them for transmission to client devices. For instance, the packaging module 330 may break segments into multiple packets and/or insert multiple segments and/or ads into a packet or package. The segments are then placed into a queue for transmission to the particular user. In the illustrated example, the interleaver module 316 administers content queues 332 (e.g., queue 1, queue 2, . . . queue N) corresponding to each user of the interleaver service. Thus, the queue for each user may contain tagged segments and ads packaged for transmission to a client device of the respective user as a custom content stream. In other examples, rather than storing individual copies of segments and ads in the queues for each user, the queue for each user may simply include a pointer or other reference to a common, centralized copy of each segment or ad. The tagged segments and ads remain in the respective user's queue (or in a centralized store to which the pointer or reference in the queue is directed) until they are transmitted to the user's client device. Before they are transmitted to the client devices, an order of content segments and ads may be reordered based on various priorities and user preferences (e.g., relevance to the user vs. freshness of the segments). A serving module 334 of the interleaver service 114 is configured to transmit packets in an order indicated in each queue to the respective client device via one or more network connections 336 (e.g., wired or wireless connections etc.). The serving module 334 may serve packets to the client devices as the packets become available (i.e., are packaged and placed in the queue) and/or to maintain a predetermined clip buffer at each client device.

FIG. 3 also illustrates additional details of representative client device 118(1). As shown, client device 118(1) includes one or more processors 338 and memory 340. The memory 340 includes, among other things, an interleaver client application 342. The interleaver client application 342 may be installed on the client device 118(1) and when opened or executed may provide a user interface by which the user may interact with the interleaver service 114. For instance, the interleaver client application 342 may provide one or more graphical user interfaces that allow the user to create an account, manage one or more fantasy teams, manage one or more preferences or subscriptions, and/or consume a custom stream of content, all of which are described in greater detail below.

The memory 340 also includes a buffer 344 that includes one or more content segments and ads of the custom content stream. The content segments and ads are placed in the buffer 344 when they are received via one or more network connections 346 from the interleaver service 114. The content segments and ads remain in the buffer 344 until they are played or otherwise consumed by the interleaver client application 342, until they are deleted, or until they are replaced by other content and/or ads (e.g., content and/or ads that are more relevant and/or fresher).

In the example of FIG. 3, the content selection module 326 identifies one or more tagged content segments 312 as being relevant to a user of client device 118(1) based on information in the user's subscriber profile 322. The ad insertion module 328 then inserts one or more ads that are tailored to the user based on the user's subscriber profile. The tagged content segments 312 and ads are then formatted by the packaging module 330 and placed in queue 1 corresponding to the user of client device 118(1). Then, the serving module 334 transmits one or more segments and/or ads from the queue 1 to the buffer 344 of the client device 118(1). In the illustrated example, the serving module 334 transmits segments $X_{35}$ and $C_{11}$ and ad $AD_1$ to the client device 118(1). The segments and ads may be pushed to the client device 118(1) on a schedule determined by the interleaver service 114, or they may be transmitted in response to a request from the client device 118(1). In some examples, the segments and ads may be transmitted responsive to the buffer of the client device 118(1) falling below a threshold fullness (i.e., having less than a threshold number of segments or ads, or less than a threshold length of custom content).

The segments $X_{35}$ and $C_{11}$ and ad $AD_1$ may then be played back by the interleaver client application 342 in the order they were received, in an order specified by the user, in a priority order determined by the interleaver client application 342 or the interleaver service 114, or in any other suitable order.

While the modules are described herein as being software and/or firmware executable by one or more processors, in other embodiments, any or all of the modules or functional blocks may be implemented in whole or in part by hardware (e.g., as an application specific integrated circuit or "ASIC," a specialized processing unit, a field programmable gate array or "FPGA," etc.) to execute the described functions.

The memory 304 of the interleaver service 114 and/or the memory 340 of the client devices 118 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors or circuits of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EE-PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media such as modulated data signals or carrier waves.

Example Segmenting and Tagging Operations

Figure 4:
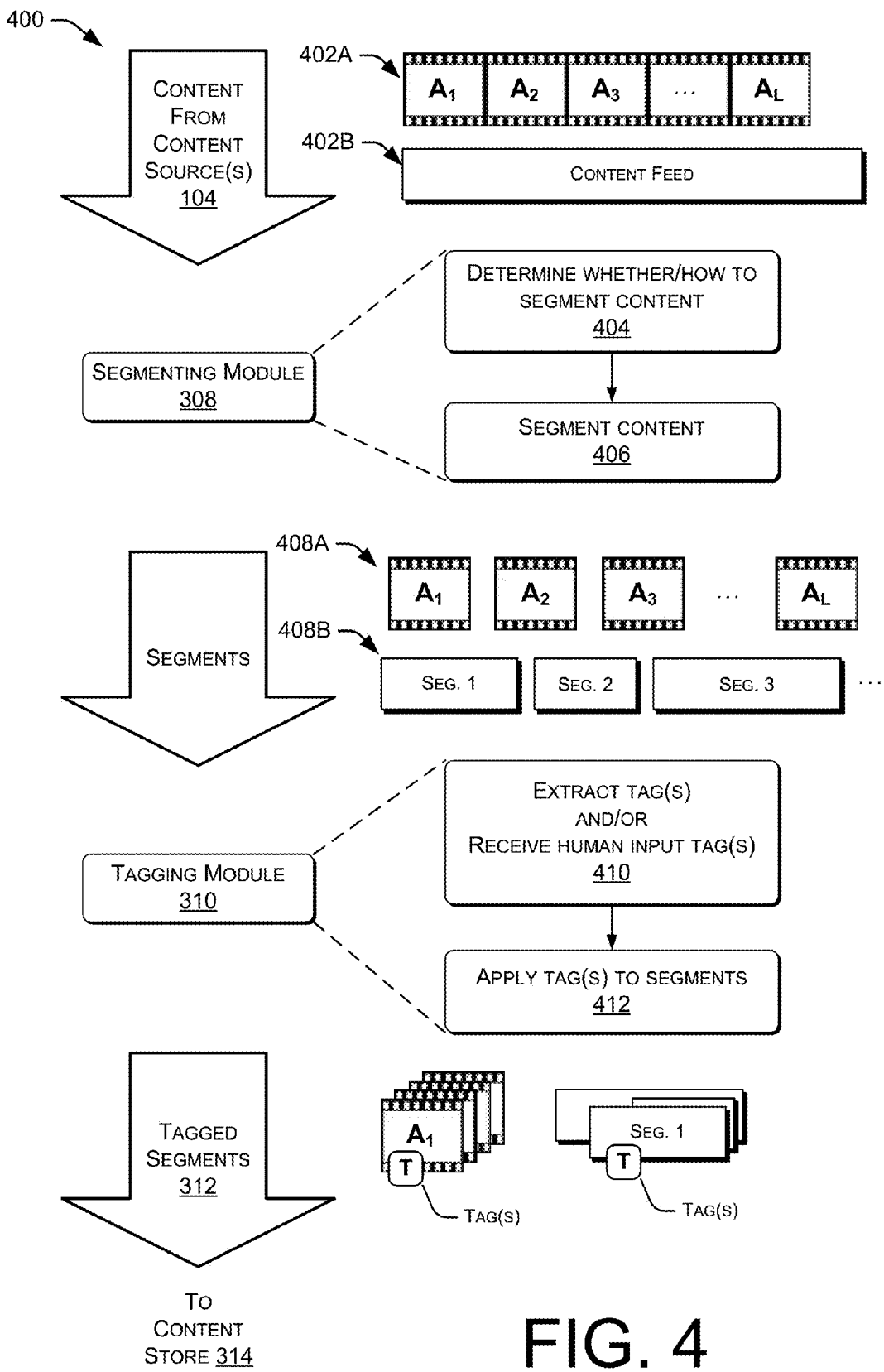
FIG. 4 is a schematic flow diagram showing example operations performed by a segmenting module and a tagging module of the interleaver service of FIGS. 1 through 3.

FIG. 4 is flowchart with schematic diagrams providing an overview of an example segmentation and tagging process 400 that may be used to segment a content feed into multiple segments and to tag the segments with one or more tags. For ease of description and understanding, the process 400 is described as being performed by the segmenting module 308 and tagging module 310 of the interleaver service 114 of FIGS. 1-3. However, the process 400 may additionally or alternatively be performed in whole or in part by one or more other systems.

As shown in FIG. 4, the segmenting module 308 receives content from one or more content sources 104. In some cases, content may come from a content source with predefined frames, tracks, chapters, scenes, or other segments, as in the case of content 402A in FIG. 4. In that case, the interleaver service may segment the content according to the predefined segments. Alternatively, the segmenting module 308 may create new segments, which may include multiple of the predefined segments, may include a portion of a predefined segment, may span multiple predefined segments, or may replace the predefined segments. In other cases, as in the case of content 402B, content may be received in a lengthy and/or ongoing feed.

At block 404, the segmenting module determines whether the content needs to be segmented. If the content is received in an un-segmented fashion (e.g., a large content file or a continuous stream or feed of content) or if additional segmentation is necessary or desired (e.g., if the predefined segments are to large or do not align with content of interest to the user), at block 406, the segmenting module 308 may segment the content into one or more segments, such as segments 408A or 408B. Additional details of segmentation are provided with reference to FIGS. 5A-5C, 6, and 8.

At block 410, the tagging module 310 may obtain one or more tags for each segment. While in this example the tagging is shown as being performed after segmentation, in various examples the tagging may be performed prior to, concurrently with, and/or after the segmenting. The tags may be obtained by extracting the tags from the content of the segments themselves or by receiving human input tags (as described in further detail with reference to FIGS. 7, 8, and 17. Regardless of how the tags are obtained, at block 412, the tagging module may apply the tag(s) to the content segments 408A and/or 408B. Once tagged, the tagged content segments 312 may be output to and stored in the content store 314.

Figure 5A:
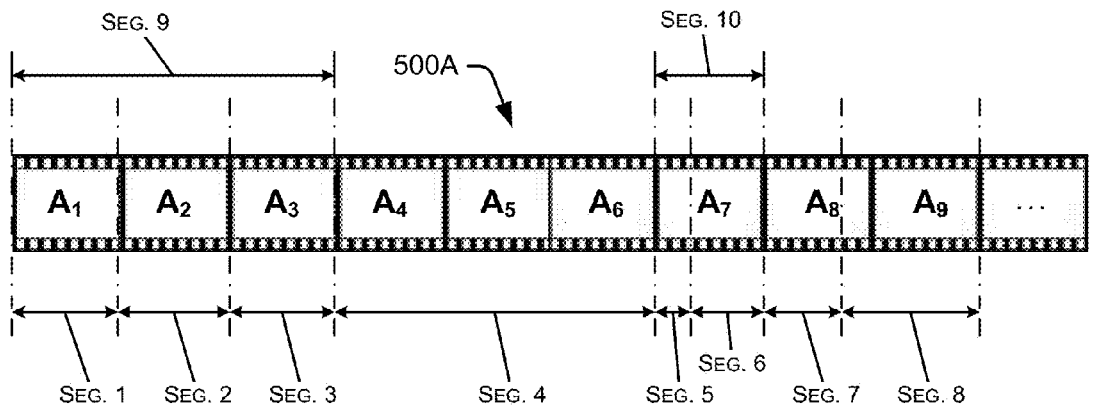
FIGS. 5A, 5B and 5C illustrate three example ways in which content may be segmented.
Figure 5B:
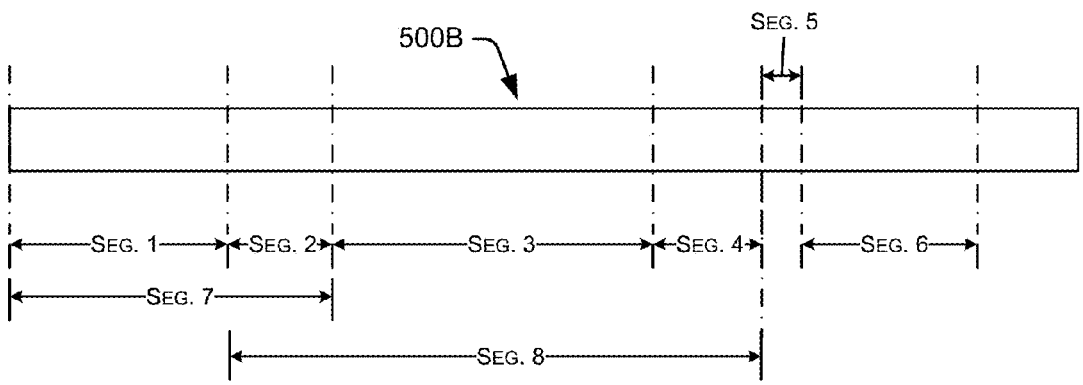
Figure 5C:
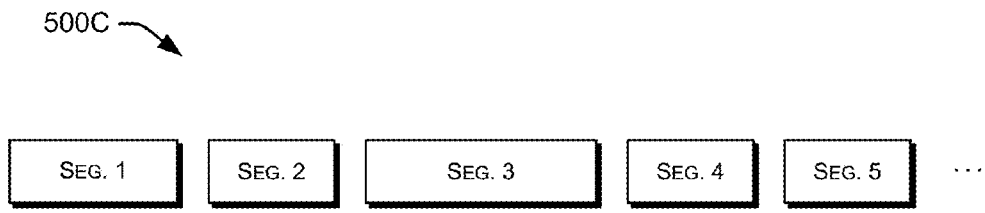

FIGS. 5A-5C illustrate examples of various types of content that may be received by the interleaver service 114, and different ways of segmenting the various types of content that may be received. For instance, FIG. 5A illustrates a continuous or incoming stream of content 500A from a content source that includes predefined frames ($A_1$, $A_2$, $A_3$, etc.), tracks, chapters, scenes, or other segments. As mentioned above, the interleaver service 114 may use the predefined segments as-is, or may create additional or alternative segments (e.g., because the predefined segments are not of an appropriate length for use by the interleaver service or are not centered around the desired subject matter or event). In FIG. 5A, segments "Seg. 1," "Seg. 2," and "Seg. 3" are examples of instances in which the interleaver service 114 has adopted the predefined frames and segmented the incoming content according to the predefined frames. "Seg. 4" is an example of an instance in which the interleaver service 114 has segmented the content into a segment including multiple of the predefined frames (i.e., frames $A_4$-$A_6$). "Seg. 5," "Seg. 6," and "Seg. 7" are examples of instances in which the interleaver service 114 has segmented the content in to segments shorter than the predefined frames, such that each of Seg. 5-Seg. 7, includes a portion of a predefined frame. "Seg. 8" is an example of a segment that spans parts of multiple predefined frames (i.e., part of frames A8 and A9).

Moreover, content may be segmented in multiple different ways. For instance, the portion of the content represented by frames $A_1$-$A_3$ has been segmented into three segments ("Seg.

1," "Seg. 2," and "Seg. 3") that generally align with the predefined frames, and has also been segmented into one larger segment ("Seg. 9") that generally spans all three of the predefined frames. In the context of fantasy football, "Seg. 1," "Seg. 2," and "Seg. 3" may generally correspond to three individual plays, while "Seg. 9" may generally correspond to a sequence or series of plays (e.g., a goal line stand or a series of downs) or a single play with one or more instant replays, celebrations, etc. Alternatively, "Seg. 2" may correspond to a reception, while "Seg. 1" may correspond to the pass that resulted in the reception, and "Seg. 3" corresponds to a touchdown by the receiver that caught the pass in "Seg. 2." In that case, "Seg. 2" may be considered a "short" version of the reception showing just the catch, while "Seg. 9" may be considered a "long" version of the reception showing the series of events leading up to and following the reception. By segmenting content in multiple different ways, the interleaver service 114 may serve different versions to different users (e.g., send the short version to users with slower connection speeds and/or more limited data packages and send the larger version to users with faster connection speeds and/or larger or unlimited data plans; send short or long version based on user preferences; send short or long version depending on which is more relevant to the user; etc.).

Alternatively, the interleaver service 114 may send the long version of the content along with metadata designating both short and long segmentation, and the interleaver client application 342 on the client device 118 may determine whether to play the short version or the long version based on one or more factors (e.g., user preference, relevance, freshness, amount of content in the buffer 344, amount of content in the user's content queue 332 at the interleaver service 114, or the like). In one specific example, the interleaver client application 342 may determine to play the short version if the buffer 344 is full (e.g., over a threshold content size or number of clips), otherwise play the long version. While in the foregoing examples, two alternate segmentations (i.e., long and short) are described, in other examples, the content could include three or more segmentations.

While in the example of FIG. 5A, the series of frames constituting "Seg. 9" are contiguous and consecutive, in other examples the segments may be composed of multiple non-contiguous and/or non-consecutive frames or other portions of the content. Moreover, segments may be composed of portions of multiple different content streams (e.g., "Seg. 3" from FIG. 5A may be combined with "Seg. 2" from FIG. 5B to result in a new composite segment).

FIG. 5B illustrates an example in which content 500B comes from the source as a program or a continuous feed without predefined breaks and may be continuously segmented in substantially real time. The content 500B in this example does not include any predefined frames or other segments. In that case, the content may be segmented in a variety of ways. For instance, the content may be segmented manually (i.e., by manual editing by a human user), automatically via a variety of automated segmenting techniques, or by a semi-automatic or partially automated segmentation process. Whether manual, automatic, or semi-automatic, the content may be segmented based at least in part on audio of the content (when speaker starts/stops, when speaker mentions athlete, etc.), video of the content (when athlete enters field of view, when play begins/ends, etc.), and/or textual content (when athlete's name appears in images in the video or closed captioning) in or appended to the content (e.g., in metadata or tags). These and other segmenting approaches are described further below with reference to FIGS. 6 and 7.

FIG. 5C illustrates an example in which content 500C comes from the source as individual discrete segments or blocks of content. The content 500C may come from the source as individual segments of arbitrary length, uniform length, or multiples (e.g., 2X) of a uniform length.

Regardless of the form of the incoming content and/or the segmenting approach employed, not all of incoming content is necessarily kept as a segment and/or some segments may be discarded. Further, in instances where the segments comprise metadata appended to or referencing the original content, not all portions of the original content need be designated as a segment. In either case, the result is that some portions of the original content (e.g., huddles, credits, commercials, etc.) may be not segmented or may be segmented and then discarded.

Figure 6:
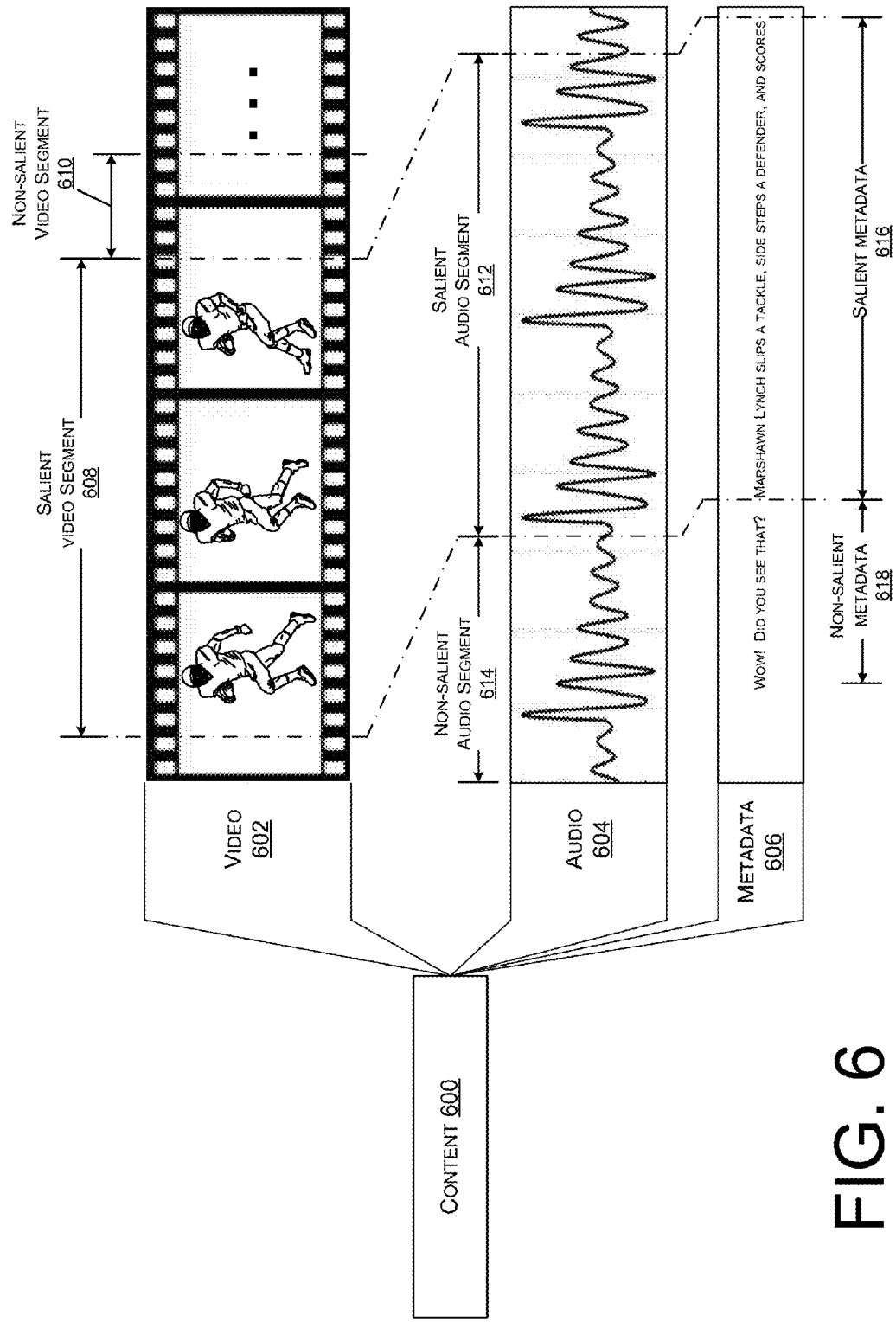
FIG. 6 is a schematic diagram illustrating an example of how content including video, audio, and metadata may be segmented.

FIG. 6 is a schematic diagram illustrating an example of how content 600 may be segmented. Incoming content received by the interleaver service 114 may include audio, video, still images, closed captioning data, tags or and/or annotations. As mentioned above, the incoming content may be segmented based at least in part on audio of the content, video of the content, and/or textual content in or appended to the content. Content 600 represents an example content stream corresponding to a televised sporting event, which includes video 602, audio 604, and metadata 606.

The video 602 includes recorded and/or digitized video of the sporting event. The video 602 may be raw, unedited video (e.g., a feed from one of multiple cameras filming the sporting event), or it may be edited video (e.g., a final or semi-final version of video ready for consumption by consumers). While content 600 includes a single feed of video (i.e., images from a single camera or source), in other examples, video content may comprise multiple video feeds (e.g., simultaneous video feeds from multiple cameras filming the same sporting event). As shown in FIG. 6, the video 602 includes one or more salient video segments 608 and one or more non-salient video segments 610. The salient video segments 608 correspond to portions of the video 602 that depict an event of interest, while the non-salient segments 610 correspond to portions of the video 602 that depict events of low interest. Generally, the salient video segments 608 depict subjects (e.g., people, places, or things) and/or occurrences (e.g., actions or events) that are or are likely to be of interest to one or more users of the interleaver service 114. In the fantasy sports context, salient video segments 608 may include, for example, portions of the video that depict events for which statistics are maintained by an athletic governing body (e.g., rushing yards in football, strikeouts in baseball, three-point baskets in basketball, etc.), portions of video that depict events resulting in fantasy points being awarded or decremented. In some fantasy sports examples, salient video segments 608 may additionally or alternatively include portions of the video showing context of the sporting event or surroundings (e.g., stadium, cheerleaders, sidelines, halftime shows, announcers, analysts, fights, crashes in auto racing, etc.). Non-salient video segments generally relate to portions of the video of little or no interest to users. In the fantasy sports context, non-salient video segments 610 may include, for example, portions of the video showing periods of inaction (e.g., rain delays, huddles, timeouts, etc.) or errors or mistakes (e.g., inadvertently recorded video showing the ground or the inside of the lens cap for instance, blurred or obscured images, scrambled or blank video feeds, etc.). In some examples, non-salient video segments 610 may include advertisements contained in the original video. However, in other instances, advertisements in the original content may be considered salient video segments 608.

The audio 604 comprises an audio recording (e.g., digital audio data) corresponding to the video 602. The audio 604 may comprise audio recorded by a microphone associated with a camera that recorded the video 602, audio recorded by one or more announcer microphones, audio from a studio announcer/analyst, or other audio. The audio may be recorded contemporaneously with the video (i.e., "live" relative to the video) or at a different time prior to or after the video. The audio 604 may include one or more salient audio segments 612 and one or more non-salient audio segments 614. In some cases, the salient and non-salient audio segments may be temporally aligned with the salient and non-salient video segments, respectively. However, in other cases, such as that shown in FIG. 6, the salient audio segments 612 may be temporally offset from the salient video segments 608. This may be the case when, for example, a play unfolds and the announcer's description or analysis of the play does not begin until the play is in progress or complete. In that case, the portion of the salient audio segment (i.e., the announcer commentary or analysis may be delayed relative to the salient video segment (i.e., the video depicting the play). In some instances, the length of the salient audio segments 612 may be of the substantially a same duration as the corresponding salient video segments 608. However, in many cases, the length of a salient audio segment will be different than that of the corresponding salient video segment. For instance, often a salient video segment (e.g., play) occurs quickly and is of short duration while the salient audio segment is delayed and/or more lengthy (e.g., in the case of announcer description of the play followed by analyst discussion or explanation). In other instances, the salient video segment may be longer than the corresponding salient audio segment. Further, in some instances, there may be no salient audio segment corresponding to a salient video segment (e.g., when there is no announcer mention of a particular play or other event) or vice versa (e.g., when an announcer or analyst comments on an athlete or other topic that is not present in the video content).

The content 600 in FIG. 6 also includes metadata 606. Metadata take many forms, including closed captioning data, annotations (textual, audio, video, etc.), bookmarks (e.g., showing points of interest), partitions (e.g., frame or track boundaries), editing data, supplementary information (e.g., index or table of contents, scene or chapter designators, credits, etc.). In the illustrated example, metadata 606 includes closed captioning data comprising a textual representation of the audio 604. In this example, the content 600 was received with the metadata 606, but in other examples, the interleaver service 114 may process the incoming content as it is received in near real time to add the metadata. Regardless of where the metadata 606 is generated, it may be generated manually (e.g., entered by a transcriptionist), automatically (e.g., using a voice recognition speech-to-text program), or semi-automatically (e.g., using a voice recognition speech-to-text program to generate a preliminary data, which is then edited by one or more human administrators). The metadata 606 may or may not be aligned temporally with the video 602 and/or audio 604. The metadata 606 may include salient metadata 616 and non-salient metadata 618, which may or may not correspond to salient and non-salient audio and/or video segments. In the example of FIG. 6, since the metadata represents closed captioning data, the metadata generally corresponds to the audio segments (though may not align temporally with the corresponding audio segments).

In some examples all parts of the content (e.g., audio, video, textual content, images, etc.) may be segmented at a same time and/or in a same segmenting operation. For instance, the content may be divided into multiple parts based on time segments of a recording, such that each segment is composed of whatever audio, video, text, or other content is included within the particular time range of the segment. In other examples, the various parts of the content may be separated and segmented separately. That is, the audio may be separated from the other portions of content and the audio may be segmented using one or more audio segmenting techniques. Similarly, the video and other portions of the content may each be segmented individually. Thereafter, one or more salient audio, video, and/or other segments may be aligned and recombined so as to provide segments having salient audio, video, and other content that are temporally aligned. For example, as mentioned above, salient video segment 608 begins at a time in the content 600 prior to salient audio segment 612, which in turn begins prior to the corresponding salient metadata 616. In some examples, the salient video segment 608, salient audio segment 612, and salient metadata 616 may be aligned temporally. Aligning the various salient segments temporally may include aligning them to begin at a same time, to end at a same time, and/or to be centered around a same midpoint in time.

In some examples, the various salient segments may be of different lengths (e.g., the salient audio segment may be longer than the salient video segment or vice versa). In some instances these differences in length may be acceptable or even desirable. However in other instances, it may be desirable that the various salient segments that are to be combined be of the same or substantially the same length. In such cases, a longer segment may be trimmed to match a length of a shorter segment, a shorter segment may be supplemented with additional content or ads to reach the length of a longer segment, or one or more of the segments may be sped up or slowed down to match the length of the other segment(s).

In still other examples, one or more portions of the original content may be omitted from the finished segments. For instance, the original audio of the content may be omitted from the segments. In that case, the finished segments may be free of audio entirely, may be replaced by alternative audio (e.g., an audio account of what is shown in the video, commentary on what is shown in the video, or the like).

Figure 7:
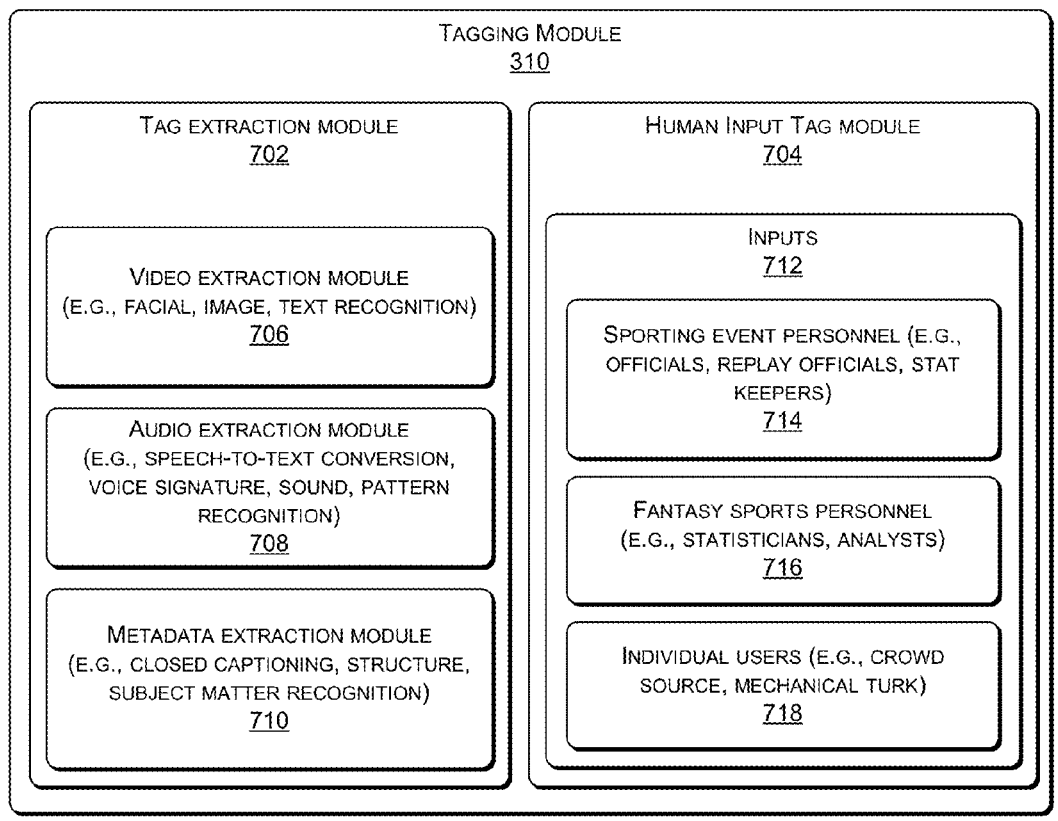
FIG. 7 is a block diagram showing additional details of the example tagging module of FIG. 3.

FIG. 7 is a schematic diagram showing additional details of the example tagging module 310 of the interleaver service 114 that may be used to tag segments with terms describing subject matter in the segment, a source of the segment, a date and time of the segment, fantasy points attributable to events in the segment, or the like. As mentioned previously, in various examples segments may be tagged automatically, manually (i.e., by one or more humans), or semi-automatically (using both automated and manual processes in parallel or in series). In the example of FIG. 7, the tagging module 310 includes a tag extraction module 702 configured to perform automated tagging and a human input tag module 704 which facilitates receiving human input tags. Thus, the tagging module 310 in this example is capable of performing tagging automatically, manually, or semi-automatically. Whether the tagging module 310 does tagging automatically, manually, both in parallel (e.g., cumulative automatic and manual tagging), or both in series (e.g., automatic tagging reviews and revised by human users or vice versa) may depend upon the form in which the content is received, the nature of the events depicted in the content, the demand for new fresh segments, the allowable time for processing incoming content into segments, or the like.

The tag extraction module 702 in this example includes a video extraction module 706, an audio extraction module 708, and a metadata extraction module 710. The tag extraction module 702 may use any or all of these modules to automatically extract or discern subject matter depicted or described in the content.

The video extraction module 706 may include one or more algorithms to perform facial recognition to identify faces of people depicted in video of the content. Facial recognition approaches employed by the video extraction module 706 may include geometric approaches, photometric approaches, or other facial recognition approaches. By way of example and not limitation, several specific facial recognition algorithms that may be used separately or in combination include the Principal Component Analysis using eigenfaces, Linear Discriminate Analysis, Elastic Bunch Graph Matching using the Fisherface algorithm, the Hidden Markov model, the Multilinear Subspace Learning using tensor representation, and/or the neuronal motivated dynamic link matching. In some examples, the facial recognition may be performed with reference to a database of images (e.g., images of athletes of one or more sports). Once a person is identified using facial recognition, the segment may be tagged with the name, position, or other information about the identified person.

Additionally alternatively, video extraction module 706 may identify one or more images or other objects in the content. The object recognition may be performed based at least in part on the shape, color, and/or contrast of objects in the video content. For instance, the video extraction module 706 may be able to identify objects such as sporting equipment (e.g., a helmet, a ball, shoes, a racket, etc.), structures (e.g., buildings, goals or goal posts, baskets, shot clock, home plate, etc.), visible symbols or markings (e.g., yard lines, side lines, base lines, starting lines, finish lines, track turns, etc.). In some examples, the video extraction module may perform object recognition by analyzing the video content, identifying one or more salient objects in one or more frames of the video, and then comparing the salient object(s) to a database of known objects or object types. If the salient object(s) match known objects or object types, the segment may be tagged as containing the known object or object type. Numerous machine vision techniques are available to perform object recognition depending on the object to be recognized.

Additionally alternatively, video extraction module 706 may perform optical character recognition (OCR) to identify one or more characters in images of printed, computer generated, or handwritten text (e.g., signs, names or numbers on jerseys, scores, time clocks, tickers, announcements, etc.). The text thus recognized may be output as tags of the segment.

Furthermore, in addition to extracting data directly from the content itself, the tag extraction module 702 may further use the extracted information as a query to search one or more other databases of information (e.g., roster information, statistics, schedule information, etc.). In some instances, this additional information may be used to help disambiguate between multiple possible identifications. For instance, the facial recognition algorithm may indicate that a video clip depicts one of multiple possible candidates, but may not be able to definitively determine which person is actually depicted. An object recognition algorithm may also be used and may determine (e.g., based on the uniform colors) that the person belongs to a particular team. By querying a roster database, the tag extraction module 702 may determine that only one of the possible candidates plays for the particular team and in this way may determine the identify of the particular person.

In one specific example related to football, the video extraction module 706 may use object recognition to identify a ball carrier by recognizing the ball based on the color (brown) and/or shape, and may then determine an identity of the ball carrier using facial recognition by comparing the video content to a database of images of football players and/or by using OCR to recognize a name or number on the player's jersey. The segment may then be tagged with a variety of tags, such as the identity of the ball carrier, the particular sport (e.g., football), a position of the ball carrier (e.g., running back, quarterback, etc.), a team for which the ball carrier plays, any other athletes shown in the segment, or the like. In other examples, other information may be recognized in the segment and/or included as a tag of the segment.

The audio extraction module 708 may perform speech-to-text conversion on the audio content to determine one or more words that are being spoken in the audio content. The output of the speech-to-text conversion comprises text, some or all of which may be used to tag the audio content or temporally aligned video content. In some examples, the audio extraction module 708 may select less than all of the output of the speech-to-text conversion for use as tags, such as names (e.g., athletes names, team names, announcer names, etc.), events for which statistics are kept and/or fantasy potions are awarded (e.g., touchdown, homerun, tackle, goal, score, basket, etc.), locations, etc.

Additionally or alternatively, the audio extraction module 708 may perform voice signature recognition, sound recognition, and/or pattern recognition to identify a source of the respective voice, sound, and/or pattern. For example, the audio extraction module 708 may compare a portion of audio content to a database of audio content, such as a database of known voice samples (e.g., of known athletes, coaches, announcers, etc.) or other known sounds common to various sporting events (e.g., crowd noise, field noise, crack of a bat, shot clock buzzer, motor noises, etc.). Prior to performing the comparison, the audio extraction module 708 may perform some pre-processing to identify particular classes of audio (e.g., speech, motor noise, etc.), to isolate or enhance certain sounds, or the like. In some examples, the audio extraction module 708 may analyze the video content, identify one or more salient portions of the audio, and then compare the salient portion of the audio to the database of known voice samples or other known sounds. If the salient audio matches known voices or sounds, the segment may be tagged as containing the known voice or sound. Numerous audio processing techniques are available to perform voice signature, sound, and/or pattern recognition.

The metadata extraction module 710 may extract data metadata such as closed captioning information, structure of the content such as audio and/or video format, compression, resolution, source information (e.g., a broadcasting company, website, or other source of the content), data information, property right information (e.g., copyright, license information, etc.), annotations, predefined segments (e.g., frames, chapters, etc.), or the like. The metadata extraction module 710 may additionally or alternatively include subject matter recognition capabilities to determine or infer subject matter (e.g., people, places, things, events, actions, etc.) included in content from the metadata. For instance, if content includes closed captioning or other metadata including names of two athletes, the metadata extraction module 710 may query one or more other databases to determine which teams those two athletes are on, when those two teams play each other, the positions of the athletes, or the like. From this, the metadata extraction module 710 may infer that the segment corresponds to a segment from a particular game between the two teams, and that the two athletes are featured in the segment. Depending on the respective positions of the two athletes, the metadata extraction module 710 may also be able to infer something about the nature of the event depicted in the segment. For instance, if one of the athletes is a kicker, the metadata extraction module 710 may infer that the play involved a kick. The information obtained by the metadata extraction module 710 may be used alone or together with information obtained by the video and/or audio extraction modules to tag the various segments with terms relevant to the segments.

The human input tag module 704 provides one or more inputs 712, from which the tagging module 310 may receive human input tags. In the illustrated example, the inputs 712 include event inputs 714 from sporting event personnel, such as referees, umpires, replay officials, statistics keepers, or other personnel associated with a sporting event. These inputs may be in the form of speech, text, or other information and may include inputs captured or received at the time the content was recorded (e.g., by officials' microphones or stat keepers' entries during the sporting event) or after the fact (e.g., during an instant replay, booth review, review of the film after the game).

The inputs 712 may additionally or alternatively include fantasy inputs 716 from one or more statisticians, analysts, or fantasy sports company personnel. The inputs from the fantasy inputs 716 may include terms or descriptions associated with or describing the subjects and/or events depicted in one or more segments. Additionally or alternatively, the fantasy inputs 716 may include a number of fantasy points awarded or decremented based on events depicted in the segment(s).

The inputs 712 may additionally or alternatively include user inputs 718 from one or more users of the interleaver service 114, one or more fantasy sports services (e.g., Yahoo, ESPN, etc.), a crowd sourcing service such as Amazon's mechanical turk that solicits tags for one or more segments in exchange for compensation (e.g., money, goods, services, discounts, etc.). In the case of users of the interleaver service 114, the segment may be served to one or more users as part of their custom content. The users may then annotate the segment, post comments regarding the segment, message one or more of their contacts regarding the segment, or the like. These annotations, comments, and/or messages may be analyzed to identify additional tags associated with the segment. In this way, tags for segments may be updated and refined over time to improve the accuracy and completeness of the tags for each segment. In the case of users of a crowd sourcing platform such as Amazon's mechanical turk, the segments may be posted on the crowd sourcing platform where the users may view the segments and input one or more tags associated with each segment. Users may be compensated based on, for example, the number of segments they tag, the number of tags they assign to each segment, the timeliness of the tags (i.e., how soon they tags are applied after the segments are posted), or the like.

In still other examples, a crowd sourcing approach could be implemented directly through the interleaver service 114. In that case, user may receive compensation (e.g., money or credits to their account) for tagging segments. In some examples, if a user opts to participate as a crowd source worker to help tag segments, the user may receive untagged segments as part of the user's custom content stream. The user may adjust a number or frequency of untagged segments that the user receives to tag via one or more interfaces of the interleaver service. In other examples, the interleaver service 114 may serve a separate segment tagging interface presenting multiple segments available to be tagged by the user.

In some cases the inputs 712 may comprise raw inputs (speech, text, points, etc.) that are then converted into individual tags to be applied to the segments. In other instances however, the inputs 712 may comprise individual terms or other tags in a form suitable to be applied to a particular segment or other portion of content.

Figure 8:
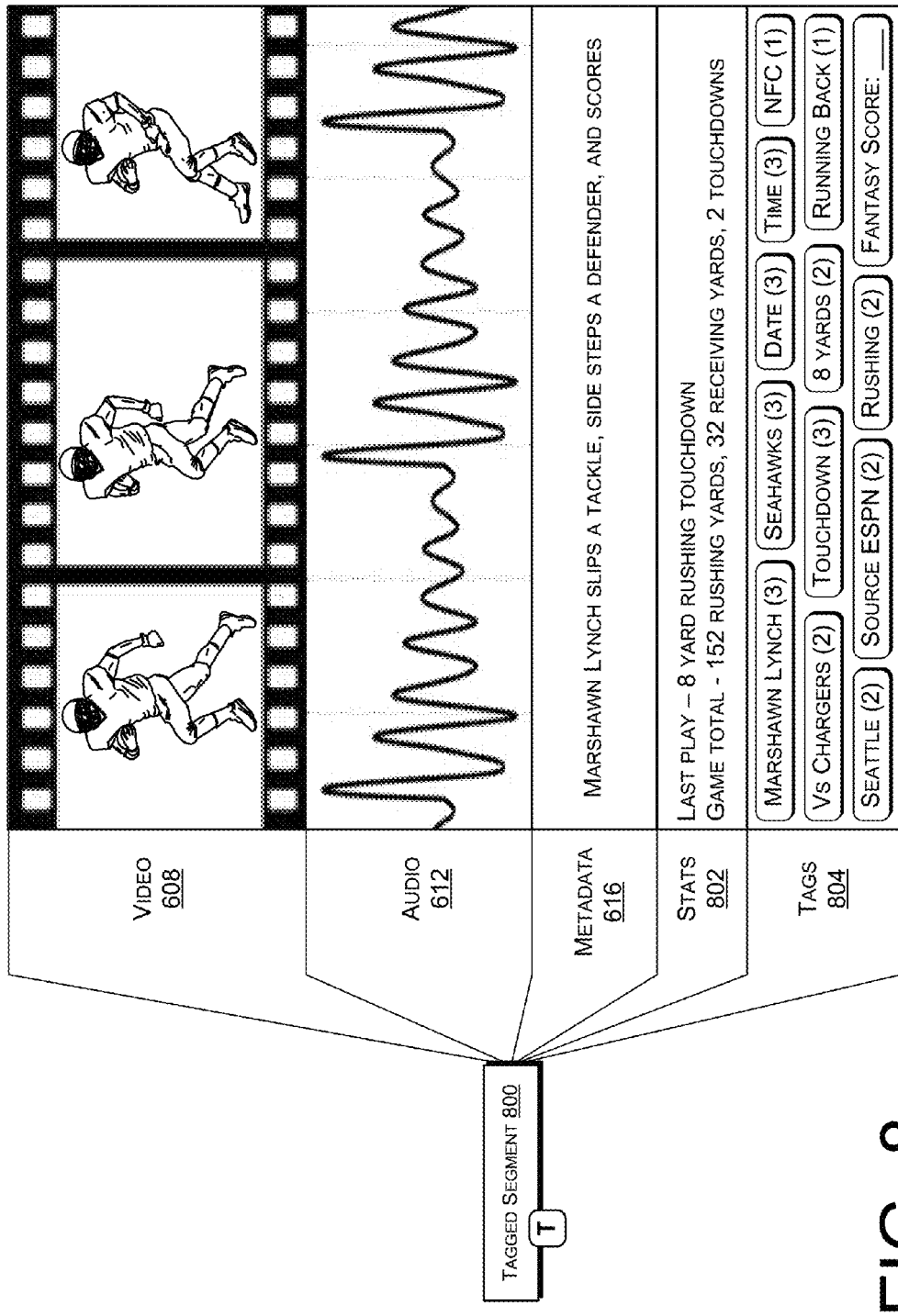
FIG. 8 is a schematic diagram illustrating example structure of a tagged content segment.

FIG. 8 is a schematic diagram illustrating an example tagged (or annotated) segment 800. The tagged segment 800 corresponds to a portion of the content 600 shown in FIG. 6, which has been tagged by the tagging module 310 with multiple applicable tags. Of course, in other examples tagged segments such as tagged segment 800 may be generated by other systems and using other processes. Moreover, the systems and processes described with reference to FIGS. 6 and 7 may be used to generate different tagged segments. Thus, using the tagging or annotations associated with the tagged segment 800, and using information found in each subscriber profile 322, the interleaver service 114 may determine if any particular tagged segment (e.g., video clip) has fantasy point relevance (or other relevance, such as favorite player or team) to any particular user and associated client device 118. Accordingly, the interleaver service 114 may be configured to include the tagged segment 800 in the custom content 116 associated with those client devices to which the segment is relevant.

As shown in FIG. 8, the tagged segment 800 comprises the salient video segment 608 aligned with the salient audio segment 612 and salient metadata 616. In some examples, the tagged segment 800 may include one or more statistics 802 relevant to the segment and one or more tags 804 relevant to the segment. For instance, in the illustrated example, the statistics 802 include an indication of a result of a last play (e.g., an 8-yard rushing touchdown by Marshawn Lynch) and one or more game total statistics (e.g., 152 rushing yards, 32 receiving yards, 2 touchdowns) for an athlete featured in the segment.

In the illustrated example, the tags 804 include an athlete shown in the segment (e.g., Marshawn Lynch), a team for which the athlete plays (e.g., Seahawks), a location of a game that the segment depicts or a location of the team for which the athlete plays (e.g., Seattle), a conference (e.g., NFC) to which the team belongs, one or more actions or events depicted in the segment (e.g., Rushing, Touchdown), a quantity associated with an action (e.g., 8 yards, as applied to rushing), a position played by the athlete (e.g., running back), a date on which the content or segment was generated and/or on which the athletic event was played, a time at which the content or segment was generated and/or at which the athletic event was played, a source from which the content came (e.g., ESPN), and an opposing team whether or not depicted in the segment (e.g., vs. Chargers). Of course, the tags 804 depicted in FIG. 8 are merely examples, and numerous additional or alternative tags may be used, depending on the subject matter depicted in the segments and when/how the segments are to be provided to individual users.

The tags 804 may include tags provided with the incoming content, tags generated automatically (e.g., by the tag extraction module 702), tags generated manually (e.g., by the human input tag module 704), and/or tags generated semi-automatically using both of the tag extraction module 702 and the human input tag module 704. In some examples, the stats 802 may be generated from the tags 804 or may be obtained from another source. For instance, the stats 802 may be obtained from a website or web service such as Gametracker, by Yahoo! Corporation. In some examples, the stats 802 may be configured to be presented to the user along with the segment on a display of the user's client device, while the tags 804 may be used to determine what content is to be served to the user's client device but is not configured to be presented to the user along with the segment. That is, the stats 802 are intended for viewing or other consumption by the user, while the tags 804 may form a basis upon which segments are identified and prioritized for transmission and/or consumption by individual users.

In some examples, each tag may include a score indicative of relevance of the tag to a segment, specificity of the tag to the segment (e.g., is the tag a general term such as "running back" that may be applicable to a large number of segments or a more specific term such as a specific athlete's name), historical importance of the tag to users (e.g., how has this tag been ranked in the past as applied to other segments), number of times the tag was associated with this segment (e.g., if the segment has been tagged by multiple manual and/or automatic sources), etc. In the illustrated example, higher scores are better (i.e., more relevant, more specific, more important, more frequent, etc.) than lower scores. For instance, in FIG. 8, the tag Marshawn Lynch has a tag score of 3 because it is very relevant (corresponding to an athlete depicted in the segment) and very specific (corresponding to an individual athlete as opposed to a class of athletes). Conversely, the term running back has a tag score of 1, because it is more general and is of less historical importance to users.

In some examples, the tags 804 may include a fantasy score tag, which may be usable to designate a number of fantasy points attributable to one or more events depicted or described in the segment. If included, the fantasy score tag may be populated with an absolute number of points attributable to one or more events in the clip (e.g., 6 points) or may serve as a place holder to receive to receive a score specific to a particular user based on the fantasy sports platform(s) in which the user participates. For instance, the score may be inserted at the time of tagging, when the segment is transmitted to a user's client device, when the segment is added to a queue for transmission to the user's client device, etc. Additionally, the fantasy score may be calculated and populated directly by the interleaver service, or may be scraped from the one or more fantasy sports platforms that the user participates in (e.g., by the interleaver service 114 or the interleaver client application 342).

The tag scores may be used in combination with user preferences or weights in determining which segments to serve to a particular user and when. By way of example and not limitation, if client device's buffer 344 is relatively full, only segments with high tag scores may be served.

While in this and other examples the statistics and/or tags are shown as being assigned to and stored with the segments in the content store 314 in advance, in other instances, the tags may be assigned and/or appended to the segments at other times, such as when the segments are placed in the content queues 332 or when they are transmitted to the client devices 118. This may be the case when, for example, there is a reason to tag a segment differently for different users (e.g., the segment is relevant to different users for different reasons, different users are entitled to different fantasy points for the segment, etc.). In still other examples, some tags (e.g., tags describing subjects or events in the segment) may be stored in association with the segments in the content store 314, while other tags (e.g., fantasy points attributable to one or more events in the segments) may be appended to the segments when the segments are placed in a content queue for a specific user or when the segment is transmitted to the client device of the specific user.

Example Subscriber Profiles

Figure 9:
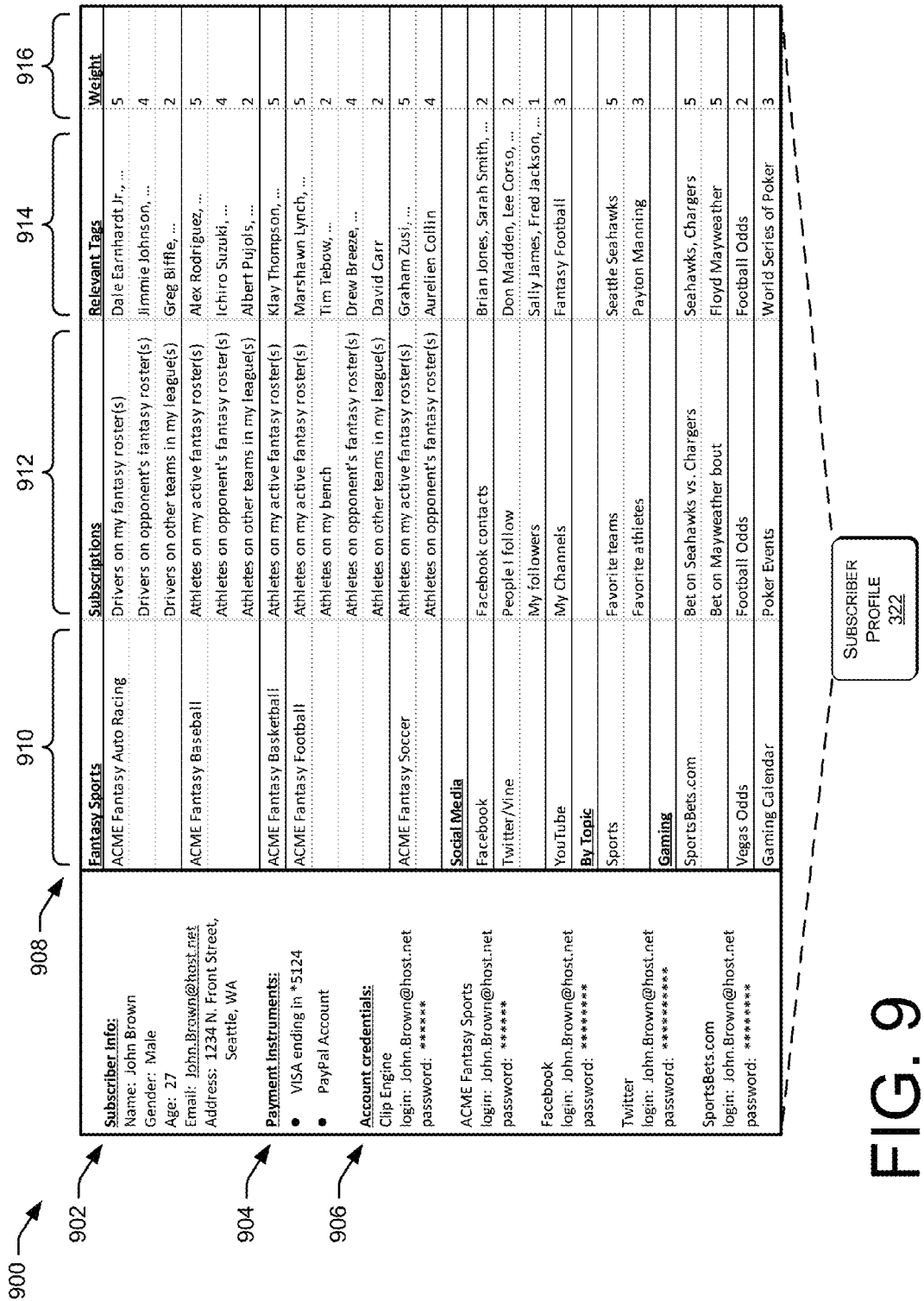
FIG. 9 is a table representing an example subscriber profile.

FIG. 9 is a schematic diagram illustrating details of an example subscriber profile 322. Generally, each user of the interleaver service 114 has a corresponding subscriber profile. The subscriber profile 322 may be stored as a table 900 or other data structure in the subscription store 324 or elsewhere in memory 304 of or accessible to the interleaver service 114. In some examples, table 900 (or portions of the table, or information from or based upon the table) may be presented in a user interface for viewing and/or editing by the user and/or administrators of the interleaver service 114. In operation, the interleaver service 114 may compare and/or contrast information for a particular user contained in the subscriber profile 322 and/or table 900 with tagging information contained in one or more tagged segments 800. In one aspect, the interleaver service 114 may determine if athlete, team or other tagging information in any tagged segment 800 is relevant with respect to fantasy athlete/fantasy team and/or other information in a user's subscriber profile. Based on that relevance, the segment 800 may be sent (with or without actual tagging information) to the user's client device. Accordingly, each user may receive custom content 116 that includes audio/video segments depicting athletes performing in a manner that has relevance to the user's fantasy team and/or the user's other interests, while not receiving other segments having less or no relevance to the user's fantasy team.

The subscriber profile 322 of each user includes subscriber information 902 about the user, such as name, contact information (e.g., email address, phone number, physical address, etc.), demographic information (e.g., gender, age, etc.), socioeconomic data (e.g., marital status, income level, family members, etc.), and the like. The subscriber information 902 may be provided by the user, such as at the time of account creation, during installation or set up of the interleaver client application 342, or during use of the interleaver service 114 (e.g., based on click stream activity, based on user responses to questions or prompts, based on user interaction with presented content or ads, or based on annotations, comments, or messages the user provides, etc.). Additionally or alternatively, at least a portion of the subscriber information 902 may be derived or inferred by the interleaver system 114 based on, for example, a type or types of client device(s) the user uses to access the interleaver service, an internet protocol address of the device(s) the user uses to access the interleaver service, times of day at which the user accesses the interleaver service, or other contextual information.

In some examples, subscriber profile 332 may also include payment information 904, such as credit card numbers, bank accounts, payment accounts (e.g., PayPal, Square Wallet, Google Wallet, etc.), Bitcoin, or other payment instruments or modes. The payment information 904 may be used, for example, to allow users to pay for access to the interleaver service 114, to pay for access to certain content provided by the interleaver service 114 (e.g., proprietary content of one or more content sources), to pay for in-app purchases, or any other financial transactions related to the interleaver service 114. The payment information 904 may additionally or alternatively allow users to receive payment from the interleaver service 114 and/or other users of the interleaver service For instance, user's may be able to earn money or other compensation for tagging segments via a crowd sourcing platform, for providing annotations or comments on segments, and/or for providing content to the interleaver service 114 for distribution to other users. The amount of compensation earned by the users may be based at least in part on the quantity and/or quality of the tags, annotations or comments, and/or content provided by the user.

In some examples, the interleaver service 114 includes a complete fantasy sports platform, including infrastructure to support creation and operation of fantasy sports leagues and teams in which users can participate. That is, users can join one or more fantasy sports leagues and/or teams administered by the interleaver service. Additionally or alternatively, the interleaver service 114 may work in conjunction with one or more other accounts of the user, such as other fantasy sports accounts, social networks, gaming accounts, or the like. In that case, the interleaver service 114 may provide custom content related to and/or based at least in part upon the other accounts of the user. However, the interleaver service 114 may not provide the underlying functionality of the other accounts. In the fantasy sports context, the interleaver service 114 may serve custom content including segments depicting events related to one or more of the user's fantasy sports accounts. For instance, the interleaver service 114 may present segments depicting athletes on one or more of the user's fantasy sports rosters, athletes on an opponent's fantasy sports roster, athletes on a roster of other members of the user's fantasy league(s), events resulting in fantasy points being awarded or decremented to the user, or the like. In other contexts, the interleaver service 114 may serve the user one or more segments including information from, or based at least in part on, the one or more other accounts. For instance, the interleaver service 114 may present segments depicting subject matter (e.g., video, audio, images, text, etc.) from the one or social networking accounts (e.g., Facebook, Twitter, Instagram, etc.), one or more gaming accounts (e.g., a sports book account, a gambling account, a game, etc.), a media account (e.g., Youtube, Netflix, Hulu, etc.), or other accounts of the user.

The subscriber profile 332 also includes account credentials 906 for the interleaver service 114 (the user facing portion of the interleaver service is named Clip Engine in this example). The account credentials 906 may additionally or alternatively include account credentials for one or more other accounts of the user. In the illustrated example, the account credentials 906 include credentials for fantasy sports services other than Clip Engine of which the user is a member (ACME Fantasy Sports in this example). In other examples, the user may have accounts with other fantasy sports services, in which case account credentials for those other accounts may be included as well. In this example, the account credentials 906 further include credentials for social media accounts of the user (Facebook and Twitter in this example), a gaming account of the user (SportsBets.com in this example), and potentially other accounts (not shown). The account credentials for each account may comprise any credentials needed to log in to or otherwise access the account or service. By way of example and not limitation, the account credentials for each account may comprise a login name, email address, password, pin, digital certificate, watermark, hash, biometric information (e.g., finger print, retinal scan, facial recognition, voice recognition, etc.), or the like.

By including the account credentials of the one or more other accounts, the interleaver service 114 is able to access the other accounts to obtain information usable to, among other things, provide the user with the custom content. For instance, the interleaver service 114 may access other fantasy sports accounts to obtain information about the user's fantasy league(s), team(s), roster(s), fantasy points and/or rules of how fantasy points are awarded, identify which fantasy athletes are active and which are benched, and the like. In other examples, the interleaver service 114 may access other social media accounts to identify social media contacts of the user, determine topics of interest to the user and/or the user's social connections, and in some instances to obtain content (e.g., photos, videos, etc.) from the social media accounts. In still other examples, the interleaver service 114 may access one or more gaming accounts of the user to determine outcomes (e.g., sporting events, elections, etc.) on which the user has placed bets, people against whom the user has bet, games the user has played, etc. In some examples, the interleaver service 114 may access the one or more other accounts by calling an application programming interface (API) of the service to which the account belongs. The interleaver service 114 may use information obtained by accessing the other accounts and/or other information to determine which content segments in which the user is likely to be most interested and, therefore, which segments to include in the user's custom content stream. The interleaver service 114 may additionally or alternatively use this information to identify ads to serve to the user, an order in which to serve the content segments and/or ads, or for other purposes.

For instance, the subscriber profile 322 may include subscription information 908 defining various topics of interest to the user based on the information obtained from the accounts. The subscription information 908 is shown in tabular form for ease of explanation, but in other examples may be stored and/or presented in any form. In the illustrated example, the subscription information includes an entry 910 for each account (or sub account thereof) for which account credentials are provided. Entries 910 may also be included for other items such as "topics" of interest, websites or services that don't require an account or credentials, or any other item that is usable to identify topics that may be of interest to the user.

In the illustrated example, the entries 910 include four entries corresponding to sub accounts of the ACME Fantasy Sports account (namely ACME Fantasy Auto Racing, ACME Fantasy Baseball, ACME Fantasy Basketball, ACME Fantasy Football, and ACME Fantasy Soccer). The entries 910 also include entries for social media accounts (namely Facebook, Twitter/Vine, and YouTube) and a gaming account (namely SportsBets.com). The entries 910 also include an entry for a topic of interest to the user (namely "Sports") and several other sites or services that do not require an account to access (namely Vegas Odds and Gaming Calendar).

For each of the entries 910 the subscriber profile 322 includes one or more subscriptions 912 about which the user desires to receive content segments. For instance, the entry 910 entitled "ACME Fantasy Auto Racing" includes subscriptions 912 to "Drivers on my fantasy roster(s)," "Driver(s) on opponent's fantasy roster(s)," and "Drivers on other teams in my league(s)." As another example, the social media entry 910 for "Facebook" includes subscriptions 912 to "Facebook contacts." As yet another example, the entry 910 for the topic "Sports" includes subscriptions 912 to "Favorite Teams" and "Favorite Athletes." In some examples, the subscriptions may be predefined by the respective services to which the entries correspond. In some examples, the user may select the particular subscriptions he or she desires for each service (e.g., using one of the interfaces described below for managing content). In some examples, one or more default subscriptions may be set for a service, which may be modified by the user. In still other examples, the interleaver service may set one or more subscriptions based on information in the user's subscriber profile, the user's content viewing history (e.g., which segments did the user request, which segments did the user watch, skip or replay, etc.). The subscriptions 912 may be static (meaning that they remain constant over time) or they may be dynamic (meaning that they are temporal in nature and change over time or based on one or more other factors). An example of a dynamic subscription is the subscription to "Drivers on my fantasy roster(s)" which may change as the user updates his or her roster(s). Another example of a dynamic subscription is the subscription to "Drivers on my opponent's fantasy roster(s)" because the user's opponent will change from week to week, race to race, or the like.

For each subscription 912, the interleaver service 114 may determine one or more tags 914 that are relevant to the subscription. For instance, the first subscription in the illustrated example is for "Drivers on my fantasy roster(s)." The interleaver service 114 may determine (e.g., by querying the user's ACME Fantasy Sports account) the drivers on the user's fantasy roster. In the illustrated example, the user has Dale Earnhardt Jr., among other drivers, on his or her roster. Thus, "Dale Earnhardt Jr." may be added as a tag to the user's subscriber profile 322, potentially along with one or more other related tags, such as "Dale," "Dale Jr.," "Earnhardt," "Jr.," "No. 88," etc. Similarly, the interleaver service 114 may determine tags relevant to the other subscriptions of the user's subscriber profile 322. Example tags for each subscription are given in the column of tags 914. In some examples, these tags 914 are the terms that the interleaver service 114 uses to match to tags of content segments to identify segments that are relevant to or would otherwise be of interest to the particular user.

As discussed above, certain subscriptions are dynamic, meaning that they change over time or in response to events. In some examples, the tags 914 associated with a dynamic subscription may change over time. For instance, a user's fantasy opponent typically changes periodically (e.g., daily, weekly, etc.). In that case, the particular tags associated with the subscription "Athletes on my opponent's fantasy roster" may change periodically to match the user's changing opponents.

In some examples, the tags 914 may be assigned weights 916. In the example of FIG. 9, the weights are assigned to each category of tags. That is, in the illustrated example, all tags associated with a particular subscription are assigned a same weight. For instance, all tags associated with "Athletes on my active fantasy roster(s)" are assigned a weight of 5, while all tags associated with "Athletes on my bench" are assigned a weight of 2. However, in other examples, each individual tag may be assigned its own weight, regardless of the subscription that the tag is associated with.

The weights 916 may be automatically assigned by the interleaver service 114, may be default settings, may be manually set by the user (as described further below), and/or may be inferred by the interleaver service 114. For example, some or all of the weights 916 may be inferred based on other settings made by the user, the user's interaction with the interleaver service 114, segments the user has requested, segments that the user has skipped, etc.

As discussed above, certain subscriptions are dynamic, meaning that they change over time or in response to events. In some examples, the weight 916 associated with a dynamic subscription may change over time. For instance, a weight of a tag associated with a betting service may change depending on a dollar value of a user's bet placed with the service. In that case, if a user places a relatively small bet (e.g., below a preset or user-specific threshold amount) the weight may be relatively low (e.g., a weight of 2 or 3), whereas if the user places a larger bet (e.g., greater than or equal to the present or user-specific threshold) then the weight may be higher (e.g., 4 or 5). In some examples, the weight may be proportional to the size of a bet, the number of bets placed with the betting service, or any number of other factors. As another example of a weight changing over time, a weight of tags associated with a particular fantasy sports subscription (e.g., football, baseball, soccer, etc.) may be higher when the particular sport is currently in season than when it is out of season. For instance, a weight associated with a fantasy football subscription may be higher during football season than during the offseason.

The weights 916 are one factor that may be used to prioritize the segments that are provided to the user in the user's custom content stream. For instance, the interleaver service 114 may prioritize segments with tags that the user's subscriber profile ranks higher over segments with tags that the user's subscriber profile ranks lower. However, other factors may also contribute to the selection of segments for presentation to the user, such as freshness of the segments, variety of segments, number of available segments that have not yet been viewed by the user, etc.

Example User Interfaces

FIGS. 10-15 illustrate schematic diagrams of example user interfaces (UIs) that may be used by a user to interact with a customized content service, such as the interleaver service 114. However, the interleaver service 114 may employ other UIs and/or the illustrated example UIs may be used with other systems.

Figure 10:
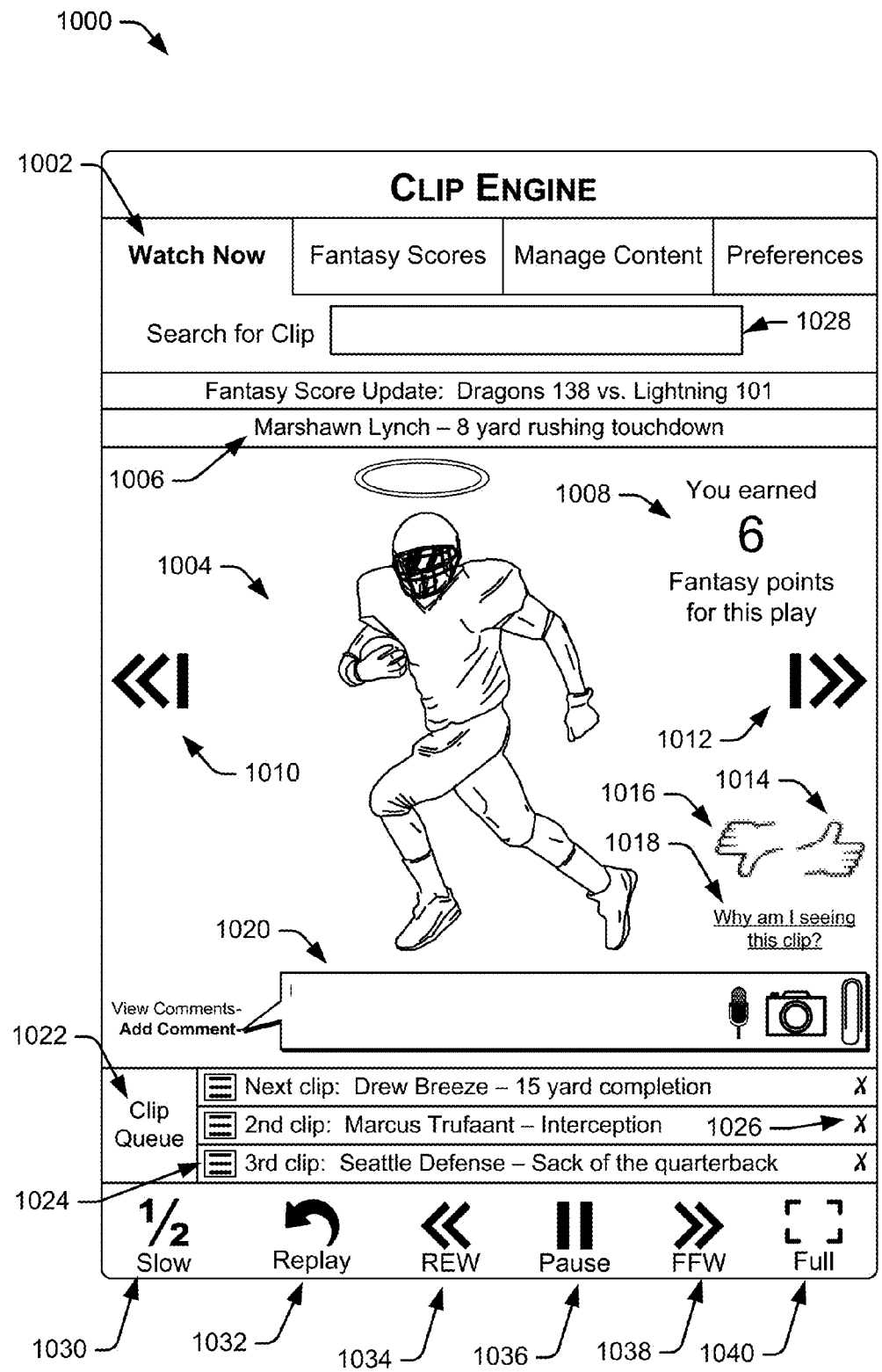
FIG. 10 is a schematic diagram showing an example user interface of a client application for presenting audio, video and/or audio-video displays to a user.

FIG. 10 is a schematic diagram of an example user interface 1000 of a client application for consuming custom content, such as a custom content stream 116 from the interleaver service 114. In the example shown, the user interface may appear on a client device, such as the client devices 118(1) through 118(N) of FIG. 1. In the example of FIG. 10, a Watch Now tab 1002 has been selected by a user, thereby invoking the user interface 1000 from among a plurality of other user interfaces, each of which may be associated with tabs or other user interface tools.

In the example shown, a clip 1004 is playing on the screen, showing an athlete performing action that earned fantasy points for the user's fantasy team. The athlete may be highlighted or indicated by a halo, shading or other feature. A headline 1006 may be used to show a description of the clip, which may be based on a perspective of the user's fantasy team. Thus, the headline "Marshawn Lynch—8 yard rushing touchdown" alerts the user to the reason that fantasy points were awarded. The number of fantasy points earned by the user's fantasy team in the clip may be indicated by a message 1008, which in the example shown is located in the upper right corner of the clip.

The user may swipe with a finger across the clip, as it plays or concludes, to move forward to a later clip, or backward to an earlier clip. A clip in mid-play may be stopped and earlier or later clips invoked. The earlier and later clips may be located in a buffer accessed by the user interface 1000, or may be downloaded from the interleaver 114 or other location such as servers or the "cloud." Skip forward and skip backward controls 1010, 1012 allow a user to move to clips in either end of a buffer, queue or other content source.

Rating indicators 1014, 1016 allow the user to rate the clip favorably or unfavorably. Such ratings may provide input to an algorithm (e.g., artificial intelligence) that govern which clips are provided to the user and to the user's queue. A "Why am I seeing this clip?" link 1018 allows the user to request information about why the clip is being provided. Possible reasons include that the clip involves fantasy points for the user's fantasy team, an opponent's fantasy team, a possible draft prospect available to the user, a favorite athlete of the user, etc.

A comment box 1020 is adapted to provide selection indicators such as: "View Comments" or "Add Comment." In the example shown, "Add Comment" is selected, allowing the user to provide a comment available to a fantasy opponent, others in the user's fantasy league, others in the user's contacts, or to the general public that may view the clip to which the comment was applied. The comments may be text, audio, audio/video or may include an attached file. Additionally, selection of the "View Comments" selector allows users to view comments left specifically to them by other users, or to view comments left by others for general consumption.

A client clip queue 1022 provides a view of clips that are available for viewing on the client device. The clips may be available locally in a buffer, or available remotely for download. The clip queue 1022 shows three clips, and additional clips may be available if the user swipes up or down. The clips are labeled in an order, i.e., "Next clip" and "$2^{nd}$ clip," etc. Tabs 1024 on each clip may be utilized by a user to rearrange an order of the clips in the queue 1022. An "X" 1026 or other tool may receive user input to remove a specific clip from the queue. The clip queue 1022 may provide links to one or more clips in response to a user query or in response to action of athletes in real life games that have relevance to a user's fantasy team and/or other interests of the user.

A search box 1028 allows a user to type a query including one or more search terms, such as an athlete's name, a type of play (e.g., touchdown, homerun, etc.), key word/tag, fantasy point type or other factors. The query may be searched by a search engine that is located on the client, and searches content already downloaded or known to the client. Alternatively, the query may be searched by a search engine that is located remotely, such as on the interleaver 114. The search may return results that are not located on the client, and which may be downloaded to the client. The results of the search may be ordered according to relevance and/or recentness, or other factors. In some examples, the user indicates factors used to order the search results.

A number of tools may be provided by the user interface 1000. In the example of FIG. 10, a half-speed or slow tool 1030 allows a user to slow the playback of a clip. A replay tool 1032 allows the user to replay an entire clip, such as a clip currently in playback mode. A rewind tool 1034 allows the user to play video of a clip in reverse direction. A pause tool 1036 allows the user to stop play of a clip. A fast forward tool 1038 allows the user to play a clip in fast motion (e.g., to play the clip at double speed). A full screen tool 1040 allows the user to play a clip using the full screen of a device. Frequency, the playback may orient the clip to play in "landscape" mode, which more nearly approximates broadcast and cable TV.

Figure 11:
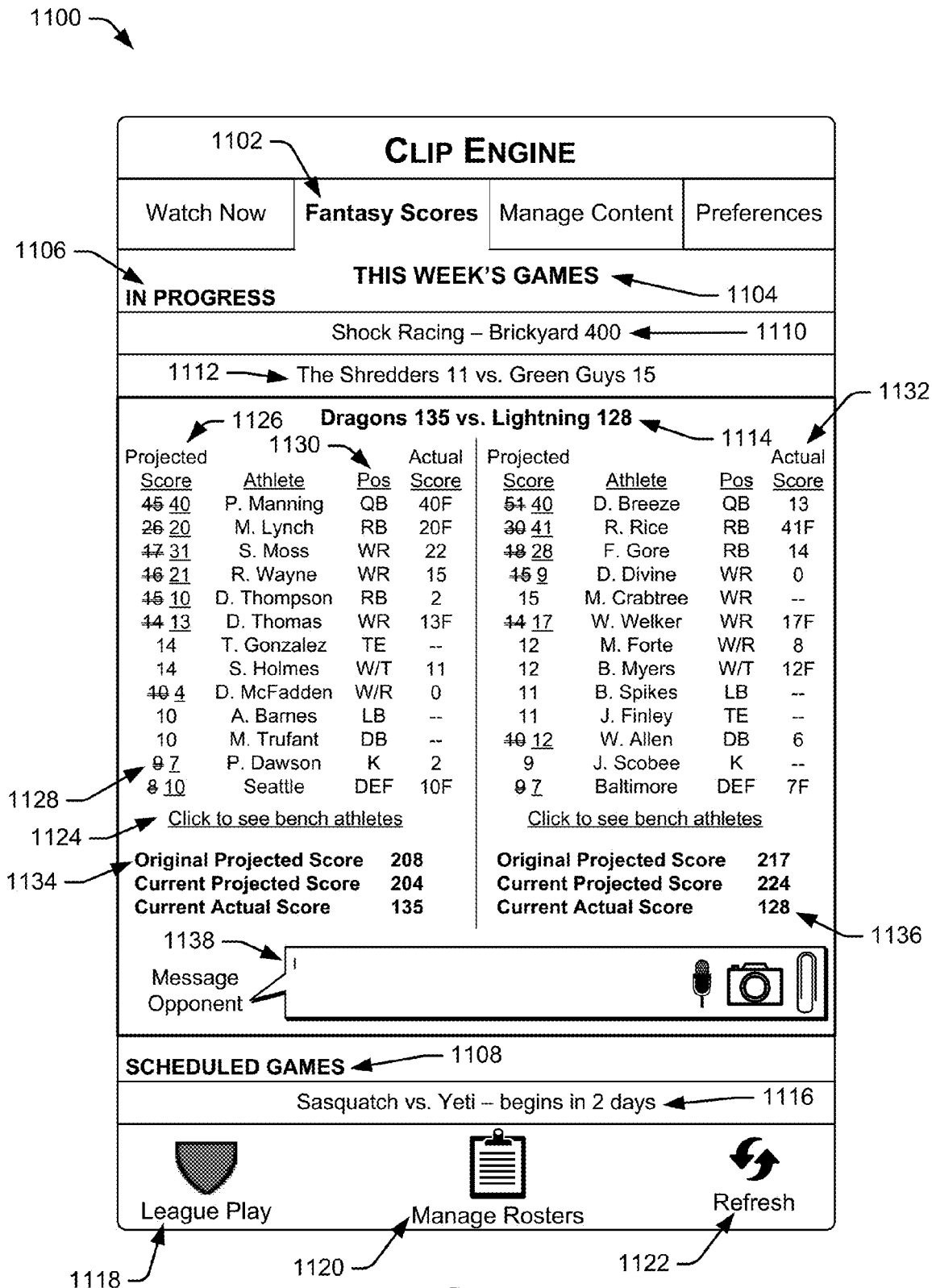
FIG. 11 is a schematic diagram showing an example user interface of a client application for presenting fantasy sports scores and other fantasy sports information.

FIG. 11 is a schematic diagram of an example user interface 1100 that presents fantasy sports scores and other fantasy sports information to a user. In the example shown, the user interface 1100 may be displayed on a client device, such as the client devices 118(1) through 118(N) of FIG. 1. In the example of FIG. 11, a Fantasy Scores tab 1102 has been selected by a user, thereby invoking the user interface 1100 from among a plurality of other user interfaces, each of which may be associated with tabs or other user interface tools.

In the example shown, the user may select This Week's Games 1104 to show fantasy games to be played in the current week (which may be based on real-life games also played in the current week). In the example of FIG. 4, the user may swipe This Week's Games 1104 left or right to reveal prior or future games, respectively. The week's games (e.g., This Week's Games 1104) may be divided to show In Progress Games 1106 and Scheduled Games 1108. In the example shown, In Progress Games 1106 may include several fantasy games in which the user is involved, including one or more games from each of one or more sports, including car racing 1110 (e.g., Shock Racing-Brickyard 400), baseball 1112 (The Shredders vs. Green Guys) and football 1114 (Dragons vs. Lightning). Later in the week, the user will be involved in the fantasy basketball game 1116 involving the fantasy teams Sasquatch and Yeti. If the user scrolls down (e.g., with a swipe of a finger) on the user interface 1100, it may be revealed that scheduled games also include fantasy games based on other sports, such as soccer, which may be similarly shown by the user interface. Any of the This Week's Games 1104 (e.g., Dragons vs. Lightning) may be selected and expanded to view a detailed scoring report, such as seen in the example of FIG. 4.

The user interface 1100 may provide a League Play icon 1118, which may reconfigure the user interface to show a plurality of fantasy leagues (if applicable) in which the user is active and allows the user to view scores of other fantasy games in the user's fantasy league(s). Thus, the user may be active in one or more fantasy football, baseball, car racing, basketball, soccer or other sports leagues, which would be displayed in response to League Play icon 1118. By selecting one of the leagues displayed, the user interface 1100 may display one or more of past games, in progress games and scheduled games. By selecting of the games displayed, the overall score and details of the scoring of individual athletes may be displayed.

The user interface 1100 may provide a manage rosters icon 1120, which may reconfigure the user interface to show a plurality of fantasy teams (if applicable) of which the user is the owner. Thus, the user may be the "owner" of one or more fantasy football, baseball, car racing, basketball, soccer or other sports teams, which would be displayed in response to Manage Rosters icon 1120.

The Manage Rosters icon 1120 may allow a user to manage rosters of one or more fantasy teams of which the user is the owner, and to thereby add or remove athletes from the user's fantasy roster(s), field athletes, bench athletes, trade athletes and to otherwise manage the user's fantasy team(s). The roster or list of athletes of a fantasy team may be maintained by a provider of the user interface 1100 or another website. Thus, while the website "ClipEngine" (shown at the top of the user interface 1100) may provide portions of the user interface, other websites may provide a user interface invoke by the Manage Rosters icon 1120 that allows the user to manage one or more fantasy teams. Thus, the user may have teams hosted by one or more websites, which may be accessed by icon 1120.

A Refresh icon 1122 may be configured to refresh any displayed information, such as rosters of athletes, scores of athletes, scores of fantasy or real teams, etc. Alternatively, such information may be updated or refreshed automatically by the user interface 1100.

In the example shown in FIG. 11, the user has selected the football game 1114 between the Dragons and the Lightning. As a result, the display has expanded to show the fielded athletes. The user may click on a link 1124 to reveal benched athletes, i.e., athletes on the user's team but not fielded for play and eligible to earn points for the user. In the example shown, a projected score column 1126 shows a projected and/or predicted score 1128 for each athlete in column. The athletes may be associated with positions 1130 (e.g., quarterback, pitcher, driver, etc.). An actual score column 1132 shows an actual number of fantasy points that each athlete has scored at this point in play.

The projected score 1128 may be displayed for each of the athletes before and/or during actual play of the real-life game(s). The score may be based at least in part on past or expected performance of each athlete in list 1126. Before real-life play begins, the projected scores for each athlete may be totaled, to result in an original projected score 1134 or projected score of the user's fantasy team. In the example shown the Dragons have an original projected score of 208 points. Similarly, the Lightning have an original projected score of 217. Accordingly, based on a projection by one or more experts or statisticians indicates that the projected or predicted end game score of the Dragons vs. Lightning fantasy football game will be 208 to 217.

In some examples, an athlete's name, the athlete's actual score, or other area may be a clickable link, allowing a user request and view the sequence of plays (e.g., as a list or as sequential video clips) that resulted in the point total. Thus, a user may review the plays that resulted in fantasy point scores for the user's (or other) fantasy team.

After real-life play begins, a current actual score of fantasy points 1132 is shown for each athlete, resulting in a current actual team score of fantasy points 1136 for the user's fantasy team. Thus, as real-life play develops, athletes will score fantasy points that are tabulated at column 1132 and totaled in the summation 1136. Similarly, current actual scores for athletes on a fantasy team of the user's opponent are displayed. In the example shown, the listing of the listing of the football game 1114 also shows the current actual score of the fantasy football game.

As real-life play develops, athletes score fantasy points as a result of their efforts in their respective games. Accordingly, the listing of actual athlete fantasy point scores 1132 may be updated as play develops. Also, as some athletes have above and below average games, the originally projected score listing 1126 may become a poor estimate for their actual fantasy points scored. Accordingly, the projected athlete fantasy point score column 426 may be updated in real time as play develops. Thus, while projected fantasy point scores for each athlete may have appeared reasonable prior to play, as real-life games unfold, the projection of fantasy point scores may change.

Updating the projected total of fantasy points for each athlete, and for each team, aids in allowing team owners to assess if they are winning or losing a fantasy game. In an example, if one fantasy team owner has more athletes playing in early Sunday NFL games, that team may appear to be wining, while the opposing team, having more athletes scheduled to play in later games, is actually in a better position.

Accordingly, each minute that passes during regulation time wherein an athlete does not score a fantasy point makes it more likely that the athlete's final fantasy point score will be similar to a current fantasy point total. In contrast, the more fantasy points that a athlete scores early in the game may make it more likely that a final score will be high. An athlete's fantasy point score may be four times the athlete's score at the end of the first quarter, twice the halftime total, and one and a third the total at the end of three quarters of play. Any of these estimates, which in some examples may be updated with greater granularity (e.g., on a minute by minute basis) may prove to be more accurate than an estimate that does not take into consideration play during the game.

In one specific example, before real-life play started, the athlete Payton Manning was projected to score 45 fantasy points. However, the projected fantasy point score for Payton Manning was reduced as the game was played and it appeared unlikely he would score 45 fantasy points. Ultimately, the projection was reduced to 40 points as the game drew to a close because Manning's point total was 40 points at that time.

In another specific example, the wide receiver Moss was originally projected to receive 17 fantasy points, but has already scored 22 points in an on-going game. Accordingly, the revised projected score for Moss is 31 fantasy points. This figure is more accurate, in view of the points already scored.

In another specific example, the running back Thompson was originally projected to receive 15 fantasy points. However, failure to score fantasy points in earlier parts of the actual game have resulted in a reduction of his projected fantasy point score to 10.

In another specific example, the game involving tight end Gonzalez has not yet begun, and his fantasy point projection remains unchanged.

In another specific example, the wide or tight end Holmes was projected to score 14 fantasy points, and his score of 11 fantasy points during a portion of his game may result in reaffirmation of the original 14 point estimate.

Thus, as real-life games are played, the projected totals of each athlete's fantasy point score may be changed in a manner that considers fantasy points scored in the game and time remaining in the game.

Once a game is final, an athlete's projected fantasy score may be struck-though or removed, and replaced with the athlete's actual fantasy score in the game, thereby increasing the accuracy of the current projected fantasy score for the user's fantasy team.

The "Message Opponent" field 1138 allows the user to send a message to an opponent including text, audio, images, video, and/or an attached file. Thus, the Message Opponent field 1138 may be used for two-way text, audio, audio/video communication with opponents in a particular game or the user's league.

Figure 12:
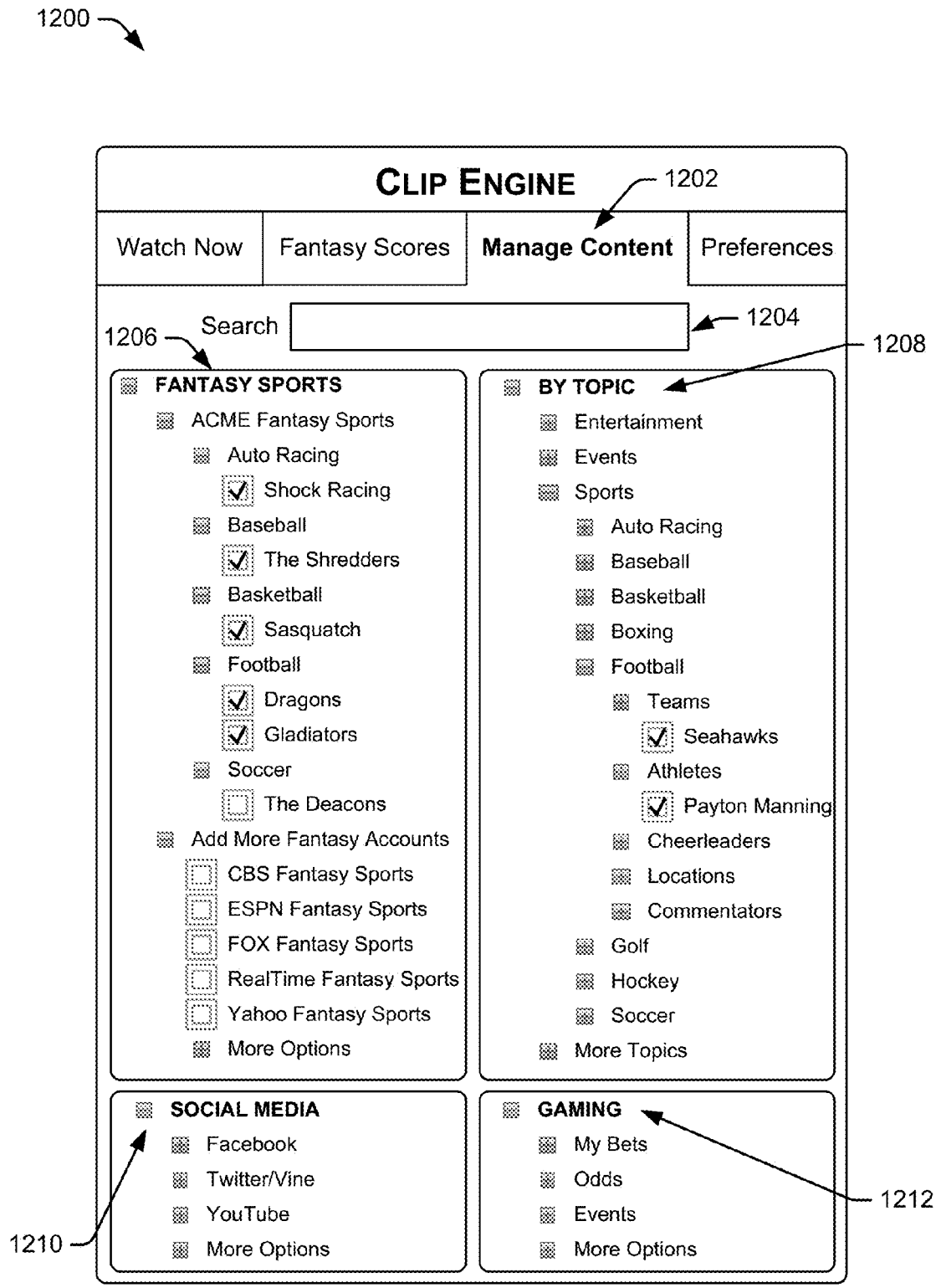
FIG. 12 is a schematic diagram showing an example user interface of a client application for designating and managing content from/about which custom content, such as a custom content stream from the interleaver service, is to be provided.

FIG. 12 is a schematic diagram of an example user interface 1200 that allows a user to manage and select content to be provided to the user. In the example shown, the user interface 1200 may be presented to a user by a central office or the interleaver service 114 (e.g., as seen in FIG. 1) to obtain subscription information from users, i.e., for allowing users to select, request and/or indicate desired content sources. In the context of the examples of FIGS. 1-3, the user interface 1200 may be configured to designate, select, request and/or otherwise manage custom content, such as a custom content stream 116 from the interleaver service 114. Using the information received from the user interface 1200, an interleaver 114 or other central office or server may access or scrape a user's existing fantasy sports accounts to obtain league, team, athlete, etc., information. In some examples, a user can indicate one or more websites (e.g., Yahoo!) that are hosting a user's fantasy sports team(s) related to one or more fantasy sports and/or leagues. Additionally, the user may indicate content in addition to fantasy sports clips that the user would like to have in the custom content provided to the user. Such clips, which may not be associated with the gain or loss of fantasy points, may provide entertainment to the user, such as at times when new and/or previously unseen fantasy-point based content is not currently available. Accordingly, the interleaver service 114 may provide and/or serve video clips and data unrelated to fantasy sports teams. The user interface 500 may be displayed on a client device, such as the client devices 118(1) through 118(N) of FIG. 1.

The interleaver service 114 or other central office and/or website may supplement existing fantasy sports outlets (e.g., Yahoo! or ESPN, etc.), or may include an integrated fantasy sports platform that may provide known fantasy information to users in addition to providing the innovations described herein. The user interface 500 may provide the user with a means to access the integrated fantasy sports platform as well as a means to access other fantasy sports platforms available to users. Accordingly, users can participate in multiple fantasy sports platforms, either using present technology or augmented by the techniques described herein.

In the example shown, a Manage Content tab 1202 has been selected by a user, thereby invoking the user interface 1200 from among a plurality of other user interfaces, each of which may be associated with tabs or other user interface tools. A search box 1204 is displayed, which allows the user to search for the user's fantasy teams, leagues, favorite athletes, content of interest, etc.

A fantasy sports block 1206 may be displayed. The fantasy sports block may indicate a plurality of fantasy sports platforms (e.g., Yahoo!, ESPN, etc.) that host fantasy sports competitions, leagues, teams, etc. In the example shown, ACME Fantasy Sports is such a host. ACME Fantasy Sports may host the user's fantasy auto racing team, "Shock Racing," as well as the user's fantasy baseball team, "The Shredders," and others of the user's fantasy teams in sports including basketball, football (two teams), etc. The user may add more fantasy accounts to thereby add more fantasy teams. Adding a fantasy account may involve providing the user interface with a fantasy sports provider, a user name and password to an account. Using this information, the interleaver service 114 or other server or provider may access the account and copy or scrap the information within the account. Such information, including league information, team name, athletes, etc., may be used to provide the user with appropriate clips that correspond with the user's fantasy team. By adding all of the user's fantasy sports accounts with different providers and/or by indicating the user's fantasy team(s), the user provides the user interface 1200 with information that assists the interleaver 114 to provide the user with custom content appropriate to the user. The block 1206 may show only the fantasy sports in which the user is participating or which users commonly participate, and other fantasy sports and/or other providers may be added to block 1206, such as by operation of the search box 1204. Thus, the user may have, or want to add, account or team information to one or more of the other fantasy sports platforms, such as CBS Fantasy Sports, ESPN Fantasy Sports, etc.

Custom content may be provided to the user based not only on the user's fantasy team(s), but on other topics of interest to the user. Such content may be provided as desired, such as between clips that include fantasy point information of interest to the user. Topics block 1208 in the user interface 1200 shows example or representative categories of information that the user may want to select. In the example shown, the user has selected the Seattle Seahawks and athlete Payton Manner. Thus, Topics block 1208 allows the user to select content from among a very broad range of topics. In the example of user interface 1200, the user may select content from such diverse topics a entertainment (e.g., popular culture), events (e.g., news), sports and others. Thus, in the example of FIG. 12, the user may receive a wide range of custom content, which may include video clips and other information associated with a number of fantasy teams, as well as video clips and other information related to the Seattle Seahawks, Payton Manning, etc. Video clips and other content, such as cheerleaders and commentators, may also be selected.

Cheerleaders and commentators may provide video clips which may be invoked upon a fantasy event (e.g., a touchdown by a particular team) or may be invoked due to lack of fantasy sport clips during a particular period of time. Commentators (e.g., "color" commentators) may be individuals from the athletic community or other communities, such as comedy, show business, etc. If the user is less interested in fantasy sports than the content provided by such commentators, the user may select a number of commentators using the user interface 1200.

A social media block 1210 may allow the user to communicate with others, and to share information and/or clips related to fantasy sports or other content, such as content received from the interleaver 114.

A gaming block 1212 may allow users to communicate with gaming websites and to obtain video clips that are related to wagers made on those sites of through other venues (e.g., private parties or local bookmakers). The user may games the user is wagering on (e.g., "My Bets"), and may enter other information at "Odds," "events" and "more options." Thus, while a user associated with fantasy sports may want to see video clips related to athletes on the user's fantasy team, a user that is alternatively or additionally involved in gaming may want to see video clips related to games on which the user has wagered. Thus, the user may see clips that impact the scores of games on which bets were placed, which may be interleaved with fantasy team related clips.

In some examples, the user interface 1200 may also allow a user to select content sources or providers (e.g., ESPN, NFL Network, Comcast Cable, Direct TV, HBO, etc.) from which they want to or are entitled to receive content (i.e., sources from which the custom content may be assembled). In some examples, certain content sources may be free content sources available to all users, while other content sources may be premium content sources that are available for an additional fee. In some instances, a user may be entitled to premium content based upon one or more separate subscriptions to the respective premium content source.

Figure 13:
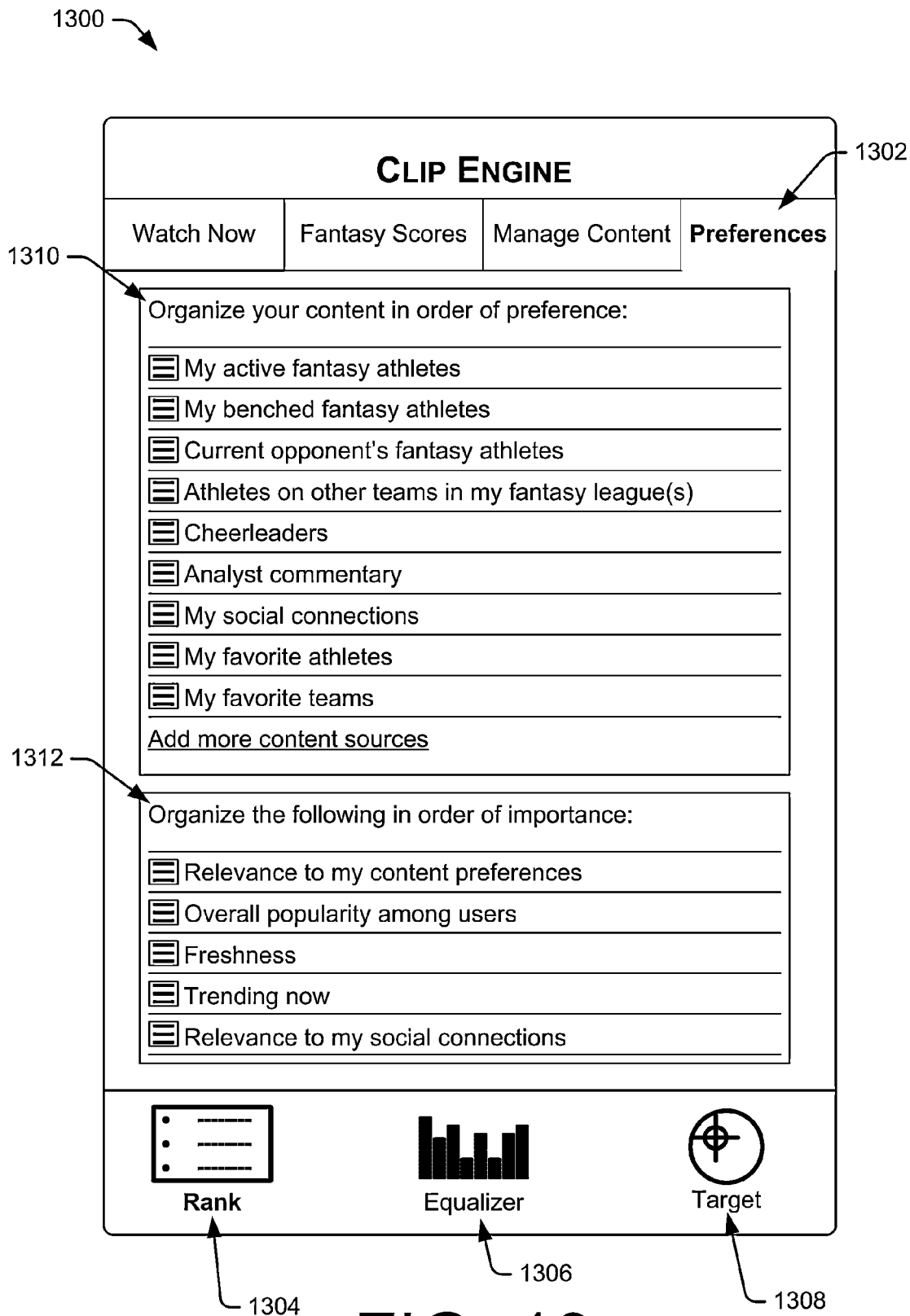
FIG. 13 is a schematic diagram showing an example user interface of a client application usable to set preferences for various types and sources of content by setting a relative rank of the types and sources of content.
Figure 14:
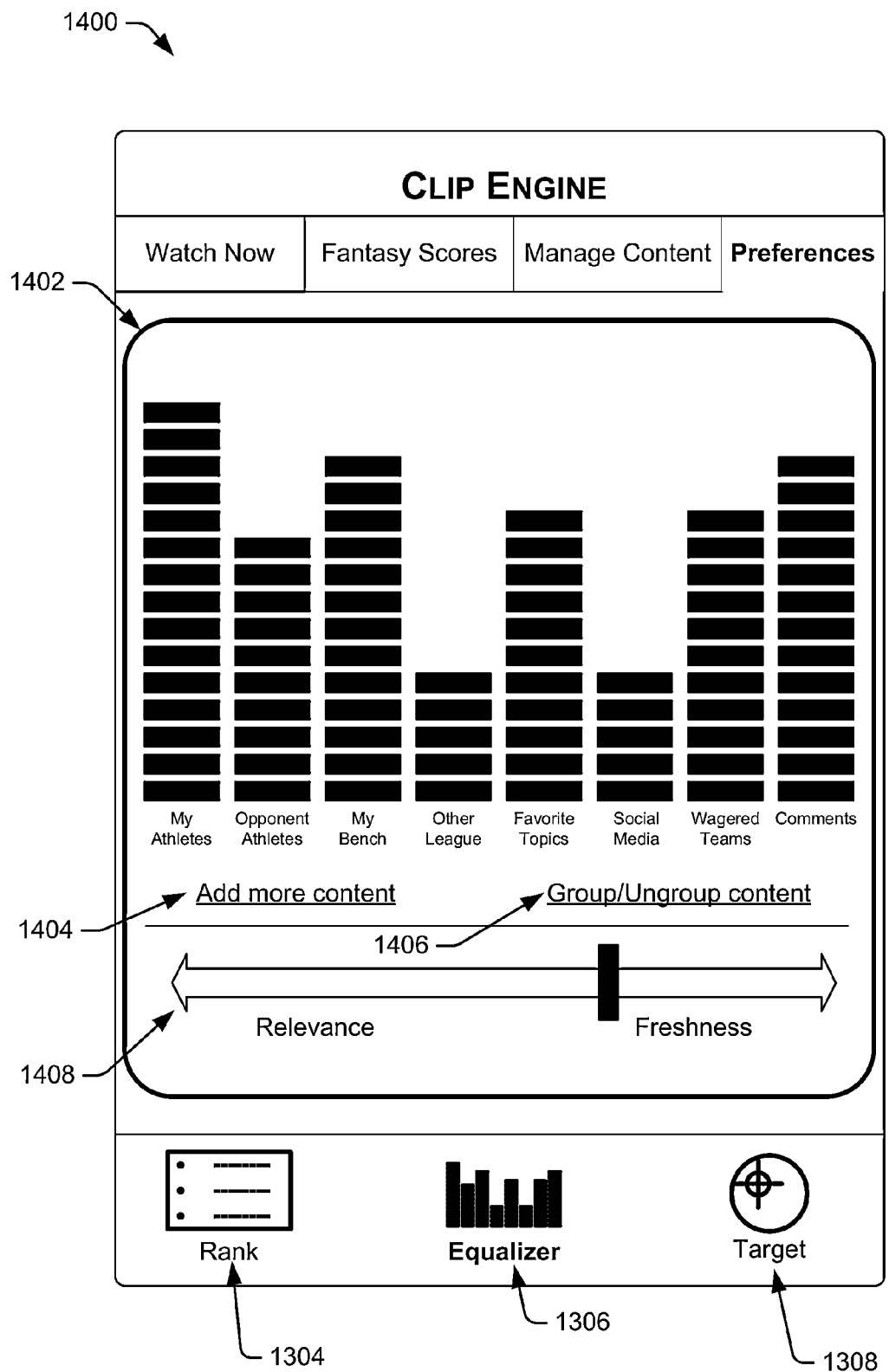
FIG. 14 is a schematic diagram showing other examples user interface of a client application usable to set preferences for various types and sources of content by setting an equalizer to weight the various types and sources of content.
Figure 15:
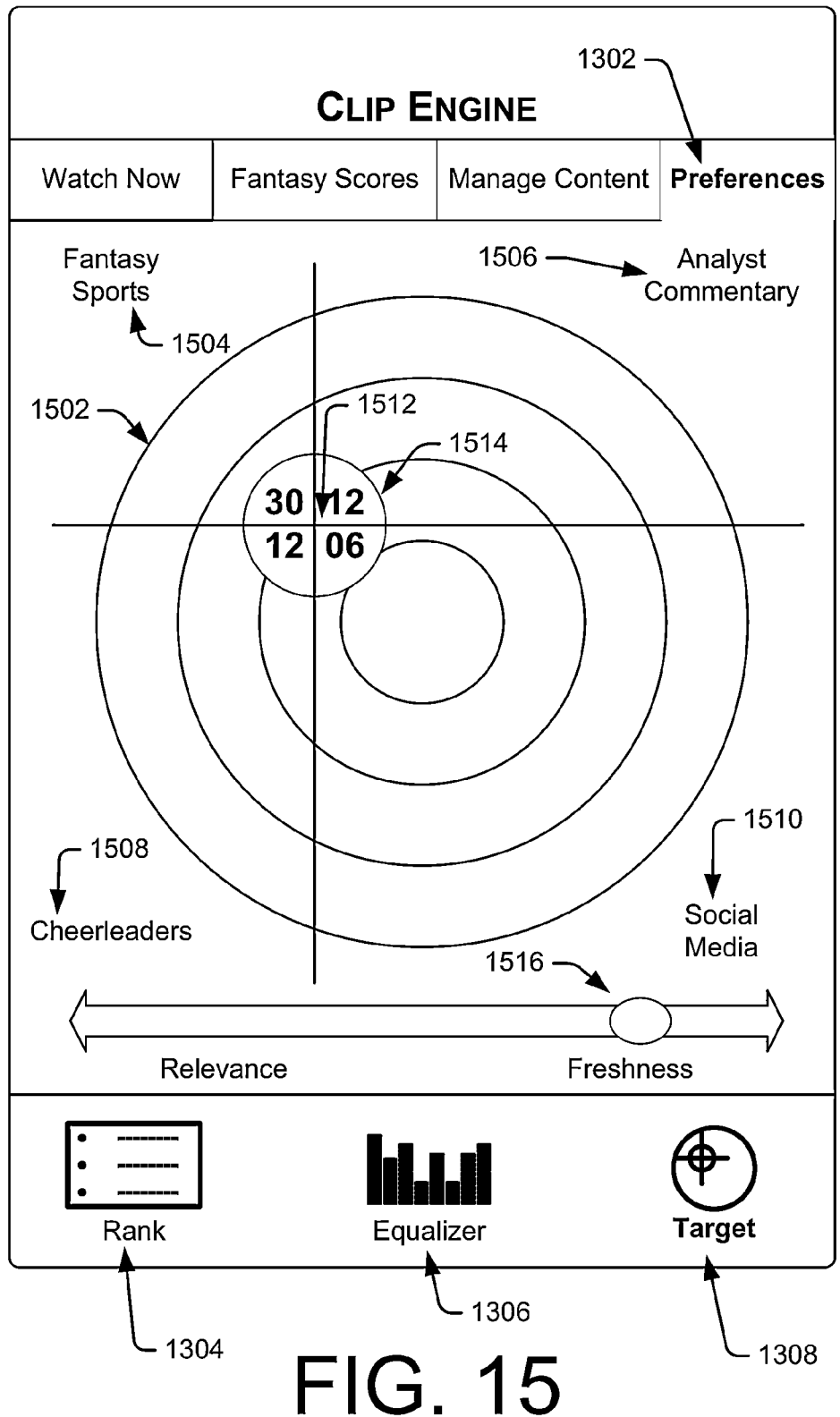
FIG. 15 is a schematic diagram showing yet other examples user interface of a client application usable to set preferences for various types and sources of content by moving a target to weight the various types and sources of content.

FIG. 13 is a schematic diagram of an example user interface 1300, operable on a client application or device, and configured obtain user preferences and relative preferences for various types and sources of content to be sent to the user. In the example shown, a Preferences tab 1302 has been selected by a user, thereby giving the user a choice between a Rank tab 1304, an Equalizer tab 1306 and a Target tab 1308. In the example of FIG. 6, the Rank tab 1304 has been selected by a user, thereby invoking the user interface 1300. The Equalizer user interface 1400 and the Target user interface 1500 are shown in FIGS. 14 and 15, respectively.

The Rank user interface 1300 allows a user to rank categories of content, to thereby assist the interleaver 114 in prioritizing custom content to be transmitted to the user. The arrangement of the content types, from higher priority (top of the list) to lower priority (bottom of the list) indicates a priority of the user for the content sent by the interleaver service 114 or other server or central office. In the example shown, an "Organize content in order of preference:" block 1310 is configured to allow the user to manually arrange a plurality of content types. Thus, the "grip" on the left side of each content type, such as "My active fantasy athletes," can be used to move a content type up or down on the priority list.

A number of representative examples of content types are shown. The first content type, "My active fantasy athletes" corresponds to the "fielded" athletes (i.e., athletes not sitting on the fantasy team bench). Thus, the user's highest priority may be the fielded athletes of the user's fantasy team. A second content type, "My benched fantasy athletes," may be a second priority. Alternatively, the user may want to elevate "Current opponent's fantasy athletes" to the second position. The content type "Athletes on other teams in my fantasy league(s)" allows the user to view clips of athletes that are probably of very high caliber and which are of general interest. The user may also want to manually position "Cheerleaders" and "Analyst commentary" as desired. These content types may include video clips that do not directly relate to the scoring of fantasy points. However, the cheerleader celebration may follow a play that resulted in fantasy points, and the analyst commentary may describe that play. The content type "My social connections" may govern the priority of content that is provided by people or organizations to which the user is connected, such as by Twitter, Facebook or other social services. The user may want to elevate the importance of the content type "My favorite athletes," even though these athletes may be on other user's fantasy teams. Thus, the user may enjoy video clips of favorite athletes, even though their exploits do not result in fantasy point gains. Similarly, the user may enjoy highlight video clips of the user's favorite real life teams, even when they have not fantasy point relevance. The content types shown are representative, and other content sources may be added, substituted or utilized, or provided by the user, the user's league, the interleaver service or other entity.

A block 1312 labeled "Organize the following in order of importance:" allows the user to apply a second hierarchy of inputs to the prioritization of content sent to the user. A number of representative example inputs are shown. In some examples, "Relevance to my content preferences" allows the user to balance what is important to the user (e.g., as discussed with respect to block 614) with other factors, such as the second factor, "Overall popularity among users." Thus, the user may balance the incoming content to include content that may be important to the user's friends. The user may rank "Freshness" higher or lower, depending on preferences. For example, a clip showing an important play may be several hours old, when the user begins to view the user interface 400. Whether such a clip is provided to the user may be based at least in part on how highly the "Freshness" factor is rated, and also on a number of alternative clips available. The "Trending now" factor is another opportunity for the user to determine if the user wants to see more of what is important to the user's fantasy and favorite teams, or if the user wants to branch out and see content of interest to others. Similarly, the factor "Relevance to my social connections" allows the user to adjust how much time is to be spent watching what is important to others.

FIG. 14 is a schematic diagram of an example user interface 1400, operable on a client application or device, and configured obtain user preferences and relative preferences for various types and sources of content to be sent to the user. In the example shown, a Preferences tab 1302 has been selected by a user, thereby giving the user a choice between a Rank tab 1304, an Equalizer tab 1306 and a Target tab 1308. In the example of FIG. 7, the Equalizer tab 1306 has been selected by a user, thereby invoking the user interface 1400.

A block 1402 may display a plurality of vertical bars of different height. The height of each bar represents a priority assigned by the user of a labeled content type relative to other labeled content types. The user may adjust the height of each bar, such as by tapping on it, pulling it or otherwise manipulating it, such as with manual or keypad input. The tallest bar, having the highest priority assigned by the user, represents "My Athletes." Accordingly, content related to athletes on the user's fantasy team is given the highest priority when forming the custom content 116 (e.g., FIGS. 1 and 2) for the user. Thus, if there is an excess of content available or an issue of what content to send first, content related to athletes on the user's fantasy team is given priority.

Secondary priority is given to content related to "My Bench," i.e., the athletes on the bench of the user's fantasy team. Priority may also be given to "Comments," which may include content generated by others, such as those in the user's fantasy league, or may include color commentary from pundits with discussion of athletes in video clips for which fantasy points were awarded points. Alternatively, the pundits may have comments that are related to interests of the user, which may or may not be related to video clips for which fantasy points were awarded.

Other topics may be displayed, such as "Other League," which allows a user with two fantasy teams in two fantasy leagues to assign priority to content related to the second team. "Favorite Topics" allows the user to assign a priority to topics of interest vs. the priority given to other topic expressly listed. "Opponent Athletes" allows the user to assign a relative priority to content related to athletes on a fantasy team of an opponent (e.g., someone within the user's fantasy league).

"Social Media" allows the user to assign a priority to content generated by social media. For example, friends and owners of other fantasy teams may communicate with each other using postings to social media. Such postings may be used to generate content that becomes interwoven into the custom content 116 of the user. While some users may feel that such comments distract from video clips of athletes, other users may participate in fantasy sports simply as a tool to more frequently interact with their friends and may give higher priority to this content source.

"Wagered Teams" provides the user with the opportunity to increase the content related to certain games, teams or athletes on whom the user has made bets. Thus, the user may utilize the interleaver 108 to generate custom content related to the user's gambling.

An "Add more content" link 1404 allows the user to add more content types into the content bar graph. By clicking the link 1404, the user may be presented with a popup interface which allows the user to select one or more content types (e.g., by check boxes or other user interface technique). In on example, by selecting "Add more content" link 1404, the user can add equalizer columns for additional content sources or topics and may specify a preference rating (number of bars) for each column.

If the user adds a number of additional content types, the field may become crowded. The "Group/Ungroup content" link 1406 allows the user to set preferences for groups of related content (e.g., Favorite Athletes, Favorite Teams, and Favorite Plays may all be grouped together as "Favorite Topics"). Alternatively, the user could ungroup the "Favorite Topics" to provide separate preference ratings for each of Favorite Athletes, Favorite Teams, Favorite Plays, or any other favorite topics.

A "Relevance vs. Freshness" slider or device 1408 allows the user to move a slider or other user interface device to provide a relative priority between older but otherwise more relevant content vs. fresher but less relevant content. This helps the interleaver service 108 decide between sending the user a video clip of a favorite athlete on a favorite team scoring a touchdown earlier in time (e.g., before the user activated the user's device) or a less favorite athlete who just scored a touchdown.

FIG. 15 is a schematic diagram of a third example user interface 1500, operable on a client application or device, and configured obtain user preferences and relative preferences for various types and sources of content to be sent to the user. In the example shown, a Preferences tab 1302 has been selected by a user, thereby giving the user a choice between a Rank tab 1304, an Equalizer tab 1306 and a Target tab 1308. In the example of FIG. 8, the Target tab 1308 has been selected by a user, thereby invoking the user interface 1500.

A target 1502 may include two or more topics 1504-1510, which may be labeled outside the target. In the example of FIG. 15, four topics are shown: Fantasy Sports, Analyst Commentary, Social Media and Cheerleaders. By moving the crosshairs 1512 to different locations within the target, the relative contributions of the four topics in the custom content stream 116 (e.g., FIGS. 1 and 2) may be controlled by the user. Thus, the user may want to emphasize Fantasy Sports, and associated video clips related to the user's fantasy sports team(s). The user may also want to emphasize Analyst Commentary. The user may want to replace one of the topics with a different topic, and may do so by techniques such as press-and-hold the topic to be removed, and selection of a new topic in a drop-down menu that results. Accordingly, the user may exercise control over the content and nature of the custom content stream 116 sent to the user.

The gray numbers 1514 close to the crosshairs 1512 may show minutes or hours of each desired content type. Alternatively, the gray numbers 1514 may show relative percentages (which may total up to 100%) of the custom content stream that is related to each of the four topics. If the total of the relative percentages does not total 100%, then other types of content may be provided by the interleaver service 108.

A relevance vs. freshness slider or device 1516 may be configured as seen in FIG. 14.

Example Processes for Providing Custom Content

FIGS. 16-19 are flowcharts illustrating example processes 1600, 1700, 1800, and 1900 for providing custom content. For ease of understanding, the processes of FIGS. 16-19 are described in the context of the interleaver service 114, the segment 500A, and the content feed 600. However, the processes are not limited to performance with these examples and may be performed using other systems and devices and other content to generate other segments. In some examples, the processes 1600, 1700, 1800, and 1900 may be performed independently, while in other examples operations of some or all of these processes may be used together, rearranged, combined, and/or modified.

Figure 16:
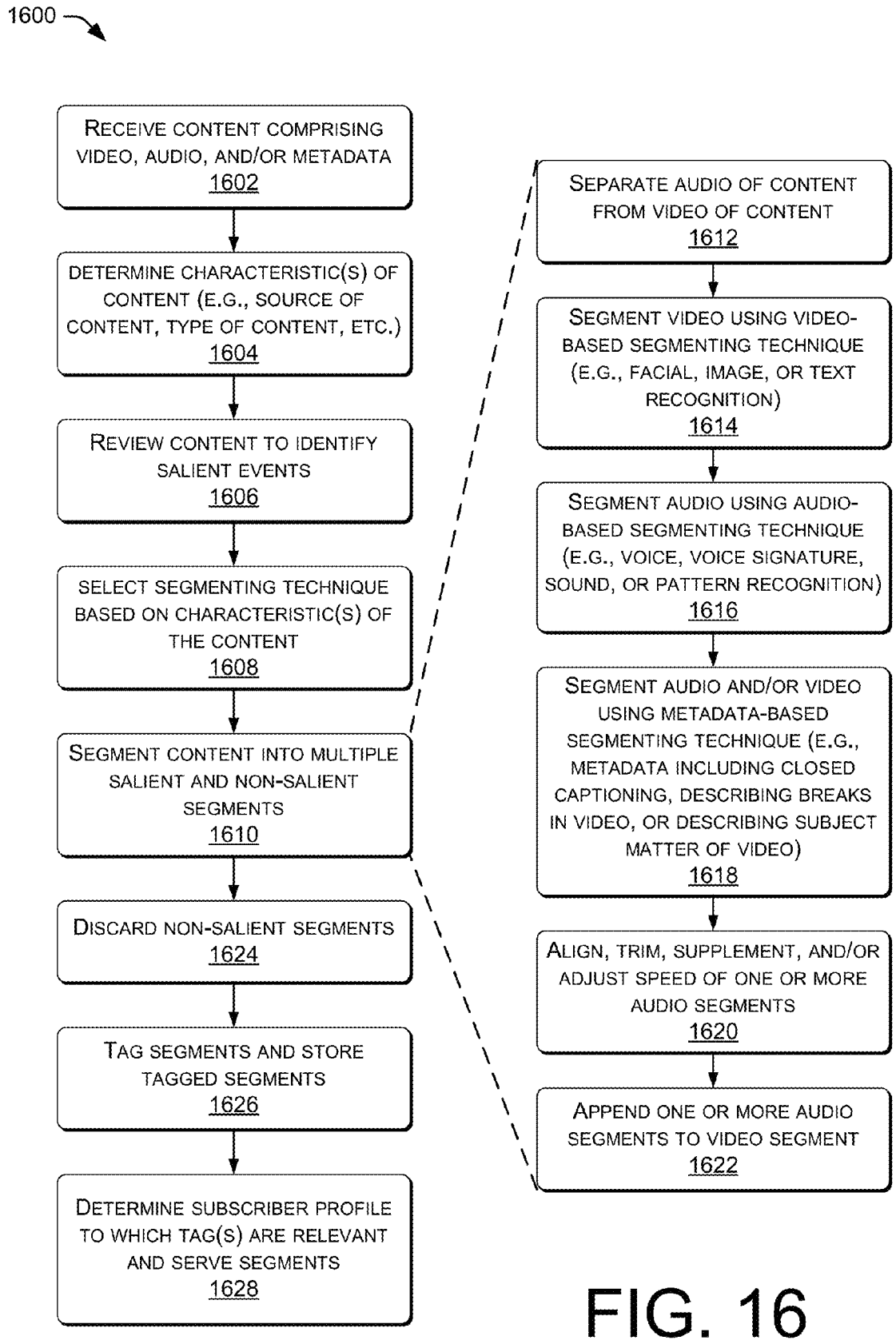
FIG. 16 is a flowchart illustrating an example process of providing custom content, with a focus on a segmenting portion of the process.

FIG. 16 shows a process 1600, which includes techniques for providing custom content, with a focus on a segmenting portion of the process. The process 1600 includes, at block 1602, receiving content (e.g., content 102) at an interleaver service (e.g., interleaver service 114 or other custom content providing service) from one or more content sources (e.g., content sources 104). The content may comprise one or more of video, audio, audio/video, text, images, metadata, etc. For instance, the content may be received from television networks, radio stations, websites, social networks, and/or other content sources. In some examples, the content may include sporting events (e.g., football games, baseball games, basketball games, soccer matches, hockey games, auto races, boxing matches, or the like). For instance, the interleaver service may receive multiple concurrent content feeds (e.g., multiple concurrent sporting events) from multiple different sources (e.g., multiple different television networks, radio stations, or other content providers). In some examples, the received content may include predefined frames, tracks, chapters, scenes, and/or other segments, while in other examples the content may be received free of predefined segments. In some examples, the content may be received as one or more discrete blocks or chunks of content (e.g., discrete programs or games), while in other examples the content may be received as a continuous ongoing feed or stream of content (e.g., a broadcast television channel). The interleaver service may further receive data from one or more websites or other data sources that host fantasy sports leagues and teams, statistics, analysis, odds. The interleaver service may additionally or alternatively receive advertisements (e.g., ads 110) from one or more ad sources (e.g., ad sources 112).

At block 1604, characteristic(s) of the received content are determined. The characteristics may include a content source (e.g., a television network, radio station, cable company, satellite television company, website, service, or other content provider), a type of content (e.g., audio, video, images, text, metadata), or other characteristics of the content (e.g., format, compression, resolution). The characteristic(s) of the received content may at least partially dictate how the content will be processed by the interleaver service (e.g., the type of video, audio, image, or other processing to be applied).

At block 1606, the content may be reviewed to identify salient events, such as portions of content that depict or describe events resulting in fantasy points, desirable commentary, cheerleaders, colorful fans, etc. In examples where the content includes multiple types of content (e.g., audio, video, images, text, and/or metadata), the different types of content may have different salient portions. For instance, some salient video content may not have corresponding audio content and vice versa. Further, in many cases, salient audio portions may not align with salient video portions, closed captioning, or other metadata.

At block 1608, a segmenting technique may be selected for the content based at least in part on characteristics of the content. In some examples, automated segmentation may be performed. Such segmentation may recognize (e.g., by operation of software) the starting and ending points of a "play" or other segment of content. Such a system may recognize a hike in football, the ball coming into play in basketball or soccer, a pitch in baseball, a player entering a field of view, a speaker starting to speak or mentioning a particular athlete by name, an athlete's name included in closed captioning text, etc. In some examples, multiple segmenting techniques may be applied in parallel or sequentially.

At block 1610, the content may be segmented into multiple salient and/or non-salient segments. For instance, received content corresponding to a television broadcast of a sporting event may be segmented into multiple salient segments corresponding to portions of the content that are likely to be interesting to users of the interleaver service, and multiple non-salient segments that are unlikely to be interesting to users of the interleaver service. In some examples, salient segments may comprise segments depicting or describing events that result in awarding or decrementing of fantasy points. In some examples, salient segments may comprise segments depicting or describing events for which statistics are maintained by a governing body (e.g., the National Football League, Major League Baseball, the National Basketball Association, National Association of Stock Car Racing, National Collegiate Athletic Association, etc.). In some examples, salient segments may include segments depicting and/or describing individual plays, collections of plays, analysis, commentary, cheerleaders, halftime shows, colorful fans, etc. In some examples, non-salient segments may comprise content that is of little or no interest to users of the interleaver service, such as, for example, portions of the video showing periods of inaction (e.g., rain delays, huddles, timeouts, etc.) or errors or mistakes (e.g., inadvertently recorded video showing the ground or the inside of the lens cap for instance, blurred or obscured images, scrambled or blank video feeds, etc.). In some examples, non-salient video segments may include advertisements contained in the received content. However, in other instances, advertisements in the received content may be considered salient video segments.

A variety of different techniques may be used separately or in combination to segment the content at block 1610. In some examples, the content may be segmented based on the audio, video, and/or metadata of the received content. In the illustrated example, at block 1612, audio of the content may be separated from video of the content and/or metadata of the content. That is, for content having audio and video, the audio track may be stripped from, and/or processed separately from, the video content. For content having audio, video, and metadata, the audio and metadata may be stripped form, and/or processed separately from, the video. At block 1614, a video portion of the content may be segmented using one or more video-based segmenting techniques, such as facial recognition, image or object recognition, text recognition or optical character recognition, or the like. At block 1616, an audio portion of the content may be segmented using one or more audio-based segmenting techniques, such as voice recognition, voice-to-text conversion, voice signature recognition, sound recognition, or pattern recognition. At block 1618, audio and/or video portions of content may be segmented using metadata-based segmenting techniques, such as by analyzing metadata including closed captioning, describing breaks in video, or describing subject matter of video.

In some example, the segmenting may be performed at least in part by one or more human editors. In that case, the human editors may be personnel of the interleaver service, personnel of the content sources, crowd source workers, and/or users of the interleaver service.

Once the audio, video, and/or metadata are segmented, the interleaver service may, at block 1620, align, trim, supplement, and/or adjust a speed of one or more audio segments and/or video segments and, at block 1622, may append one or more audio segments to each video segment. For instance, in some examples, an audio segment may be aligned temporally to begin at a same time as a video segment, to end at a same time as the video segment, to be centered with respect to the video segment, or the like. In some examples, an audio segment may be trimmed (e.g., by removing a beginning portion, an ending portion, and/or one or more intermediate portions) to be substantially a same length as a video segment, or vice versa. In some examples, an audio segment may be supplemented with additional audio content (e.g., a voice over, commentary, analysis, etc.) to arrive at an audio segment having substantially a same length as a video segment, or vice versa. In some examples, an audio segment may be sped up or slowed down so as to be substantially a same length as a video segment, or vice versa.

In other examples, the content may be segmented without separating the audio, video, and/or metadata portions. That is, audio, video, and metadata of the received content may be segmented concurrently with the content intact. In that case, the received content may be segmented based on any one or a combination of the segmenting techniques described for audio, video, and/or metadata.

Referring back to FIG. 16, at block 1624, the non-salient segments may be discarded, ignored, or tagged as being non-salient. At block 1626, the salient segments may be tagged and stored in memory of or accessible to the interleaver service (e.g., stored as tagged segments 312 in the content store 314).

At block 1628, the interleaver service may compare the tagged segments to one or more subscriber profiles corresponding to users of the interleaver service to determine subscriber profiles to which the various tagged segments are relevant. In some examples, the subscriber profiles include data from the one or more data sources including, among other things, fantasy sports information for the respective users of the interleaver service. The interleaver service may then serve the segments to one or more client devices of the users of the respective subscriber profiles to which the segments were determined to be relevant (e.g., based on the fantasy sports information or other information contained in the subscriber profile of each user). In this way, each user receives a custom content feed that includes segments that are relevant to the particular user (e.g., custom content related to the user's fantasy sports teams/leagues).

Figure 17:
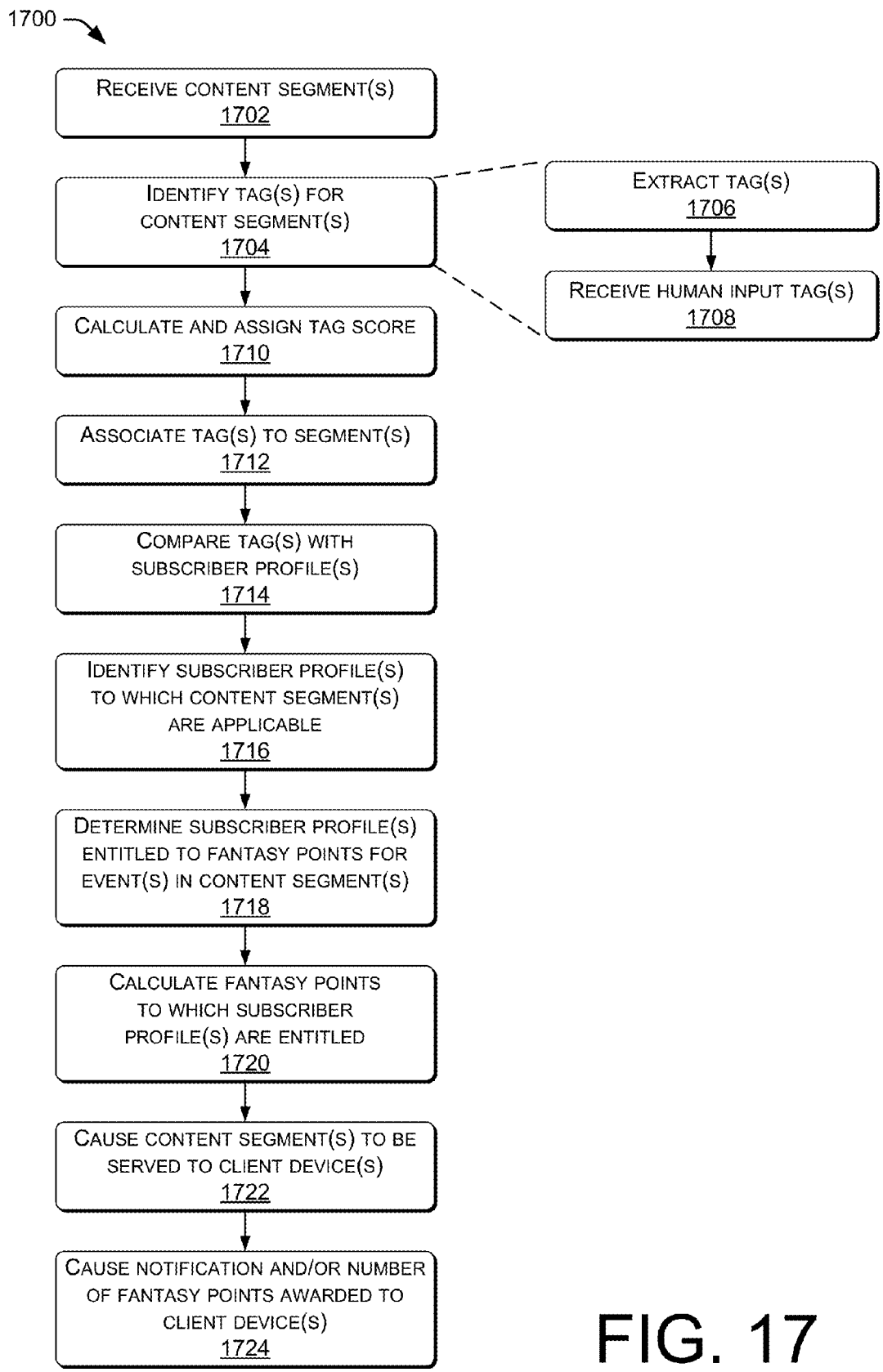
FIG. 17 is a flowchart illustrating an example process of providing custom content, with a focus on a tagging portion of the process.

FIG. 17 is a flowchart illustrating an example process 1700 of providing custom content, with a focus on a tagging portion of the process. The process 1700 includes, at block 1702, receiving one or more content segments at an interleaver service (e.g., interleaver service 114 or other custom content providing service). The content segments may be received from one or more external content sources (e.g., content sources 104) or from one or more internal sources (e.g., segmenting module 308).

At block 1704, one or more tags may be identified for each content segment and the content segments may be tagged with the one or more tags. In some examples, the tagging may be performed by a tagging module of the interleaver service (e.g., tagging module 310). However, in other examples, the tagging may be performed by other services internal or external to the interleaver service. For instance, in some examples, content may be received from an external content source in an already segmented and/or tagged form. In either case, the identification of the tags for each segment may be performed by, at block 1706, extracting one or more tags from the content segment itself and/or by, at block 1708, receiving one or more human input tags. By way of example and not limitation, extracting tags from the content segments may be performed automatically or semi-automatically and may include analyzing audio, video, and/or metadata of the content to recognize subject matter (e.g., people, places, things, events, and/or actions) depicted in the video and/or described in the audio and/or metadata. In some examples, tag extraction techniques may include video extraction techniques such as facial recognition (e.g., to identify athletes, coaches, announcers, officials, or other people from a database of known people), image or object recognition (e.g., to identify objects or object types from a database of known objects), and/or text recognition (e.g., optical character recognition) to identify and determine the meaning of text in the content. The tag extraction techniques may additionally or alternatively include audio extraction techniques, such as speech-to-text conversion to identify and determine a meaning of voice content, voice signature recognition to identify individuals by comparison to a database of known voice samples, and/or sound or pattern recognition to identify sounds or sound types by comparison to a database of known sounds or patterns. The tag extraction techniques may additionally or alternatively include metadata extraction techniques, such as analysis of closed captioning data to identify subject matter (e.g., people, places, things, events, actions, etc.) described in the content, a source of the content, a format of the content (e.g., file format, resolution, compression, etc.), or the like.

Human input tags may be received from, for example, personnel at or associated with the sporting event or other subject matter of the content, personnel associated with one or more fantasy sports websites or platforms (e.g., fantasy sports platforms offering fantasy sports experiences based on one or more sporting events of the received content), and/or one or more individual users (e.g., crowd source workers and/or users of the interleaver service).

In some examples, at block 1710, a tag score may be calculated and assigned to some or all of the tags. In some examples, the tag score may be assigned to each tag regardless of the segments to which it is applied (i.e., the tag scores may be segment agnostic). In other examples, the tag scores for each tag may be dependent upon the segments to which the tag is applied (i.e., the tag scores may be segment specific). In that case, a tag may have one tag score as applied to a first segment and may have a second, different tag score as applied to a second, different segment.

At block 1712, one or more tags may be associated with each segment to identify the subject matter depicted or described in the respective segment. In some examples, associating the tags with segments may comprise modifying the files corresponding to the content segments to include the tag information. In other examples, associating the tags with segments may comprise creating a separate tag file or index including the tag information along with pointers to the corresponding content segments and/or locations of the content segments in memory. In either case, once the tags have been associated, the segments may be stored in memory accessible to the interleaver service (e.g., they may be stored as tagged segments 312 in content store 314).

At 1714, the interleaver service may compare the tags with one or more subscriber profiles to identify tags that are relevant to the subscriber profile(s). In some examples, the comparison may be initiated by the interleaver service (e.g., periodically or upon receipt of one or more new content segments) or may be initiated in response to receipt of a request from a client device of a user (e.g., a client device 118). At block 1716, based at least in part on the comparison, the interleaver service may identify one or more subscribe profiles to which one or more content segments are applicable (or vice versa).

At block 1718, the interleaver service (or other service) may determine that a subscriber profile to which a content segment is applicable is entitled to fantasy points for one or more events depicted or described in the content segment. Additionally, at block 1720, the interleaver service may determine a number of fantasy points the user is entitled to for the events depicted in the segment. In the illustrated example, this fantasy point determinations of operations 1718 and 1720 are described as being made after the segment is determined to be applicable to the subscriber profile. This approach may be advantageous when different users of the interleaver service participate in fantasy sports leagues provided by websites or services other than the interleaver service, since in that case different users may be entitled to different fantasy points for the same segment (e.g., because different fantasy sites/platforms apply different scoring metrics and/or fantasy commissioners may set different scoring metrics for each league). In some implementations, the indication of fantasy points and/or the number of fantasy points may be calculated by the interleaver service, while in other implementations the indication and number of fantasy points may be obtained from another fantasy sports website or service (e.g., by querying or scraping the other fantasy sports website). The indication that the segment is entitled to fantasy points and/or the fantasy point total to which the user is entitled for the events depicted in the segment may be associated with the segment when the segment is placed in the user's queue to be transmitted to a client device of the user.

In other examples, fantasy point information may be assigned to each segment without regard to which subscriber profiles it may be applicable to. In that case, the fact that a segment depicts an event resulting in fantasy points and/or a fantasy point total attributable to the segment may be associated with the segment (e.g., as one or more tags). This approach may be particularly advantageous when the fantasy points are determined and/or assigned by the interleaver service (e.g., if the interleaver service administers the fantasy sports league/team).

At 1722, the interleaver service may transmit or otherwise cause the content segment(s) to be served to client device(s) of the user. The interleaver service may, at block 1724, additionally transmit or otherwise cause a notification to be sent to the client device(s) of the user indicating that the user is entitled to fantasy points, and/or a number of fantasy points awarded to the user, for an event depicted or described in the content segment. In this way, the user is provided with a custom content feed comprising content segments that are relevant to the user (e.g., based upon information about the user's fantasy sports accounts stored in the user's subscriber profile).

Figure 18:
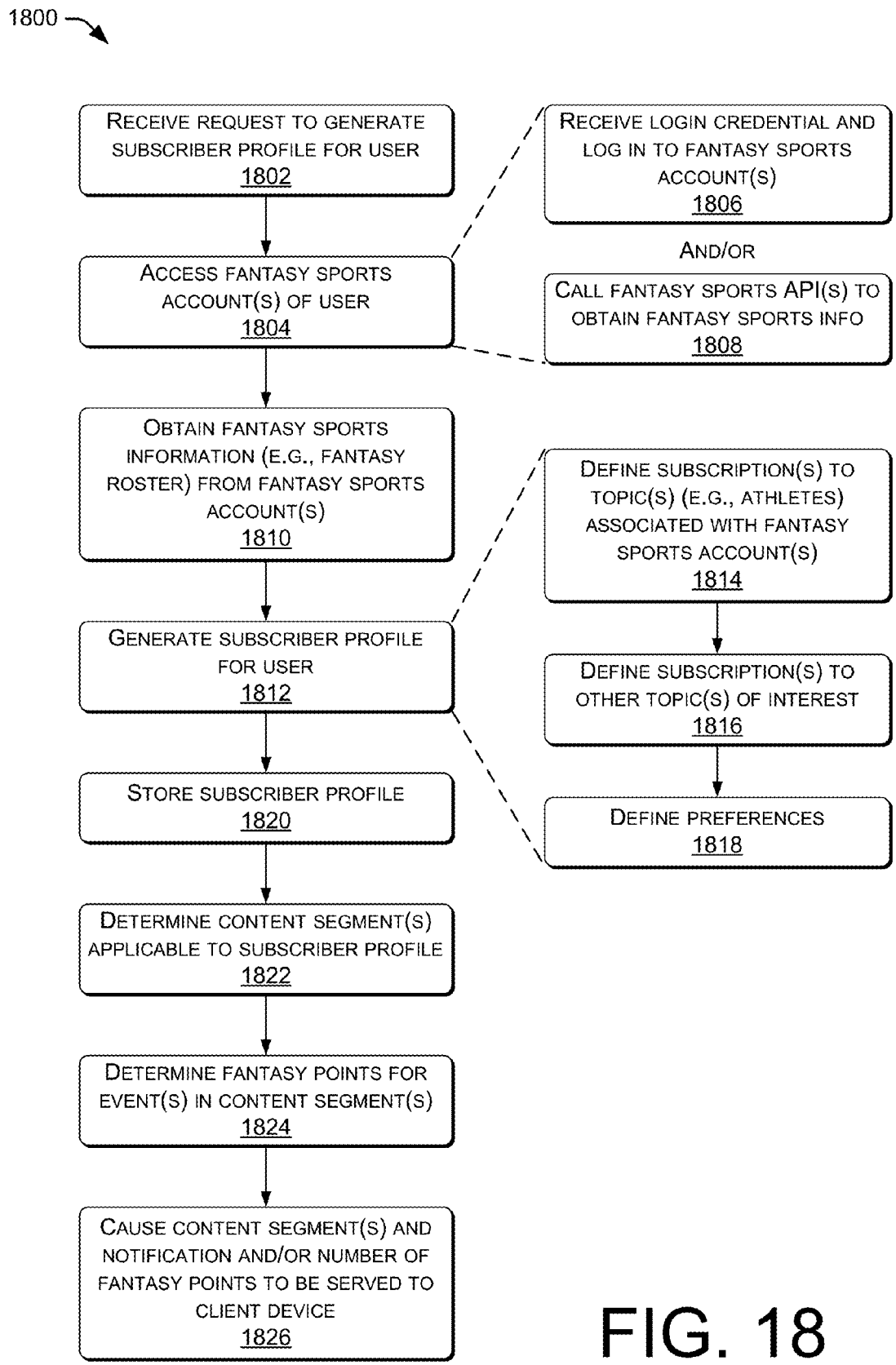
FIG. 18 is a flowchart illustrating an example process of providing custom content, with a focus on a subscriber profile portion of the process.

FIG. 18 is a flowchart illustrating an example process 1800 of providing custom content, with a focus on a subscriber profile portion of the process. The process 1800 includes, at block 1802, receiving a request at an interleaver service (e.g., interleaver service 114 or other custom content provider service) to generate a subscriber profile for a user. The interleaver service may also receive account information (e.g., login credentials) for one or more other services (e.g., fantasy sports services or websites, social media sites, gaming sites, or the like) of which the user is a member.

At block 1804, the interleaver service (e.g., via profile manager 318) may access one or more fantasy sports accounts (or other accounts) of the user. In some examples, accessing the one or more accounts of the user may comprise, at block 1806, receiving and using a login credential to access the account(s), and/or at block 1808, calling one or more application programming interfaces (APIs) to access the account(s).

At block 1806, the interleaver service may obtain fantasy sports information (e.g., fantasy league information, fantasy team information, fantasy roster information, etc.) or other information (e.g., social network information, gaming information, etc.) from the account(s). In some implementations, it may be necessary to access the account(s) of the user to obtain the fantasy sports information or other information. However, in other examples, it may be possible to obtain some or all of the information without the need to access the user's account.

At block 1812, the interleaver service may generate a subscriber profile (e.g., subscriber profile 322) for the user. In some examples, the subscriber profile may include the account information of the one or more other services of which the user is a member. In some examples, generating the subscriber profile may include, at block 1814, defining one or more subscriptions to topics of interest to a user (e.g., athletes, teams, etc.) associated with the fantasy sports account(s) of the user. In some examples, generating the subscriber profile may additionally or alternatively include, at block 1816, defining one or more subscriptions to other topics of interest to the user (e.g., favorite athletes, favorite teams, favorite announcers, favorite cheerleaders, home location, etc.). The interleaver service (e.g., via profile manager 318) may then determine tags relevant to the subscriptions. The tags may correspond to, for example, specific people (e.g., athletes, announcers, cheerleaders, etc.), places (e.g., cities, stadiums, etc.), and/or things (e.g., teams, cars, etc.) corresponding to the subscriptions defined in blocks 1814 and 1816.

Generating the subscriber profile may additionally include, at block 1818, defining one or more preferences associated with the interleaver service. The preferences may include, for example, the types and amounts of different types of content that the user wishes to receive in his or her custom content stream. Thus, the preferences may indicate relative priorities of certain types of content. In some examples, the preferences may include weights associated with the subscriptions (or to individual tags associated with the subscriptions). The weights may be determined and/or assigned by, for example, weighting module 320 responsive to preferences provided by the user explicitly (e.g., using the preferences tab in the UIs shown in FIGS. 13-15) or implicitly (e.g., by prior user actions, other memberships, frequency of reference to particular content of interest, frequency of comment on various content of interest, etc.).

At block 1820, the interleaver service (e.g., subscription manager 318) may store the subscriber profile in memory of or accessible to the interleaver service (e.g., subscription store 324).

At block 1822, the interleaver service may determine one or more content segments (e.g., one or more tagged content segments 312 in the content store 314) that are applicable to the user's subscriber profile based at least in part on the subscriptions and associated tags described by the subscribe profile. In some examples, the interleaver service may additionally take into account the weights and other user preferences defined in the subscriber profile when determining content segments that are applicable to the user's subscriber profile.

At block 1824, the interleaver service may determine whether the user is entitled to fantasy points for an event depicted and/or described in the one or more determined content segments and, if so, how many. The fantasy point determination may be made based on calculations of the interleaver service and/or based information obtained from one or more other fantasy sports services.

At block 1826, the interleaver service may transmit or otherwise cause the one or more content segments to be transmitted to a client device (e.g., client device 118) of the user along with a notification and/or number of fantasy points to which the user is entitled for events depicted in the content segment(s). In this way, the interleaver service provides streams of content customized for each user based at least in part on their respective fantasy sports information.

Figure 19:
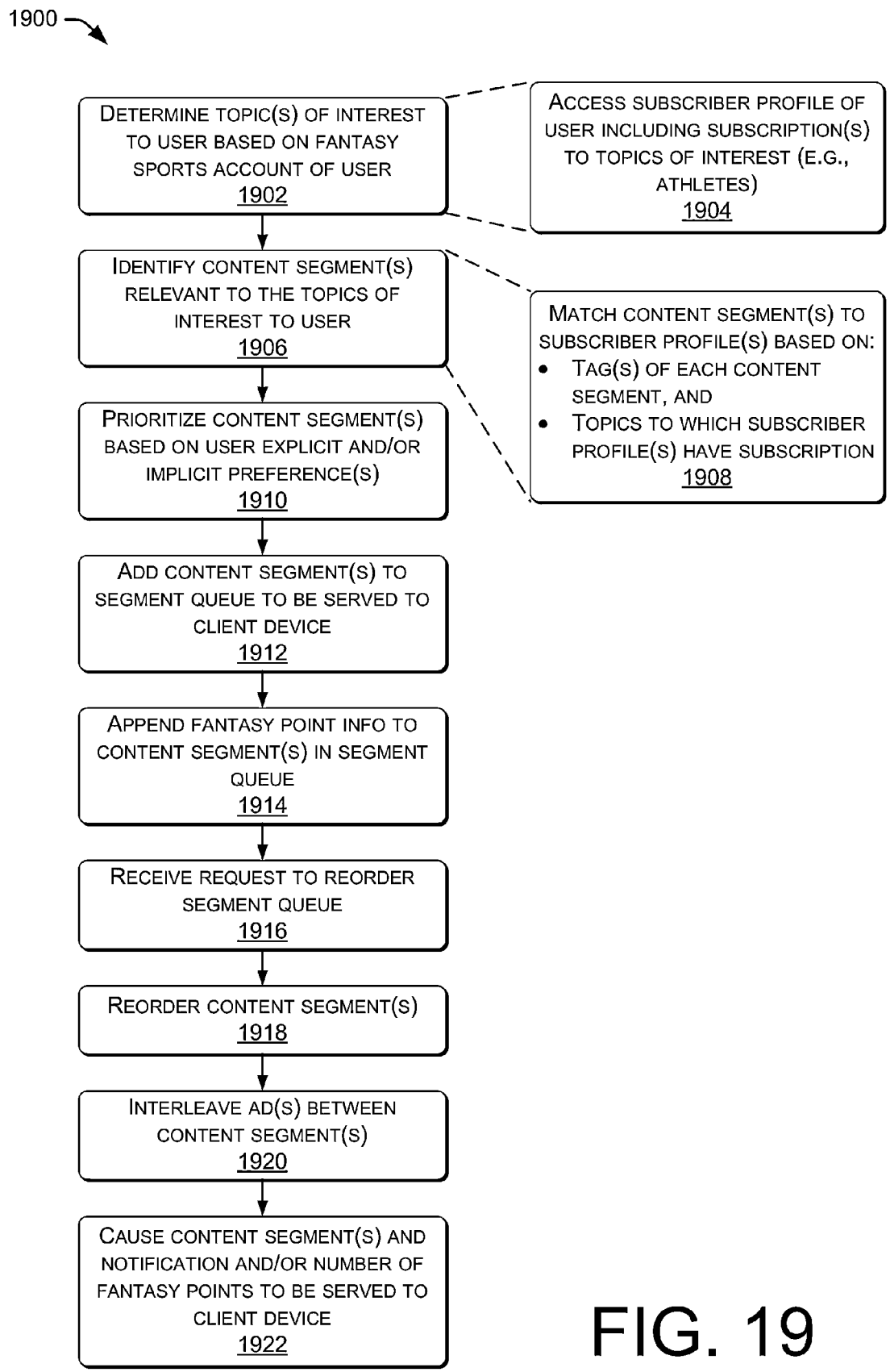
FIG. 19 is a flowchart illustrating an example process of providing custom content, with a focus on an interleaving portion of the process.

FIG. 19 is a flowchart illustrating an example process 1900 of providing custom content, with a focus on an interleaving portion of the process. The process 1900 includes, at block 1902, topics of interest to one or more users are determined. In some examples, the topics of interest to the user may be determined from, or based on, the users fantasy sports account. Such a fantasy sports account may be based on, or provided by, a website that is fantasy sports platform or other fantasy sports application. A website that is a fantasy sports platform may contain the accounts of large numbers of users. Each user's account may be associated with one or more of the user's teams, each of which may be within a league and may be associated an underlying real life sport. Each user may access the user's one or more account, such as by use of a username and password. The account may include information about the user and the user's fantasy sports team. The account may provide access to the roster(s) of the user's fantasy team(s) and the rosters of the user's opponent's teams in one or more leagues. In some examples, any of the athletes on any of the user's fantasy team(s), the user's opponent's fantasy team(s), the other teams in the user's one or more leagues, etc., may be of interest to the user.

In the context of the example of FIG. 1, the interleaver service 114 may use the user's username and password, and log into the user's account on one or more fantasy sports platform websites. Having accessed the user's account, the interleaver may determine the identities of athletes on the user's fantasy team(s) and athletes on other teams of interest to the user. Any content related to such athletes would be of interest to the user, particularly when the content included video and/or audio depictions of the athletes performing in a manner that resulted in fantasy points for the user, the user's opponents, the user's friends, etc.

At block 1904, a subscriber profile of the user may be accessed, to thereby access one or more topics of interest to the user. In the context of the example of FIG. 1 or 2, the interleaver service 114 may access the user's subscriber profile, which may be located at a data source 108. Table 900 of FIG. 9 illustrates example content of a subscriber profile 322. The user profile 322 may include information including athlete identification (roster information) of all of the user's teams and opponents. The subscriber profile 322 may include a large amount of additional data, such as the user's favorite athletes, favorite teams, favorite types of plays, favorite sports, etc. The user profile may also have marketing information, which may assist the user to obtain more relevant commercial messaging. All of this information may be used to identify topics of interest, such as particular video content and/or clips, when they become available.

At block 1906, content segments relevant to the topics of interest to the user may be identified. In the context of the examples of FIGS. 1 and 2, the interleaver service 114 may process information including tagged video segments and athlete rosters of each user's fantasy team and league, and from such processing determine which tagged video segments are relevant to each user. In some examples, the interleaver identifies content segments that are relevant to each user because the identified content segments depict athletes on the user's fantasy team(s) performing in a manner that awards the user's fantasy team with fantasy points.

At block 1908, content segment(s) are matched to a user and the user's subscriber profile based. The matching may be based on a correlation between the tag(s) or annotations associated with (or part of) each content segment and topics to which the subscriber profiles have subscription. In an example, a content segment may have tags or annotations indicating that certain athlete(s) were in a particular content segment and what they accomplished. Additionally, the tags may indicate that the performance(s) resulted in positive or negative fantasy points. The user's subscriber profile may indicate that the user is probably interested in the content of the content segment for one or more reasons. For example, the user's fantasy team may include one or more athletes depicted in the content segment, or the content segment may depict one or more of the user's favorite athletes and/or teams. Accordingly, the interleaver performs a matching process by which one or more (or each) content segment is matched or not matched to one or more users. Such matching may indicate that it is appropriate, depending on priority, to send the content segment to the user.

At block 1910, content segment(s) may be prioritized based at least in part on relevance to the topics of interest to the user. In particular, video clips depicting athletes' performances resulting in fantasy points may be prioritized according to importance to the user. In some examples, athletes on the user's fantasy team and favorite athletes of the user may be given higher priority, while athletes unknown to the user and/or not on the user's fantasy team(s) may be given lower priority. The prioritization may be based on explicit and/or implicit preferences of the user. In some examples, the interleaver service 114 may apply an algorithm to determine the strength of a match between a content segment and a user's subscriber profile. Explicit preferences may include the user's identified fantasy team roster, the user's identified favorite athletes, real life teams, etc. Implicit preferences may also be used, but may be given lower priority. If the user is known to live in the Northwest, an implicit preference for athletes playing for the Seattle Seahawks may be assumed. In other examples, the user's age may be used to prioritize various content segments produced by various color commentators. The prioritization process may consider factors such as how well the content segment matches the user's subscriber profile, how many content segments are currently in the user's segment queue, how rapidly the user is consuming content, whether the priority of content segments in the user's segment queue is high or low, and other factors.

At block 1912, one or more content segments may be added to a queue to be served to the client device. The content segments may be added in an order indicated by the priority established at block 1910. The content segments themselves may be placed in the queue, or links to the content segments may be put in the queue. If links are put in the queue, the user may click the received link to download the actual content segment.

At block 1914, fantasy point info may be appended to content segment(s) in the segment queue. In some examples, athletes' accomplishments may be associated with content segments before actual fantasy point information becomes available. Thus, the content may be segmented and annotated to recognize different athletes' performances before an exact fantasy point award associated with a particular user's league and/or fantasy sports platform is known. However, in many instances, such fantasy point information may be obtained from the fantasy sports platform website (such as by logging in with the user's username and password) or by other means. Once obtained, the fantasy point information may be appended or otherwise associated with a content segment. In some examples, fantasy point info may be appended by adding a tag to segment(s) to be displayed by the client device or embedding in the segment (e.g., text or audio added to the content of the segment). Fantasy point info may include a notification that the user is entitled to fantasy points for an event depicted in the content segment and/or a number of fantasy points to which the user is entitled for the event depicted in the content segment. If the exact fantasy point total is not known when the content segment is added to the segment queue, it may be added with it becomes available.

At block 1916, a request to reorder the segment queue may be received. In some examples, the interleaver service 114 may receive the request, which may have been sent by the client device 118 of the user. The user may have seen an indication of a preferred content segment that was not first the segment queue, and therefore requested the reordering. At block 1918, the content segments in the content queue may be reordered. The reordering may be performed by the interleaver service 114.

At block 1920, one or more ads may be interleaved between content segments. In the context of the example of FIG. 2, the ads $AD_1$, $AD_2$ and $AD_P$ have been added to the custom content 116(1). Thus, the custom content may be a mixture of, at least, content segments and ads.

At block 1922, content segments(s), ads and/or data including a notification and/or number of fantasy points may be served to client device(s). In some examples, the interleaver service 114 may cause or perform the serving.

Example Processes for Providing Estimated Fantasy Scores

Figure 20:
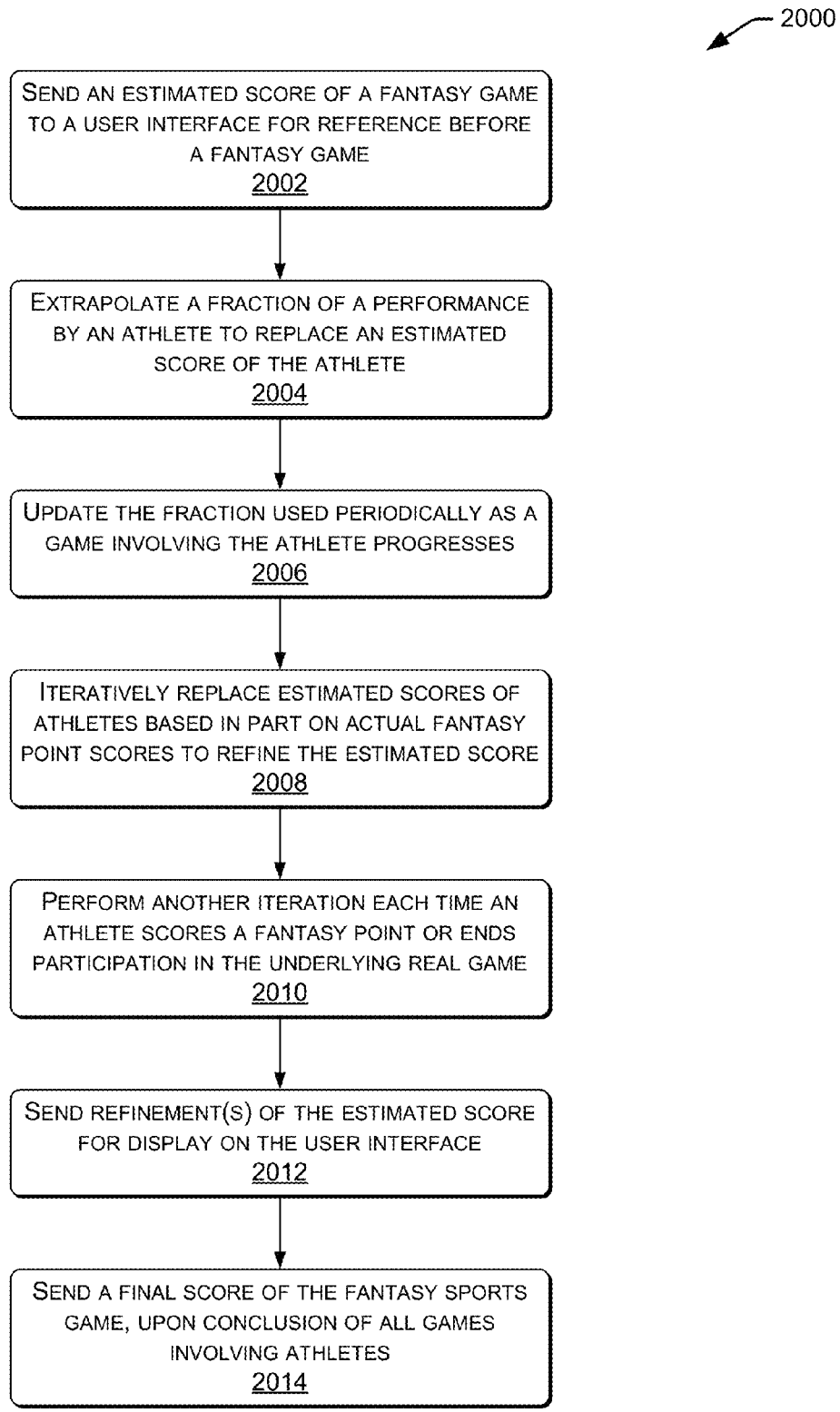
FIG. 20 is a flowchart showing a first example method by which an estimate of a score of a fantasy sports game, made before play begins, may be refined during play of the underlying real life games to provide progressively better estimates of a final fantasy game score and to provide an indication of which fantasy team is currently predicted to win.

FIG. 20 shows example techniques 2000 for providing an estimated final fantasy score, for one or more athletes, one or more teams, and/or one or more games. The estimated scores may be revised as the underlying real-life games are played, and as the actual fantasy point scores of one or more athletes becomes easier to estimate. In some examples, as the fantasy point totals for different athletes become known, those totals may be used to replace previous estimates that were used, thereby creating a more accurate fantasy point total for a fantasy team. In a second example, as fantasy point information for each athlete becomes known as games in which each athlete is playing progress, the fantasy point estimate for each athlete may more accurately be predicted. These more accurate predictions may be used to more accurately predict fantasy team point totals.

At block 2002, an estimated score of a fantasy game may be sent or caused to be sent (e.g., by a server) to a user interface (e.g., operable on a client device). The estimated score may be based at least in part on previous performance of at least some athletes participating in the fantasy sports game.

At block 2004, a fraction of a performance (e.g., one quarter or one half of a game) by an athlete may be extrapolated to replace an estimated score of the athlete. At block 2006, the fraction used may be updated (e.g., from one quarter to two and then three quarters) periodically or occasionally as the game involving the athlete progresses.

At block 2008, estimated fantasy point scores may be iteratively replaced, based in part on actual fantasy point scores, for each athlete and/or for a fantasy team. Such iterative replacements refine an estimated fantasy point game score of each athlete, and collectively, the fantasy team. In some examples, each time an athlete scores a fantasy point, spends a period of time without scoring a fantasy point, or ends participation in a real life game, the fantasy points earned by the athlete may be used in another iteration of an estimate of the score of the athlete and a fantasy game. Thus, as each time an athlete's actual fantasy point score becomes known, that score may be used to make a user's fantasy team prediction more accurate.

At block 2010, estimated scores of athletes used to calculate the estimated score of a fantasy team may be iteratively or repeatedly replaced, as actual scores of the athletes become available and/or each time an athlete ends participation in the fantasy game.

At block 2012, the refinement of the estimated score may be sent for display on the user interface.

At block 2014, a final score of the fantasy sports game is sent, upon conclusion of participation of all athletes of the fantasy sports game.

Figure 21:
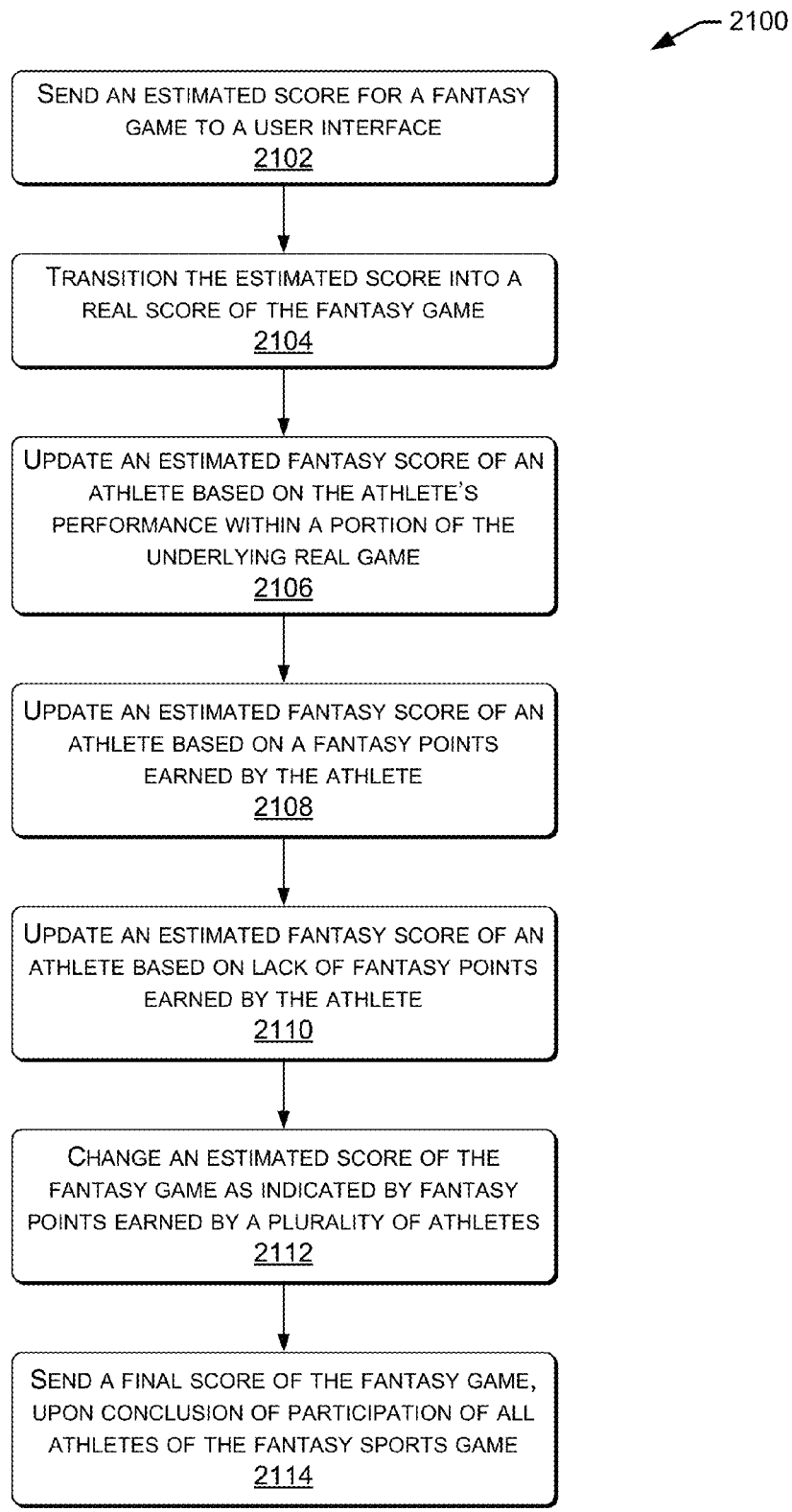
FIG. 21 is a flowchart showing a second example method of fantasy score estimation.

FIG. 21 shows example techniques 2100 for providing estimated fantasy scores, for one or more athletes and/or one or more teams, which may be revised as real-life games are played.

At block 2102, an estimated score for a fantasy game may be sent to a user interface. In the context of the example of FIG. 1, the interleaver 114 may send the estimated score within custom content 116 to a client device 118.

At block 2104, the estimated score of the fantasy game is transitioned into a real score of the fantasy game. The transitioning may be based on increasingly better estimates of a number of fantasy points that will be scored by each of a plurality of athletes on a user's fantasy team.

At block 2106, an estimated score of an athlete may be updated based at least in part on a number of fantasy points scored by an athlete or a failure of the athlete to score fantasy points within a portion of a game involving the athlete. At block 2108, the estimated score of the fantasy game may be updated based in part on the updated estimated score of the athlete.

At block 2110, an estimated score of an athlete may be updated based on at least one fantasy point earned by the athlete. At block 2112, the estimated score of the fantasy game may be updated, based at least in part on the updated estimated score of the athlete.

At block 2114, the estimated score of the fantasy game may be changed as the fantasy game progresses as indicated by results of a plurality of athletes in a plurality of real games.

At block 2116, a final score of the fantasy sports game may be sent to a client and/or user interface, upon conclusion of participation of all athletes of the fantasy sports game.

Figure 22:
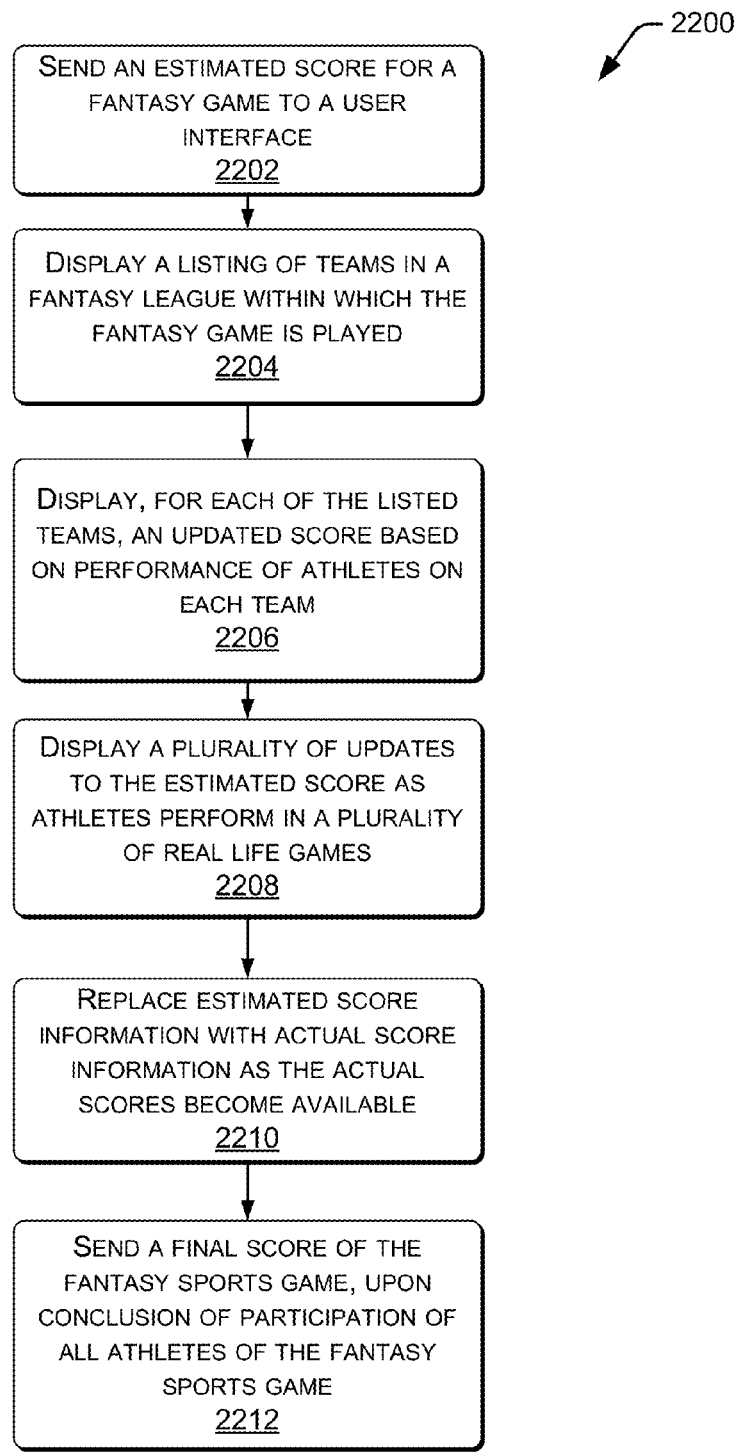
FIG. 22 is a flowchart showing a third example method of fantasy score estimation.

FIG. 22 shows example techniques 2200 for providing estimated fantasy scores, for one or more athletes and/or one or more teams, which may be revised as real-life games are played.

At block 2202, an estimated score of a fantasy game may be sent to a client device and/or displayed on a user interface.

At block 2204, a listing of teams in a fantasy league, within which the fantasy game was played, may be sent to a client device and/or displayed on a user interface.

At block 2206, an updated score, which may be based on performance of one or more athletes, may be display, for each of one or more of the teams in the listing.

At block 2208, a plurality of updates to the estimated score may be displayed, as athletes perform in a plurality of real life games.

At block 2210, estimated score information may be replaced with actual score information as the actual fantasy score information becomes available.

At block 2212, a final score of the fantasy sports game may be sent to a client device and/or displayed on a user interface, upon conclusion of participation of all athletes of the fantasy sports game.

Overview of Example Integration of Fantasy Information with Video Content

The following paragraphs describe example techniques of integrating fantasy information with video content. As discussed above, many people today watch sporting events not only to root for a particular team to win, but also to root for individual players that are on their fantasy rosters. For example, an individual user may be a Seattle Seahawks fan. The user may also participate in one or more fantasy sports leagues and may have athletes from multiple different actual teams on his or her fantasy sports rosters. Thus, the user may have interest in watching the Seahawks games, but may also have interest in watching games in which his or her fantasy athletes participate. In some instances, the user may watch a game and be rooting for the Seahawks (his or her favorite actual team in this example) while at the same time rooting for athletes on the opposing team that are on his or her fantasy roster to play well.

When watching a game or sporting event, it is often difficult to identify individual players that are on the field at any given time, particularly athletes that range around the filed and/or do not line up in the same location very time. This application describes techniques for displaying a visual indicator identifying athletes that are on a fantasy roster of the user. The visual indicator may be presented at or proximate to a location on the display at which the athlete of interest is presented on the display and may track the motion of the athlete of interest, such that when the athlete of interest moves on the display, the visual indicator moves with the athlete of interest. By way of example and not limitation, the visual indicator may comprise a halo (e.g., proximate the head, waist, or feet of an athlete), silhouette, shadow, arrow, text, helmet graphic, shoe graphic, uniform graphic, and/or any other visual indicator associated with the athlete of interest and usable to distinguish the athlete(s) of interest from other athletes depicted in the video content.

In some embodiments visual indicators may be presented for all athletes on the user's fantasy roster. In that case, if a user has athletes from two different actual teams on his/her fantasy roster and the two actual teams play each other, athletes from both teams that are on the user's fantasy roster may include visual indications. In some embodiments visual indicators may additionally or alternatively be presented for all athletes on a fantasy roster of the user's current opponent (i.e., the fantasy team that the user's fantasy team is up against). In some embodiments visual indicators may additionally or alternatively be presented for all athletes in a fantasy league in which the user participates. Visual indicators of athletes on a fantasy roster of the user's team may be the same or different than visual indicators of athletes on a roster of an opponent's or other league member's fantasy teams (e.g., different colors, hues, intensities, shapes, text, or other graphics may be used to denote athletes on different users' rosters). Furthermore, visual indicators for athletes that are currently inactive or benched on the user's fantasy roster may be shown differently (or not shown at all) than athletes that are active (i.e., not on the bench) on the user's fantasy roster. Employing such visual indicators allows users to more easily identify the fantasy players on their roster(s).

In some examples, the visual indicator may be interactive. When the user selects the visual indicator, a graphical user interface may be presented (e.g., as an overlay or pop up). The graphical user interface may be stationary on the screen or may be linked to the visual indicator, such that the graphical user interface moves in conjunction with the visual indicator. In some instances, the graphical user interface may comprise biographical information, statistics, news, fantasy points in the game, projected fantasy points, season total fantasy points, or the like. Such informational graphical user interfaces may allow a user to more quickly and easily obtain information about the athletes on their fantasy roster(s). In some instances, the graphical user interface may display a fantasy roster (or a link to such roster) of the user which includes the athlete with which the visual indicator is associated. This may provide a more efficient way for the user to manage his or her fantasy roster.

Additionally or alternatively, the graphical user interface may comprise one or more controls to control presentation of the video content. By way of example and not limitation, the controls may include a camera angle control usable to select an alternate camera view of the events depicted in the video content, a zoom control usable to zoom in or out on the athlete associated with the visual indicator, a center control usable to center the view on the athlete associated with the visual indicator, a replay control to replay a portion of the video content (e.g., the last 5 seconds, 10 seconds, 30 seconds, etc.) in regular or slow motion, a skip control to skip to a previous portion (or subsequent in the case of pre-recorded video content) of the video content depicting a play or event for which the athlete of interest was awarded or decremented fantasy points, or otherwise control the playback of the video content. Such controls may allow the user to view video content of athletes on his or her fantasy roster(s) in ways never before possible. Such additional viewing options may improve the user's understanding of how his or her fantasy athletes are performing, which in turn allows the user to better manage his or her fantasy team(s).

It can also be difficult for a user desiring to monitor his or her fantasy athletes to keep track of when various athletes on his or her fantasy roster(s) are playing. Moreover, even if a user knows which games his fantasy athletes are playing in and what time those games are, the user still needs to know what channel the games are being broadcast on. And, even then, the user has no way of knowing when the athletes on his fantasy roster are actually on the field during a game. Thus, users can spend considerable time locating the games his fantasy athletes are participating in and watching portions of games during which his or her fantasy athletes are not even participating. This application describes techniques to tune channels or stream content based on the fantasy sports roster(s) of the user. For instance, this application describes tuning to video content of games and sporting events that are currently depicting athletes on one or more of the user's fantasy rosters. In some examples, a system (e.g., game console, smart TV, computer, tablet, web service, etc.) may automatically tune to or access (or prompt the user to) games or sporting events that depict athletes on one or more of the user's fantasy rosters. Such tuning techniques make it much simpler for a user to watch video content in which his fantasy athletes are currently participating, without the need to look up which team his athletes are on, what opponent they are playing, what time the games are, what channel the games are on, etc.

There are many ways in which athletes can be identified in video content, some examples of which are described above in relation to the interleaver service. By way of example and not limitation, athlete(s) may be identified in video content based on image/facial recognition, optical character recognition (OCR) or text recognition of uniform names and/or numbers, visible or invisible watermarks or quick response (QR) codes or other machine readable codes which may be applied to athletes' uniforms and/or helmets, or visible or invisible watermark or QR code or other machine readable code added to the video content as an annotation automatically or by a human user.

In some examples, athletes may be identified in video content based on human identification of the athlete (e.g., by touching, pointing, gesturing, selecting, etc.). In some examples, the human may additionally designate the athlete's route or motion on the display. In other examples, once the human identifies the athlete, the system may track the identified athlete using computerized object tracking techniques. The human identification may be implemented by crowdsourcing (e.g., mechanical Turk, leveraging inputs by other users, etc.), analysts, officials, etc. prior to viewing of the game by a user. In some examples, these techniques may be applied in real time as the game or sporting event progresses. In other examples, the techniques may be implanted when the game or sporting event is being viewed with a "tape delay" (e.g., a slight delay of about 3 seconds to about 60 seconds). The techniques also apply to watching previously recorded video content.

The foregoing techniques may be applied in substantially real time by a computing device of the company or network recording, broadcasting, or streaming the game, by a computing device located at the location of the user viewing the game, and/or by an intermediate computing device (e.g., web service) that annotates or supplements the video content with identification of the athletes and their routes or motion in the video content. In some examples, portions of the techniques may be performed by computing devices locally at the user's site while portions are performed remotely. For instance, video content of a game or sporting event may be annotated substantially contemporaneously with recording of the game content using the computer-based and/or human techniques described above. The annotation may include, for example, identification of one or more athletes and their routes or motion in the video content. The annotated video content may then be transmitted to a client device of the user (e.g., computer, game console, set top box, smart television, tablet, etc.) or an intermediary service, which may determine athletes of interest to the particular user (e.g., based on one or more fantasy teams or leagues in which the user participates), and may then cause a visual indicator for each of the athletes of interest to the particular user to be presented on a display. Additionally, in some instances, an intermediate web service located between the source of the content and the user's client device may further process or supplement the video content to include supplemental information, such as fantasy sports scores, route information, play information, formation information, historical statistics of the athlete or team, or the like.

Example Architecture for Integration of Fantasy Information with Video Content

As discussed above, video content may be customized to visually indicate a user's fantasy athletes that are depicted in the video content. In some examples, the customization of the video content for the user may be performed at a content source (e.g., broadcaster, distributor, cable provider, or the like). In other examples, the video content may be customized at a client device of the user (e.g., computer, tablet, game console, smart TV, etc.). In other examples, the video content may be customized by an intermediary service, such as the interleaver service 114 described above, a fantasy sports provider, or other web service. In still other examples, the content customization may be performed by two or more of a content source, an intermediary service, and/or a client device of the user.

Figure 23:
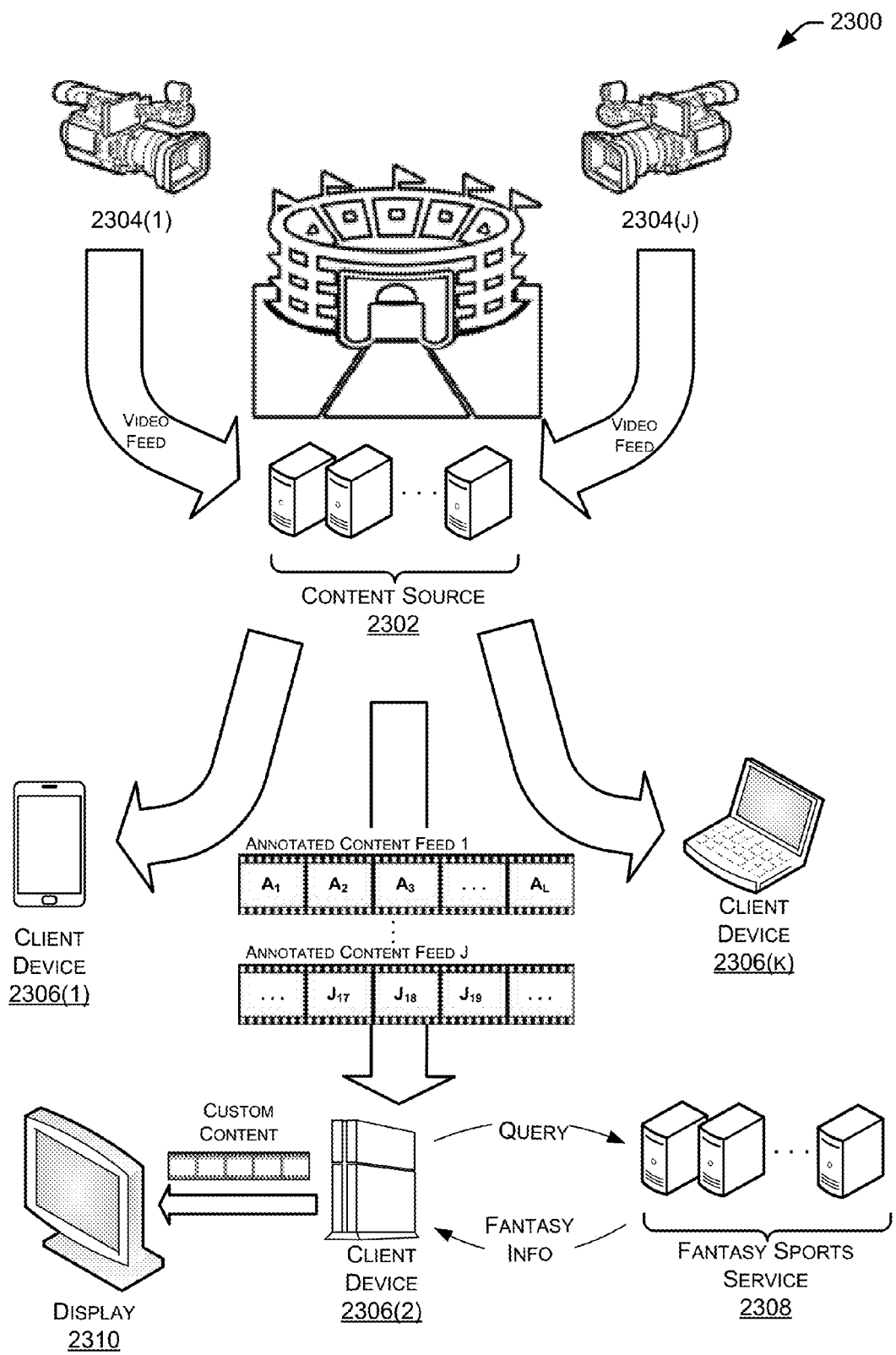
FIG. 23 is a schematic diagram of an example of an architecture usable to integrate fantasy sports information with video content of actual games or sporting events. For example, video content may be customized to visually indicate a user's fantasy athletes that are depicted in the video content.

FIG. 23 is a schematic diagram of an example architecture 2300 usable to integrate fantasy sports information with video content of actual games or sporting events. In the example of FIG. 23, a content source 2302 receives video content from multiple video capture devices 2304(1) to 2304(J) (collectively 2304), where J is any integer greater than 1. The video capture devices 2304 may correspond to different video cameras capturing different views of a game or sporting event, or related content such as broadcasters, announcers, officials, studio analysts, etc. Each video capture device 2304 outputs a respective video feed. The content source 2302 annotates the video feeds to identify athletes depicted in the video content, routes or movements of the athletes in the video content, other objects and/or people in the video content and their respective movements. As described in this section, "movement" refers to changes in location of the athlete, person, or object within the display area of the video content (as opposed to location in real space). The annotations may be human or machine readable identifiers for each athlete, person, or object. In some examples, the annotations may comprise textual annotations (e.g., name, jersey number, team, position, etc.), unique identification numbers, watermarks, QR codes, and/or symbols.

The content source 2302 outputs the annotated content. In the illustrated example, the content source 2302 may output multiple annotated content streams (annotated content feeds 1-J) corresponding to the video capture devices 2304(1)-2304(J). However, in other examples, the content source 2302 may output a single content stream corresponding to one of the video capture devices 2304(1)-2304(J). In that case, the content source 2302 may switch the single content stream among the various content streams of the video capture devices 2304(1)-2304(J), or the content source 2302 may combine or concatenate the various content streams from the video capture devices 2304(1)-2304(J) into a single composite annotated video stream.

Some or all of the annotated content feeds (1-J) are transmitted via a network to one or more client devices 2306(1) (mobile device), 2306(2)(game console), . . . 2306(K)(laptop computer), where K is any integer greater than or equal to 1. The client devices 2306 may comprise any of the client devices described herein and are not limited to the specific examples illustrated. In the illustrated example, the same content feeds are transmitted to all of the client devices. That is, the annotated content feeds (1-J) in this example are not customized for users of the respective client devices 2306. In other examples, different content feeds may be transmitted to each of the various client devices 2306. That is, the content source 2302 may output customized content streams for each client device 2306(1)-2306(K), each custom content stream annotated to visually indicate the fantasy athletes on rosters of users' of the respective client devices 2306.

Referring back to the example of FIG. 23, client device 2306(2) receives annotated content feeds (1-J). The client device 2306(2) may have fantasy information about one or more fantasy leagues in which the user of the client device participates stored in memory thereof. Additionally or alternatively, the client device 2306(2) may query a remote fantasy sports service 2308 to obtain fantasy information including data regarding one or more fantasy leagues in which the user participates. Based on the fantasy information, the client device 2306(2) may determine athletes on a roster of a fantasy sports team of a user. Using this information, the client device 2306(2) may identify at least one athlete of interest that is on the roster of the fantasy sports team of the user and is depicted in the video content of the game or sporting event. The client device 2306(2) may then output custom content to a display 2310. In the illustrated example, the client device 2306(2) and the display 2310 are separate. However, in other examples, the display 2310 may be integral with the client device 2306 (e.g., in the case of a tablet, laptop computer, or smart TV). The custom content may include the video content of the game or sporting event, as well as visual indicators of one or more athletes and other objects and people. Thus, the client device 2306(2) causes presentation of the video content of the game or sporting event on the display and a visual indicator associated with at least one athlete of interest to indicate that the athlete of interest is on the roster of the fantasy sports team of the user.

The techniques described with respect to FIG. 23 may be initiated in a variety of ways. In one example, a user may turn on the client device 2306(2) and tune to a game or sporting event (e.g., turn to a channel that on which the game or sporting event is being shown). The client device 2306(2) cause presentation of a graphical interface, which shows one or more fantasy leagues in which the user participates. The graphical interface may be presented on a same display on which the user is watching the game or sporting event (e.g., a television or other first display), or may be presented on a different display (e.g., a tablet, mobile device, or other second display). The user may select a particular league from among the one or more leagues. In some examples the selection of the particular league may be automatic by the system (e.g., a default or inferred selection). The system may then determine athletes on the user's team in the particular league, and may determine whether any of the athletes on the user's fantasy team in the particular league are participating in the game or sporting event in progress. In other examples, selection of a particular league may be omitted entirely and the system may determine whether any of athletes on any of the user's fantasy teams are participating in the game or sporting event in progress. Such athletes may be referred to as athletes of interest. The system may then present on the display a visual indicator for each of the athletes of interest. Each visual indicator may comprise at least one of a halo, silhouette, shadow, arrow, text, helmet graphic, shoe graphic, uniform graphic, or other indicator associated with the respective athlete of interest. Each visual indicator may be presented at or proximate to a location on the display at which the respective athlete of interest is presented on the display, and may track the motion of the athlete of interest, such that when the athlete of interest moves on the display, the visual indicator moves with the athlete of interest.

Example Annotation Interface

Figure 24:
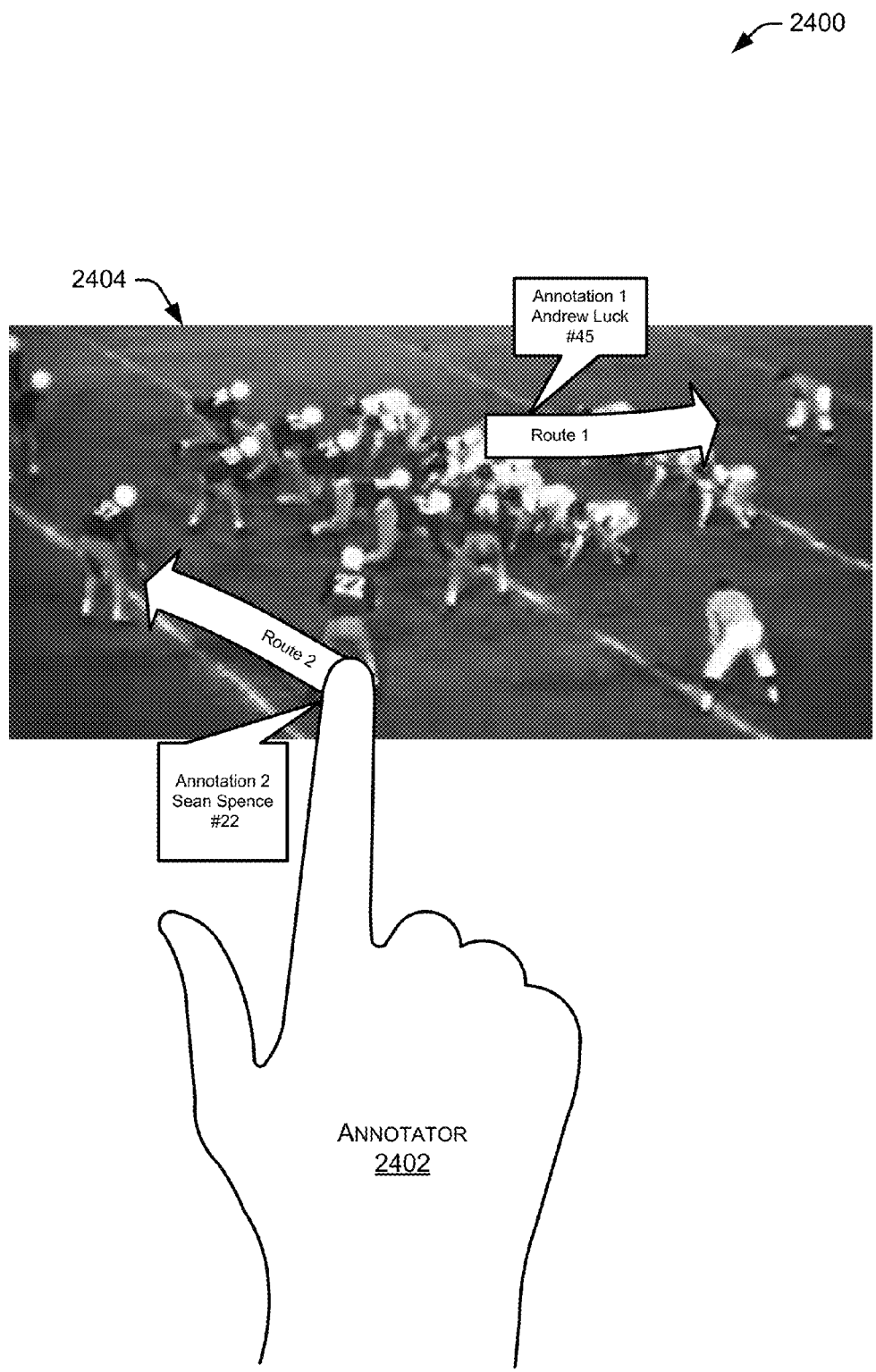
FIG. 24 is an example user interface that illustrates an example human based annotation technique.

As discussed above, there are many ways in which athletes can be identified in video content including both computerized and human based techniques. Various computer based techniques for identifying people and objects in video content and annotating the video content are described in the previous sections. FIG. 24 is an example user interface 2400 that illustrates an example human based annotation technique. One or more human annotators designate one or more athletes or other people or objects in the video content in substantially real time as the game or sporting event progresses. The athlete(s) may be identified by the annotator(s) touching a touch screen at locations corresponding to each of the athletes, pointing to locations of the athletes on the screen using a mouse or touch pad, gesturing to an area of a screen at which the athletes are located, or otherwise designating the athletes using some form of user input. Once an athlete is designated the annotator may add some identifying indicia, such as a name, number (jersey number or unique serial number), machine readable code, or the like. The identifying indicia may be input using a keyboard or other text based input device, voice input, dragging and dropping the indicia from a list or roster of athletes, or the like. In some examples, the annotator may additionally designate the athlete's route or motion on the display. In other examples, once the human identifies the athlete, the system may track the identified athlete using computerized object tracking techniques.

In the example of FIG. 24, an annotator 2402 has designated two athletes, Andrew Luck (#45) and Sean Spence (#22) by touching the location of each of the athletes on a touch screen display 2404. While (or after) touching the location of each of the athletes, the annotator 2404 identifies each athlete using voice input by speaking their respective names and jersey numbers. In other examples, other information may be included in the annotations, such as position, team, etc. The annotator 2404 then designates a route that each athlete moves in the video content by tracing their movements on the screen (Route 1 and Route 2, respectively). This annotation information (e.g., identifiers and route information) may then be appended to, or transmitted separately from, the video content to the one or more client devices directly or via one or more intermediary services. The annotation information may be used by the client device(s) and/or intermediary services to identify athletes of interest to each respective user. As discussed above, this sort of human based identification may be implemented by crowdsourcing (e.g., mechanical Turk, leveraging inputs by other users, etc.), analysts, officials, etc. prior to viewing of the game by a user.

Example Video Content Presentation Interface

Figure 25:
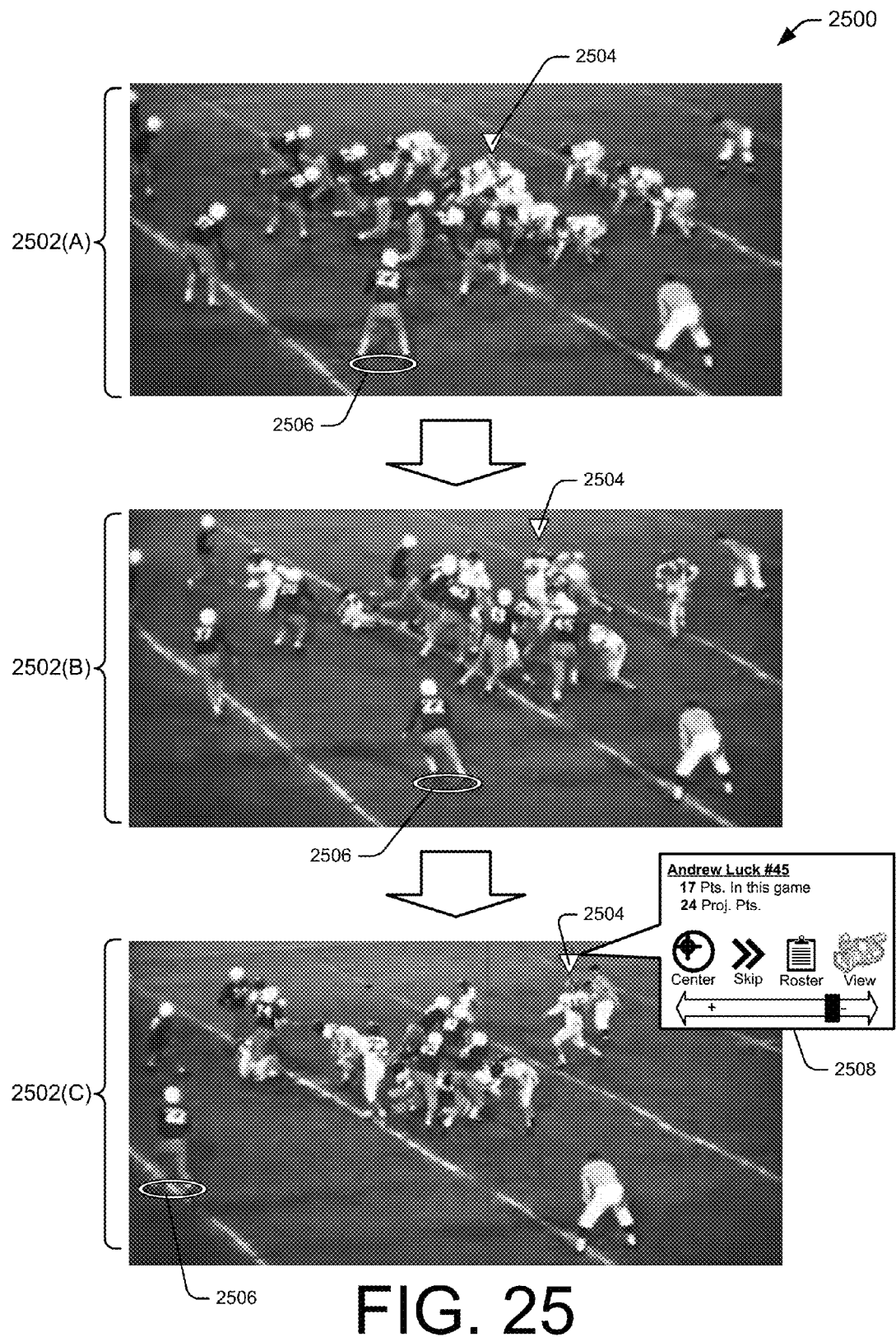
FIG. 25 illustrates a series of example user interface frames of video content that may be presented by a client device.

FIG. 25 illustrates a series 2500 of example user interface frames 2502(A), 2502(B), and 2502(C) of video content that may be presented by a client device. The user interface frames 2502(A), 2502(B), and 2502(C) represent a temporal progression of the video content, but are not mean to represent sequential frames of video content. Overlaid on the video content are multiple visual indicators (2504 and 2506 in this example), designating athletes that are on a fantasy roster of a user of the client device that is presenting the video content. As shown in a first interface frame 2502(A) in the series, a first athlete is designated by a triangular visual indicator 2504 and a second athlete is designated by a halo or ring 2506. Both visual indicators, 2504 and 2506, are located proximate to the respective athlete to whom they are associated. In this example, the triangular visual indicator 2504 is located above a head of one athlete, while the halo 2506 is located around the feet of a second athlete. In some examples, the location of the visual indicators relative to the respective athletes may be the same for all athletes (e.g., always located above the head), or may be different for different athletes (as in the illustrated example). The location of the visual indicator may be used to denote a difference in the athletes (e.g., on the user's fantasy roster, active, benched, on an opponent's fantasy roster, etc.) or to minimize obstruction of the other athletes (e.g., positioned so as not to overlap other athletes in the video content). The size, shape, color, hue, intensity, and other characteristics of the visual indicators may likewise be used to denote a difference in the athletes or to minimize obstruction of the other athletes.

As shown in the second frame 2502(B), the visual indicators have moved in accordance with the athletes with which they are associated. That is, visual indicators 2504 and 2506 move to track the respective positions of the athletes to which they are associated. The third frame 2502(C) shows a still further progression of the video content in which the visual indicators are again moved to track the locations of their respective athletes. Also, in the third frame 2502(C), a graphical user interface 2508 is presented in association with the triangular visual indicator 2504. In some examples, the graphical user interface 2508 may be presented in response to selection of the triangular visual indicator 2504 by the user (e.g., by touching a touch screen or any of the other input modes described herein). In other examples, the graphical user interface 2508 may be presented in response to the athlete associated with such indicator having possession of the ball, or in response to one or more other triggering event. The graphical user interface 2508 in this example includes fantasy statistics (number of points in this game, and projected points for the game) for the player (Andrew Luck in this example) associated with the visual indicator 2504, and a number of controls usable to control playback of the video content. Specifically, in the illustrated example, the controls include a "center" control, a "skip" control, a "roster" control, and a "view" control.

The "center" control is usable to center the displayed video on the athlete associated with the visual indicator. Doing so may result in zooming in on the athlete of interest and cropping a remainder of the video content.

The "skip" control is usable to skip to another (previous or subsequent) location in the video content depicting an event in which the athlete associated with the visual indicator was awarded or decremented fantasy points.

The "roster" control is selectable to open a fantasy roster interface by which the user can make updates or manage his or her fantasy roster. The roster interface may open in the graphical user interface 2508 or as a new window or popup on the display.

The "view" control may be used to select an alternate camera view of the events depicted in the video content. For instance, in the case that a content source transmits multiple video content feeds (e.g., as in the case of content feeds 1-J in FIG. 23), the "view" control may allow a user to switch between the multiple content feeds to see different camera angles or views of the events depicted in the video content.

Example Methods of Integrating Fantasy Information with Video Content

Figure 26:
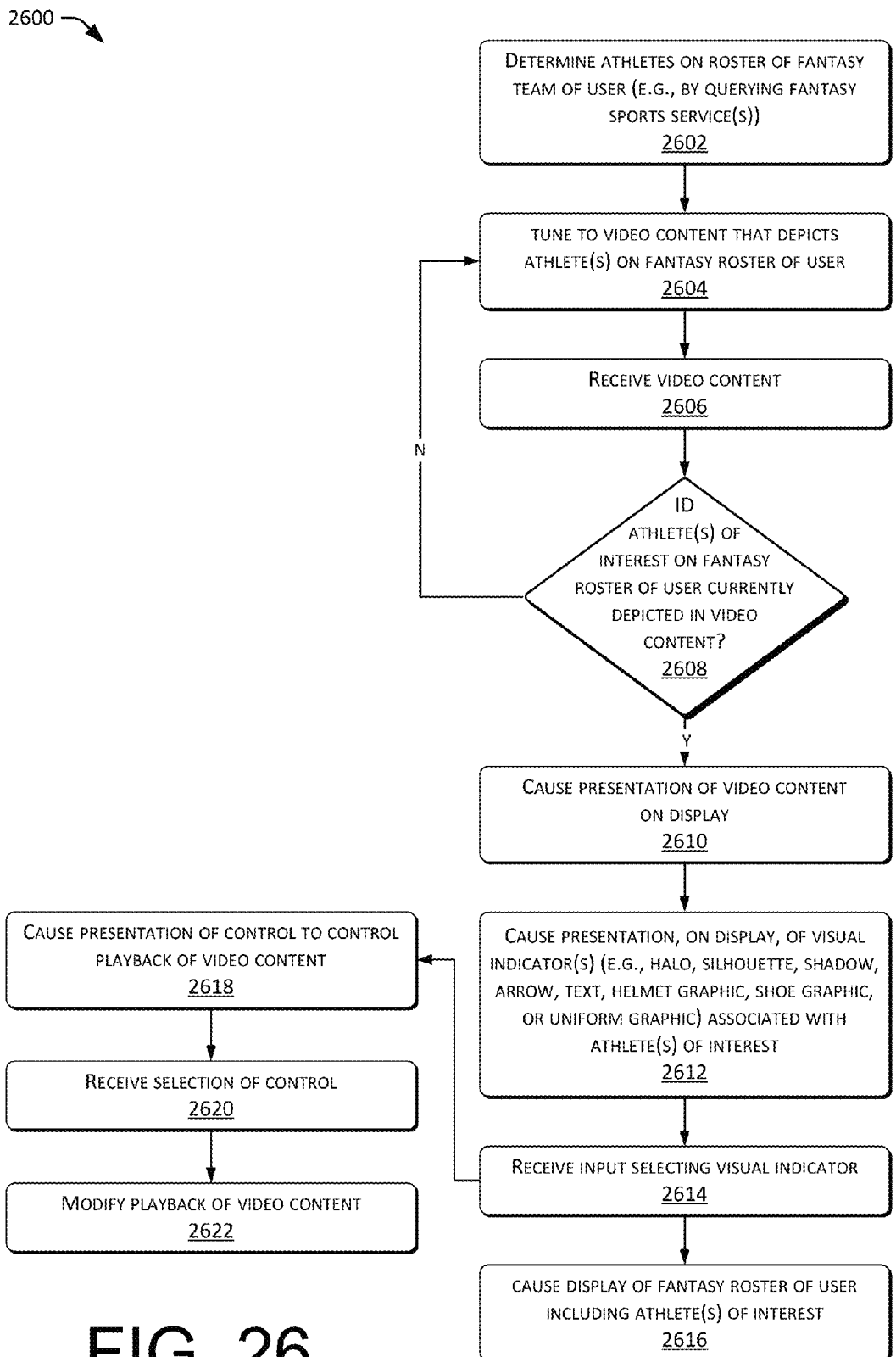
FIG. 26 is a flowchart illustrating an example process of integrating fantasy information with video content.

FIG. 26 is a flowchart illustrating an example process 2600 of integrating fantasy information with video content. Unless expressly described to the contrary, the example process 2600 may be performed in whole or in part by a content source such as content sources 104 and 2302, by a client device such as client devices 118 and 2306, and/or by an intermediary device such as interleaver service 114 and fantasy sports service 2308.

At 2602, a computing device determines athletes on a roster of a fantasy sports team of a user. In some examples, the computing device may comprise a client device such as client device 2306 which is located locally at a same location as a display on which the user views the video content. In that case, the client device may make the determination based on fantasy roster information stored in memory of the client device or by querying a remote fantasy sports service provider with which the user has an account via a network such as the Internet. Examples of such fantasy sports service providers include, without limitation, Yahoo! Fantasy Sports, NFL Fantasy Sports, CBS Fantasy Sports, Fox Fantasy Sports, ESPN Fantasy sports, Real Time Fantasy Sports, or any other fantasy sports service provider. In other examples, the determination may be made by a content source or intermediary device or service that is located at a site remote from the display on which the user views the video content.

At 2604, the computing device tunes to video content of a game or sporting event that depicts one or more athletes on one or more fantasy rosters of the user. Tuning to video content in this context includes tuning to an over the air television broadcast, tuning to a cable channel, tuning to a satellite channel, accessing the video content over the Internet or other network, or the like. In some examples, the video content comprises live video content of a game or sporting event. In other examples, the video content may be tape delayed, pre-recorded or the like. While in this example, the computing device tunes to video content that depicts athletes on a fantasy roster of the user, the computing device may additionally or alternatively tune to channels that depict other subjects of interest to the user (e.g., athletes on a roster of a current fantasy opponent, athletes on rosters of other league members, favorite athletes of the user, etc.). At 2606, the computing device receives the video content of the game or sporting event.

At 2608, the computing device determined whether one or more athletes of interest to the user are currently depicted in the video content. For example, the computing device may determine whether any of the user's fantasy players are currently on the field of play. If not, the computing device may return to 2604 to tune to other video content that depicts athletes on a fantasy roster of the user. Thus, the computing device may actively monitory available video content to tune to content that is currently depicting one or more athletes on a fantasy roster of the user. In this way, the user is readily able to view plays involving his or her fantasy athletes without the need to flip back and forth between channels. This helps to ensure that the user does not miss plays involving his or her fantasy players. Also, the techniques described herein greatly minimize the amount of time and effort required for a user to watch video content depicting his or her fantasy players.

If at 2608, the computing device determines that the video content depicts one or more athletes of interest to the user (e.g., on a fantasy roster of the user), the computing device may, at 2610, cause presentation of the video content on a display. The display may be integral with the computing device (e.g., in the case of a tablet computer or smart TV) or may be separate from the computing device (e.g., in the case of a personal computer or game console).

At 2612, the computing device may cause presentation, on the display, of a visual indicator associated with at least one athlete of interest. The visual indicator may highlight or otherwise identify the athlete of interest and indicate that the athlete of interest is on a roster of the fantasy sports team of the user. In this way, the user may more easily identify his or her fantasy players in the video content and will be better able to follow their play in the game or sporting event. In some examples, the visual indicator may be caused to be presented at or proximate to a location on the display at which the at least one athlete of interest is presented on the display. Additionally, in some examples, the visual indicator may track the motion of the at least one athlete of interest, such that when the at least one athlete of interest moves on the display, the visual indicator moves with the at least one athlete of interest. The visual indicator may take many different forms. By way of example and not limitation, each visual indicator may comprise a halo, silhouette, shadow, arrow, text, helmet graphic, shoe graphic, uniform graphic, symbol, icon, glow, outline, shape, or other indicator usable to designate an athlete of interest. The visual indicators may comprise application of a color, hue, and/or intensity to a portion of the video content to designate the athletes of interest. For instance, in one specific example of a visual indicator, a helmet and/or uniform of an athlete may be made to appear a different color, hue, and/or intensity in order to stand out.

In addition to calling attention to athletes of interest, the visual indicators may be interactive. Thus, at 2614, the computing device may receive an input or selection of a visual indicator by the user. Selection of the visual indicator may cause one or more different operations. For instance, as shown at block 2616, selection of the visual indicator may cause display of a fantasy roster of the user that includes the athlete of interest with which the visual indicator is associated. In that case, the roster may be overlaid on top of the video content as a pop up window or graphic, or the roster may replace the video content on the display. In another example, shown at block 2618, selection of the visual indicator may cause presentation of a control interface usable to control playback of the video content. Graphical user interface 2508 is an example of such a control interface. By way of example and not limitation the control interface may include a camera angle control usable to select an alternate camera view of the events depicted in the video content, a zoom control usable to zoom in or out on the athlete associated with the visual indicator, a center control usable to center the view on the athlete associated with the visual indicator, a replay control to replay a portion of the video content (e.g., the last 5 seconds, 10 seconds, 30 seconds, etc.) in regular or slow motion, a skip control to skip to a previous portion (or subsequent in the case of pre-recorded video content) of the video content depicting a play or event for which the athlete of interest was awarded or decremented fantasy points, or otherwise control the playback of the video content. Such controls may allow the user to view video content of athletes on his or her fantasy roster(s) in ways never before possible. Such additional viewing options may improve the user's understanding of how his or her fantasy athletes are performing, which in turn allows the user to better manage his or her fantasy team(s).

At 2620, the computing device may receive selection of a control of the control interface and, at 2622, may modify the playback of the video content according to the received selection of the control.

Figure 27:
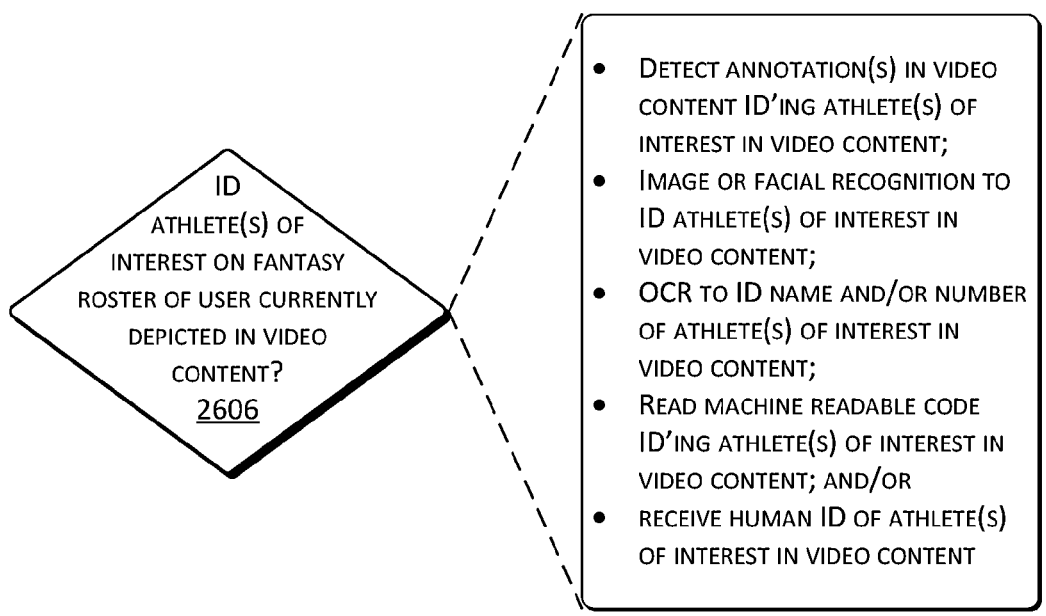
FIG. 27 illustrates example techniques for identifying or determining athletes of interest in the video content.

FIG. 27 illustrates example techniques for identifying or determining athletes of interest in the video content. As shown in FIG. 27, identification of athletes of interest in the video content may be performed by detecting one or more annotations in the video content identifying the at least one athlete of interest in the video content; using image recognition or facial recognition to identify the at least one athlete of interest in the video content; using optical character recognition to identify a name and/or number of the at least one athlete of interest in the video content; reading a machine readable code identifying the at least one athlete of interest in the video content; and/or receiving a human identification of the at least one athlete of interest in the video content.

While the method 2600 is described as being performed by a single computing device, in other examples, the method 2600 may be performed by multiple different computing devices (e.g., a client device, a content source, and/or an intermediary service).

Example Methods of Augmenting Video Content with Fantasy Information

Figure 28:
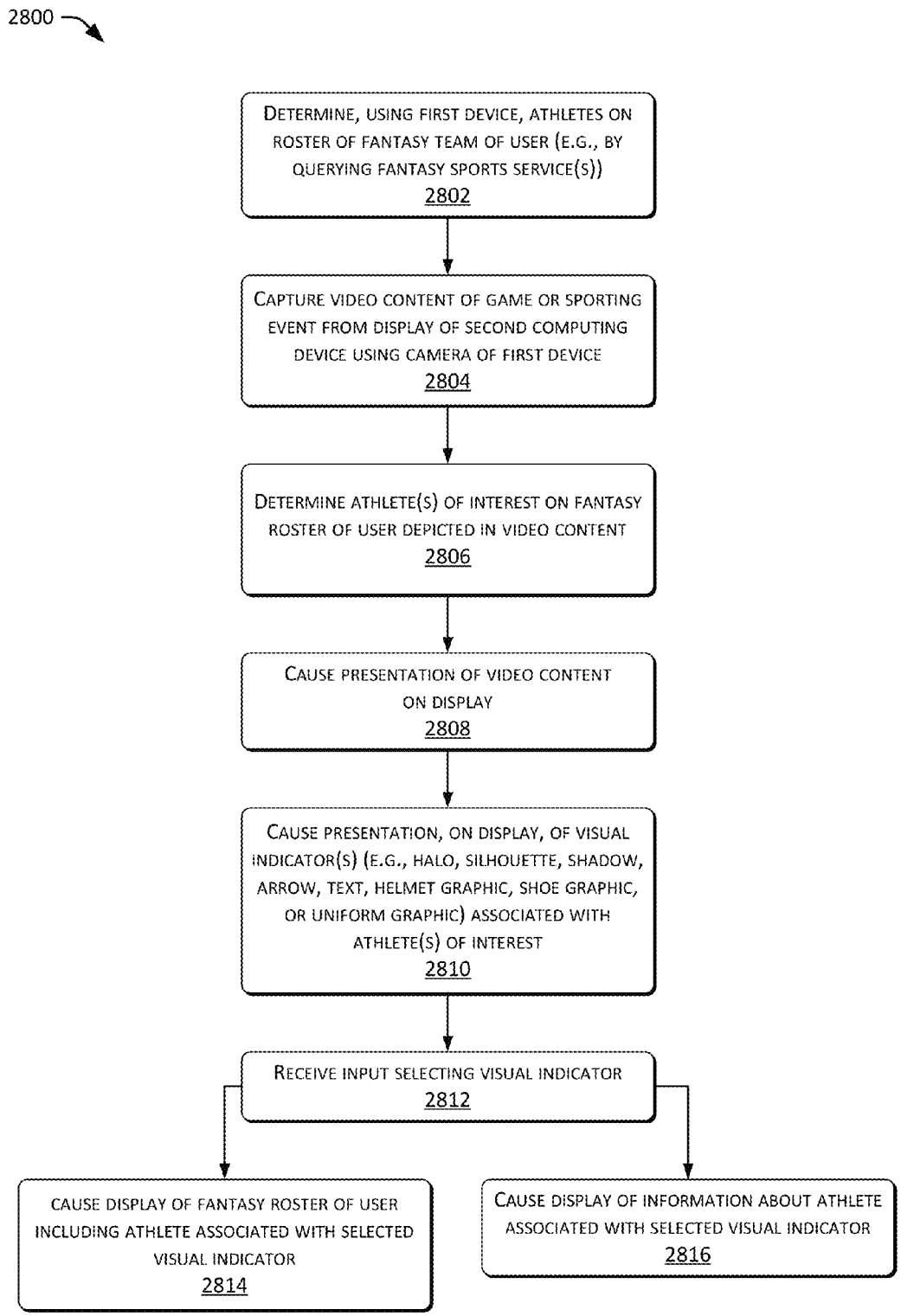
FIG. 28 is a flowchart illustrating an example method of augmenting video content with fantasy information.

FIG. 28 is a flowchart illustrating an example method 2800 of augmenting video content with fantasy information. The method 2800 may be performed by a tablet, mobile phone, or other client device having a camera. The method includes, at 2802, determining one or more athletes on a roster of a fantasy sports team of a user, or athletes otherwise of interest to the user. The client device may identify athletes on the roster of the fantasy sports team of the user by accessing roster information stored in memory or by querying a fantasy sports service provider with which the user has an account. At 2804, the client device captures video content of a game or sporting event from a display of another computing device using the camera. The video content of the game or sporting event may depict multiple athletes. At 2806, the client device identifies or determines at least one athlete of interest that is on the roster of the fantasy sports team of the user (or otherwise of interest to the user) and that is depicted in the video content of the game or sporting event on the display of the other device. The client device may identify or determine athletes of interest in the video content using any of the techniques described above.

At 2808, the computing device may cause presentation of the video content of the game or sporting event on a display of the client device (e.g., by reproducing the video content captured by the camera of the client device). At 2810, the client device may cause presentation, on the display of the client device, of a visual indicator associated with at least one athlete of interest. The visual indicator may augment the video content displayed on the display of the other device to clearly identify athletes that are on a fantasy roster of the user. As in the preceding section, the visual indicator may be presented at or proximate to a location on the display at which the athlete of interest is presented on the display and may track the motion of the athlete of interest, such that when the athlete of interest moves on the display, the visual indicator moves with the athlete of interest. The visual indicator may take the form of any of the visual indicators described in any of the preceding sections.

Using the techniques described in this section, the user may simply point a camera of his or her client device at a television or other display screen presenting conventional video content, and the client device may output augmented video content on a display of the client device that includes visual indicators to clearly designate the user's fantasy athletes. This makes it much easier for the user to keep track of the plays and movements of his or her fantasy athletes. Moreover, the user may interact with the visual indicators in order to view information about the athlete associated with the visual indicator and/or to cause display of a fantasy roster of the user that includes the athlete associated with the visual indicator. These techniques provide the user with greater access to information and provide the user with simpler access to manage fantasy rosters directly from within the video content viewing experience.

Figure 29:
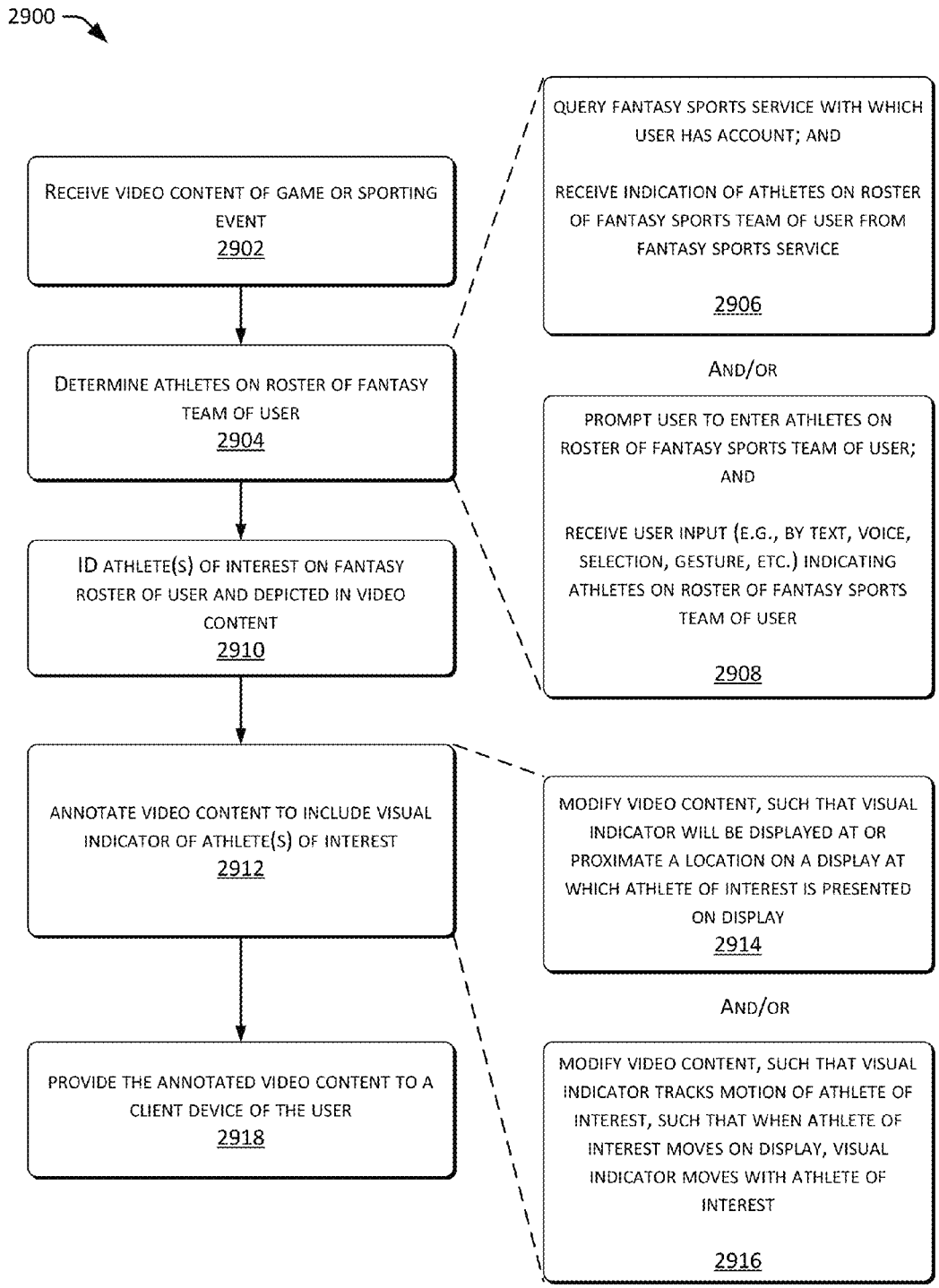
FIG. 29 is a flowchart illustrating an example method of annotating video content with user-specific fantasy information.

Example Methods of Annotating Video Content with User-Specific Fantasy Information FIG. 29 is a flowchart illustrating an example method 2900 of annotating video content with user-specific fantasy information. The method 2900 may be performed by a content source (e.g., broadcaster, distributor, cable provider, or the like) such as content source 2302.

The method 2900 includes, at 2902, receiving video content from one or more cameras depicting a game or sporting event. Each camera may record a separate video feed of the game or sporting event from a different angle or vantage point. At 2904, a computing device of the content source may determine one or more athletes on a roster of a fantasy team of a user. In some examples, the determination of athletes on the user's fantasy roster may be performed, at 2906, by querying a fantasy sports service provider with which the user has an account, and receiving a response from the fantasy sports provider indicating athletes on the roster of the user's fantasy sports team. In other examples, at 2908, the computing device of the content source may prompt the user to enter athletes on his or her fantasy sports rosters, and may receive user input by text, voice, selection, and/or gesture, indicating the athletes on the user's fantasy roster. In some examples, the prompt may be presented on a client device of the user and the input may be received via the user's client device and transmitted to the computing device of the content source.

At 2910, the computing device of the content source may identify at least one athlete of interest that is on the roster of the fantasy sports team of the user and is depicted in at least one video feed of the video content of the game or sporting event. At 2912, the computing device of the content source may annotate the video content of the game or sporting event to include a visual indicator of the at least one athlete of interest. The video content may be annotated automatically using any of the computerized techniques described herein, manually using any of the human based techniques described herein, or using a combination of computerized and manual techniques. In some examples, at 2914, annotating the video content may include modifying the video content such that the visual indicator will be displayed at or proximate a location on a display at which the athlete of interest will be displayed on the display. Additionally or alternatively, the annotation may configure the visual indicator to track a motion of the athlete of interest such that the visual indicator will move with the athlete of interest.

At 2918, the computing device of the content source may provide the annotated video content to a client device of the user (e.g., by transmitting the annotated video content to the client device via a network such as the Internet) for presentation on a display at the user's location.

Example Multi-Camera System

In some implementations, a single video feed may be provided by a network covering a particular sporting event (e.g., a football game). That feed may be segmented, the segmentations annotated with athlete performance and/or fantasy point information, and the segmentations may be transmitted to particular users based on an interleaver that considers fantasy information of each user.

In other implementations, a plurality of video feeds from a plurality of cameras may be provided by a network or other entity. The plurality of video feeds may include the output of a number of cameras that the network has available. Accordingly, a game broadcast by a network may include video selected from each of the number of cameras as the network switched between cameras. However, video from unselected cameras may include substantial content. This content may actually be valuable to show performances by athletes for which fantasy points may be awarded. Accordingly, video segments from several cameras may be concatenated together to fully illustrate an athletic performance of an athlete for which fantasy points may be awarded. Such concatenated segments may be sent to users that have an interest in the fantasy points or athletic performance shown.

In one example, a plurality of cameras at a sporting event may provide a plurality of different video feeds, and may show different players or locations. In the example of a football game, several of the cameras may provide different views as athlete(s) deliver performance(s) sufficient for the award of fantasy points. Content from the plurality of cameras may be segmented. Each segment may show all or part of a play, and may focus on one or more athletes or aspects of play. Segments from among the plurality of segments may be concatenated to provide a comprehensive account of a performance by an athlete sufficient for award of fantasy points. The views may include different camera angles, camera speeds, and/or different accompanying audio tracks. The concatenated segments may be transmitted to selected users. Users may be selected based in part on a user's fantasy team, fantasy league or opposing fantasy team.

Figure 30:
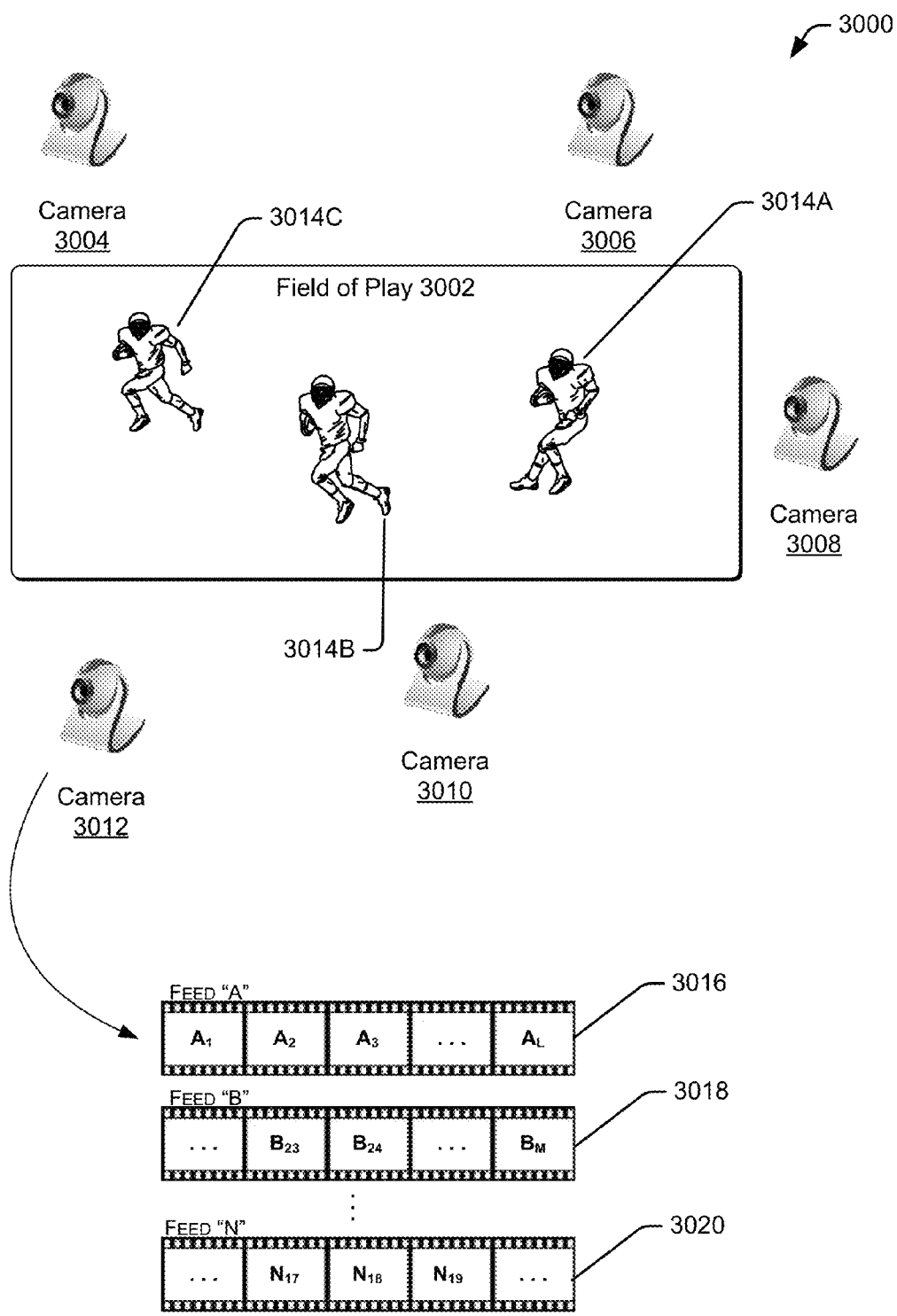
FIG. 30 is a diagram showing an example multi-camera system configured to provide a plurality of video feeds.

FIG. 30 shows an example implementation by which video output from multiple cameras may be utilized to provide a comprehensive description of an athlete's performance for which fantasy points may be awarded. A field of play 3002 (e.g., a football field, baseball diamond, etc.) is associated with a plurality of cameras. The number of cameras may vary between installations, but in the example shown camera 3004-3012 provide coverage of the game. A television network may utilize each camera, one at a time, during a broadcast. However, all of the camera may provide output in a continuous manner.

On the field of play 3002, one or more athletes may perform in a manner consistent with the award of fantasy points. The fantasy points may be awarded by a fantasy sports platform, the interleaver service 114 (FIG. 1) or other entity. In the example of FIG. 30, an athlete 3014 is shown in a sequence of positions 3014A, 3014B and 3014C. In each position, the athlete may be visible to a plurality of camera. However, in different locations on the field of play 3002, different video camera may be better suited to provide content to users. For example, at location 3014A, cameras 3006 and 3008 may provide preferred views, while at location 3014B camera 3010 provides a preferred view. A broadcast network may or may not use a camera which best shows any particular athlete, in part because they may be more concerned with an overall best view.

Each video camera provides a video feed as output. In the example shown, a plurality of video feeds 3016-3020 is shown. Each of the video feeds 3016-3020 may be used by a broadcast network, frequently or infrequently, during the course of a televised broadcast. However, unless a split picture is provided by the network, only one video feed is used at a time. Accordingly, a considerable unused content is potentially available.

Figure 31:
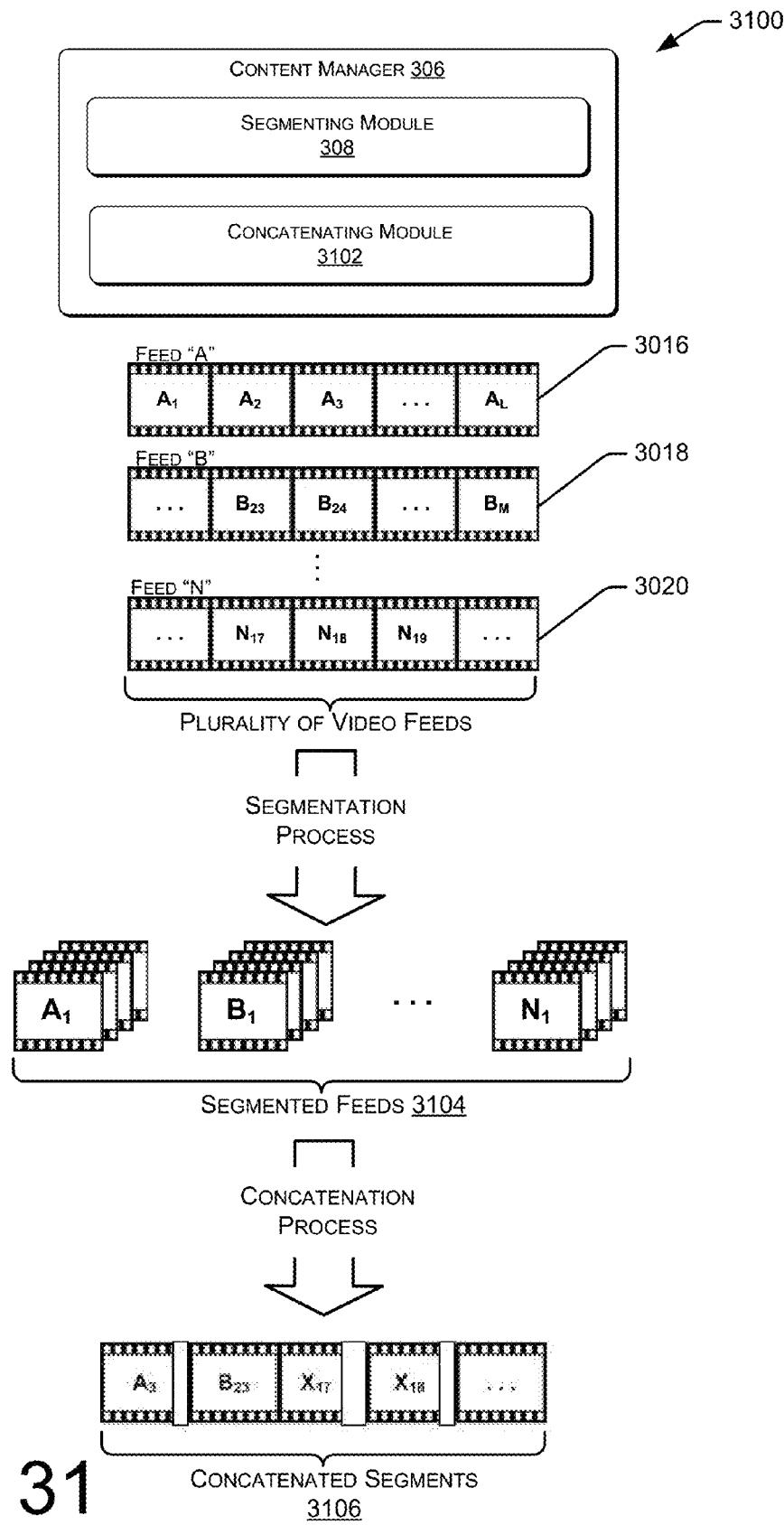
FIG. 31 is a diagram showing example techniques for content segmentation and concatenation.

FIG. 31 shows a version of the content manager (originally shown in FIG. 3) that is adapted to utilize the otherwise unused content provided by unused cameras. The content manager 306 may include a segmenting module 308 and a concatenating module 3102. The segmenting module 308 may be configured to segment content from the plurality of video feeds 3016-3020 into a plurality of segments. The segmentation may be made in a manner that segregates "plays" or other portions of a game into particular segments. In one example, the video feed 3016 has been segmented into segments A1, A2 through AL. Other segments 3018, 3020 are similarly segmented. The video feeds may be segmented according to "plays." However, some video feeds may be relevant for only one or more portions of a particular play, and segments may be made each of the relevant portions. Thus, the plurality of video feeds 3016-3020 undergoes a segmentation process to thereby create a plurality of segments 3104.

The concatenating module 3102 is configured to concatenate different segments from among the plurality of segments 3104, and to thereby create concatenated segments 3106. Accordingly, a plurality of different and/or complementary views (e.g., segments of the plurality of feeds 3016-3020) of an athlete's performance may be concatenated together. Some of the views may have been obtained from each of several different cameras, a single camera at several different times, or some combination of these. Thus, the concatenating module 3102 inputs segments 3104 obtained from a plurality of feeds 3016-3020 and outputs concatenated segments 3106.

Figure 32:
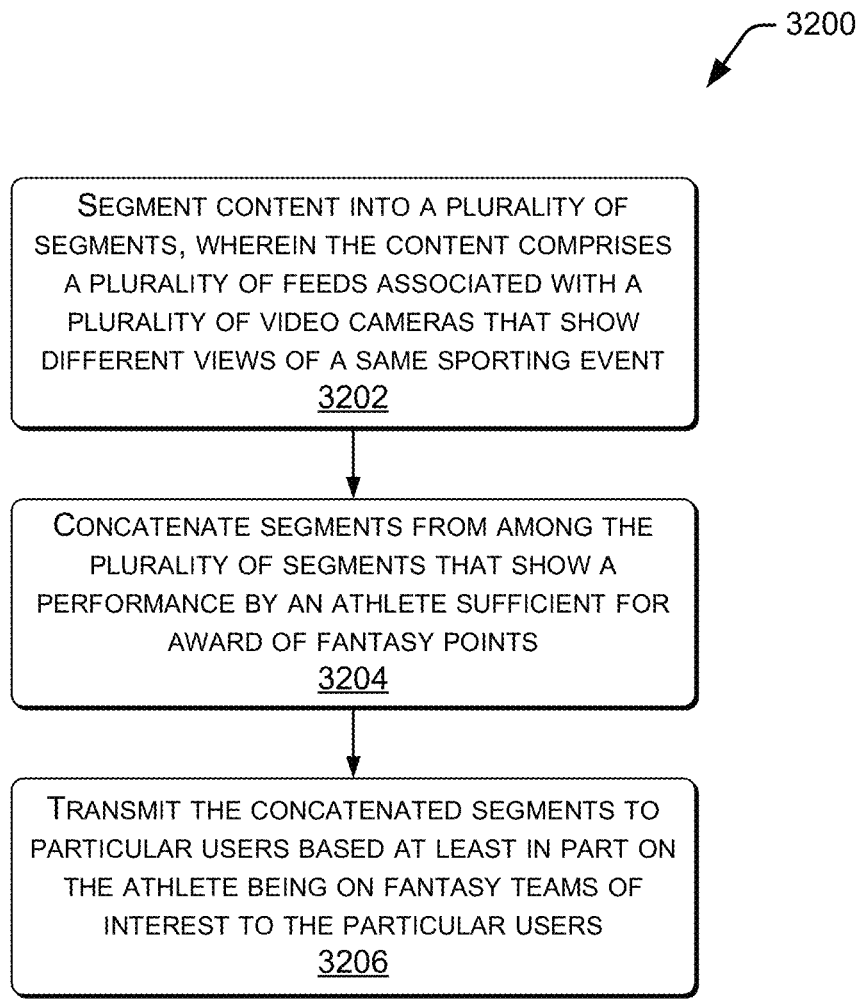
FIG. 32 is a flow diagram showing a method for content segmentation, concatenation and transmission.

FIG. 32 shows an example method by which content from a plurality of cameras may be segmented. The segments may correspond to "plays" or other portions of a game. A plurality of the segments may be concatenated together to provide a comprehensive account of a performance by an athlete, which may be consistent with the award of fantasy points. The concatenated segments may be sent to particular users, based upon an interest of the user in the athlete's performance and/or the award of fantasy points.

At block 3202, content may be segmented into a plurality of segments. The content may include a plurality of feeds associated with a plurality of video cameras. The video camera may show different views of a same sporting event.

At block 3204, segments may be concatenated to form a comprehensive account of an athlete's performance. The segments may be from among the plurality of segments, and may show a performance by an athlete sufficient for award of fantasy points.

At block 3206, the concatenated segments may be transmitted to particular users based at least in part on the athlete being on fantasy teams of interest to those particular users.

A method of providing data to clients may be performed under control of one or more processors configured with executable instructions. The content may be segmented into a plurality of segments. The segments may depict performance(s) related to awards of fantasy points. The content may include a plurality of feeds associated with a plurality of video cameras that show different views of a same sporting event. Once segmented, some of the plurality of segments may be concatenated. The concatenated segments show a performance by an athlete sufficient for award of fantasy points. This may includes a pass, a catch, a tackle or other performance. The concatenated segments may be transmitted to particular users based at least in part on the athlete being on fantasy teams of interest to the particular users. The segmenting the may be based at least in part on a play clock or a game clock. The segmenting the content may be based at least in part on recognition of a player formation, such as players lined up on the line of scrimmage, a pitcher holding the baseball on the mound, basketball players gathered for a jump ball, etc. The segmenting may associate an audio portion of a first segment with a second segment. For example, the audio of a less helpful video segment may be moved to a more helpful or illustrative video segment. The concatenating may include concatenating segments recorded at least partially at the same time. That is, various video cameras may be recording relevant information at the same time, and such content may be segmented and concatenated. The concatenating of the segments may include concatenating segments from at least two of the plurality of video cameras. The concatenating may included include or combine a slow-motion version of one of the plurality of segments to other segments. The concatenating may link two segments from among the plurality of segments, wherein an intervening period of time separates the creation or filming of the concatenated segments.

A system may be used to segment, concatenate and transmit a compound or concatenated segment to a plurality of users, based at least in part on an athletic performance sufficient to award fantasy points and fantasy teams, leagues, opponents, etc., of the users. A content manager in the system may segment content into a plurality of segments, wherein the content comprises a plurality of feeds associated with a plurality of cameras. The content manager may also concatenate segments from among the plurality of segments that show a performance of an athlete sufficient for award of fantasy points and that show a plurality of different camera angles of the performance. The system may include a serving module to transmit the concatenated segments to particular users based at least in part on fantasy team associations of the particular users. The system may recognizes a number of the fantasy team associations of the particular users, such as fantasy team rosters, fantasy sport leagues or fantasy team opponents. The system may include a content manager to segment the content based at least in part on input received from an operator. In an example, the operator would consider where to start and end segments made from the content of different video cameras. The content manager may segments the content based at least in part on automated techniques that show game play sufficient to award fantasy points. For example, the automated techniques may recognize changes in the scoreboard, the play clock, referee signals and other events to indicate a starting point and an ending point for various content segments. The content manager may sequentially order the concatenated segments with a segment used by broadcast TV first. The segment used in broadcast TV may have an audio track that provides a preferred description of the events, and may be used to put subsequent segments in context. The content selection module may concatenate segments of different length (duration in time) and/or camera angle. The content manager may concatenate segments to depict additional performances of the athlete sufficient for award of the fantasy points. Thus, after a currently performance is shown, other past performances may be shown. Such a grouping of present and past performances may provide users with more information regarding an athlete. Similarly, the content manager may create a concatenated segment for each of a plurality of performances of a plurality of athletes, each performance sufficient for award of fantasy points.

A further method may provide data to clients and may be performed under control of one or more processors configured with executable instructions. In an example, each of a plurality of feeds associated with a plurality of video cameras may be segmented. The segments may be selected to show different views of a performance by an athlete sufficient for award of fantasy points. The segments may be concatenated from among segments that show the performance from a plurality of camera angles. The concatenated segments may be transmitted to particular users based at least in part on the athlete being on particular fantasy teams or in particular fantasy leagues. The segmenting of each of the plurality of feeds may include segmenting portions of the plurality of feeds based at least in part on a particular play in a football game. The segmenting each of the plurality of feeds may include segmenting the feeds to highlight the performance of the athlete and to show different views of the sporting event that overlap in time. The concatenating of segments may include concatenating segments used by replay officials. Generally, content from any camera at the sporting event may be segmented, concatenated with other segments to form a concatenated segment that may be transmitted to users. The users to which the content is transmitted may be selected based on fantasy points, fantasy teams, fantasy leagues and/or fantasy opponents.

A method of providing data to clients, comprising: under control of one or more processors configured with executable instructions: segmenting content into a plurality of segments, wherein the content comprises a plurality of feeds associated with a plurality of video cameras that show different views of a same sporting event; concatenating segments from among the plurality of segments, wherein the concatenated segments show a performance by an athlete sufficient for award of fantasy points; and transmitting the concatenated segments to particular users based at least in part on the athlete being on fantasy teams of interest to the particular users. The method, wherein the segmenting the content comprises: segmenting the content based at least in part on a play clock or a game clock. The method, wherein the segmenting the content comprises: segmenting the content based at least in part on recognition of a player formation. The method, wherein the segmenting the content comprises: associating an audio portion of a first segment with a second segment. The method, wherein concatenating the segments comprises: concatenating segments recorded at least partially at the same time. The method, wherein concatenating the segments comprises: concatenating segments from at least two of the plurality of video cameras. The method, additionally comprising: concatenating a slow-motion version of one of the plurality of segments. The method, wherein concatenating the segments comprises: concatenating two segments from among the plurality of segments, wherein an intervening period of time separates the concatenated segments.

A system, comprising: a content manager to: segment content into a plurality of segments, wherein the content comprises a plurality of feeds associated with a plurality of cameras; and concatenate segments from among the plurality of segments that show a performance of an athlete sufficient for award of fantasy points and that show a plurality of different camera angles of the performance; and a serving module to transmit the concatenated segments to particular users based at least in part on fantasy team associations of the particular users. The system, wherein the fantasy team associations of the particular users comprise fantasy team rosters, fantasy sport leagues or fantasy team opponents. The system, wherein the content manager segments the content based at least in part on input received from an operator. The system, wherein the content manager segments the content based at least in part on automated techniques that show game play sufficient to award fantasy points. The system, wherein the content manager sequentially orders the concatenated segments with a segment used by broadcast TV first. The system, wherein the content selection module concatenates segments of different length and camera angle. The system, wherein the content manager concatenates segments to depict additional performances of the athlete sufficient for award of the fantasy points. The system, wherein the content manager creates a concatenated segment for each of a plurality of performances of a plurality of athletes, each performance sufficient for award of fantasy points.

A method of providing data to clients, comprising: under control of one or more processors configured with executable instructions: segmenting each of a plurality of feeds associated with a plurality of video cameras that show different views of a performance by an athlete sufficient for award of fantasy points; concatenating segments from among the plurality of segments to show the performance from a plurality of camera angles; and transmitting the concatenated segments to particular users based at least in part on the athlete being on particular fantasy teams or in particular fantasy leagues. The method, wherein the segmenting each of the plurality of feeds comprises: segmenting portions of the plurality of feeds based at least in part on a particular play in a football game. The method, wherein the segmenting each of the plurality of feeds comprises: segmenting the feeds to highlight the performance of the athlete and to show different views of the sporting event that overlap in time. The method, wherein concatenating segments comprises: concatenating segments used by replay officials.

A plurality of cameras at a sporting event may provide a plurality of different video feeds, and may show different players or locations. In the example of a football game, several of the cameras may provide different views as athlete(s) deliver performance(s) sufficient for the award of fantasy points. Content from the plurality of cameras may be segmented. Each segment may show all or part of a play, and may focus on one or more athletes or aspects of play. Segments from among the plurality of segments may be concatenated to provide a comprehensive account of a performance by an athlete sufficient for award of fantasy points. The views may include different camera angles, camera speeds, and/or different accompanying audio tracks. The concatenated segments may be transmitted to selected users. Users may be selected based in part on a user's fantasy team, fantasy league or opposing fantasy team.

Example Audio Generator

An audio generator may be located within, or in communication with, the interleaver module 316, the data sources 108 and/or elsewhere. The audio generator may generate a plurality of custom audio soundtracks for all or part of some or all of the copies of each of a plurality of video clips. Accordingly, audio for use with a particular clip may be customized according to the fantasy information and/or fantasy points associated with a specific user and/or client device. The audio may be further customized based on the user to which the clip is sent. Thus, a plurality of users may receive the same or similar video (e.g., because their teams, which may be in different leagues, have overlapping athletes on their rosters). However, the audio may be customized for each user's particular fantasy point, fantasy team and/or fantasy league situation.

In one example, the client device may play video showing athletes, particularly athletes earning fantasy points. The video may include some or all of the audio originally associated with the clip by the data sources 108 (e.g., network commentators and crowd noise). However, it may also include custom audio created by the audio generator. The custom audio may provide fantasy point information specific to each user of each copy of each video clip. Continuing the example, a video clip may include some of the original audio used in a televised or internet broadcast of a game (e.g., NFL, NBA, MLB, etc.) and some custom audio from the audio generator. The custom audio may report fantasy point information, reference the user's team name, reference the opponent's team name, or other information that is relevant to the user, but which may not be relevant to other users. The custom audio may replace original audio over a portion of the video clip, or may be used while repeating all or part of the video clip, or may be otherwise used.

While the audio generator may be used to report fantasy point information to a user, such fantasy information may also be reported by annotations to the video (e.g., annotations 1008 in FIG. 10). For example, an inset box, a header, a footer and/or other text may be used to convey fantasy point information. In one example, the user may select how the user would like fantasy point information to be conveyed by configuring the operation of a user interface. The user may select to have one or both of audio and text report fantasy point information.

Referring to the example of FIG. 1, an audio track for each video segment may comprise the audio track of the content 102 obtained from the content source(s) 104. In one example, a television and/or sports network may provide audio/video content to the interleaver service 114. The audio portion of such audio/video content (i.e., "original audio") may be utilized as all or part of the custom content 116 sent to client device(s) 118. However, such audio received as part of the content 102 may not include fantasy point information available in the data 106. Accordingly, custom audio may be generated for at least some of the custom content 116. In one example, custom audio is utilized with original audio with at least some video clips sent to clients 118. The custom audio may report fantasy point information (e.g., regarding an associated video clip), fantasy team score information and/or fantasy league standings.

Referring to the example of FIG. 2, a plurality of video clips may be segmented from at least one content stream, such as a sporting event. Thus, content feeds from each of several live football, soccer, baseball or other games may be segmented into segments or "plays." At least some of the segmented video clips may be annotated or associated with, linked to, or otherwise associated with fantasy point information. The annotations may be attached to video clip data of each clip, or may be associated with the video clip by means of data pointers, a database or other data structure. While all or part of the audio originally created with the video may be retained, portions of at least some of the plurality of video clips may be associated with customized audio. The customized audio may report fantasy point information, describe the performance of various athletes and/or provide other information to an "owner" of a fantasy sport team.

In the example of FIG. 2, different users may receive different mixes of the plurality of video clips. Moreover, at least some video clips received by some user(s) may have a custom soundtrack based at least in part on the fantasy point information annotated and/or associated with each clip. Different users in different leagues having a same athlete on their fantasy teams may receive the same or similar custom audio. However, the audio may be customized to each particular user, based at least in part on the particular user's fantasy team(s), favorite athletes of the particular user, key or best-known athletes, fantasy team(s) of the user's opponent(s), etc. A user may watch a video clip with audio sound track announcing the user's name as fantasy team "owner," the name of that user's fantasy team, a description of the exploits of a particular athlete and a particular fantasy point value awarded by that user's league for the athlete's performance. Another user (e.g., in another league) may (or may not) see the same clip, either because of the same athlete or a different athlete in the same clip. The custom audio heard by that user may differ in that the audio may mention that user's different team name, and perhaps different fantasy points awarded by that user's league and/or fantasy sports platform (e.g., Yahoo! or other provider).

An audio generator (AG) provides fantasy point information, play-by-play calls, and/or other information. In one example, the AG play-calls most/all of the plays having fantasy point significance to teams within a league. The AG refers to at least some of the teams in the league, their athletes and/or fantasy points associated with video clips. The user may select a preferred voice for the customized audio. The AG may describe performances by one or more athletes and discuss fantasy points associated with the performances. The AG may refer to total fantasy points and/or projected fantasy points for a fantasy team and an opponent of the fantasy team. That is, the AG may talk about which team has more points and/or which team is ahead. The AG may refer to playoff hopes and/or league standings of one or more fantasy teams. The AG may be mixed with network-supplied audio, each of which is used over portions of the video clip. The AG may just talk over all or part of the clip to deliver the fantasy point information, and then the entire clip may be played with the network-supplied audio. Thus, the user may see all/part of the action as described by the AG, and then all/part of the action as described by network audio. The AG may mix generic audio intended for a plurality of users (e.g. descriptions of athletes) with custom words or phrases (like team names, exact fantasy points awarded by different leagues, etc.). The AG may overlay some or all of the video clip. Just like the announcer at a Spokane Indians game or on Spokane radio is biased in favor of the home team, the AG may be biased in favor of the user's fantasy team ("the Gears of Warriors are really showing their superiority on the field now, particularly with that last run by . . . "). Alternatively (and particularly for party mode) the AG may be neutral, like professional network announcers.

A server may provide video clips and an "audio generator" audio track that may cover some or all of any video clip. The AG may discuss fantasy point information, athlete(s)' performances, fantasy game scores, etc. The AG creates a custom audio cover for the video clips that is different for different clients. The AG creates a realistic audio track, with crowd noise and one or more announcers' voices. The AG may use synthetic or human recorded voices. The server may allow entertainers to upload their "audio cover" of individual clips. The user may select an entertainer, by selecting an entertainer for one clip, or by setting a hierarchy of entertainers, etc. The AG may allow selection between outrageous/extreme announcing and professional/conventional announcing. This may be on a slider, allowing younger users to select an announcer that is more popular to them, and others to do the same. The user may assign a "fight song," to be played when certain fantasy points are scored or fantasy point information is present. E.g., a favorite song may play when the user scores more than X-value points, when the user is ahead in the game, etc., as selected by a UI. A server may provide video clips and an "audio generator" audio track that may cover some or all of any video clip. The AG may discuss fantasy point information, athlete(s)' performances, fantasy game scores, etc. The AG creates a custom audio cover for the video clips using fantasy point information. The server provides a user interface to the client, so that the user may select preferred announcers for the soundtrack.

A method of generating a custom content stream for at least some of a plurality of users, comprising: under control of one or more processors configured with executable instructions: segmenting a plurality of video clips from at least one content stream; annotating at least some of the segmented plurality of video clips with fantasy point information; overlaying at least some of the plurality of video clips with audio customized to vocalize at least portions of the annotated fantasy point information; and interleaving at least some of the plurality of video clips to form at least part of at least some of the custom content streams, wherein the plurality of video clips are selected based at least in part on the annotated fantasy point information. The method, wherein a selection of voices is provided for use with the overlaying with customized audio. The method, wherein the customized audio discusses performances by one or more athletes and discusses fantasy points associated with the performances. The method, wherein the customized audio refers to total fantasy points and/or projected fantasy points for a fantasy team and/or an opponent of the fantasy team. The method, wherein the audio refers to playoff hopes and/or league standings of one or more fantasy teams. The method, wherein overlaying the audio comprises mixing the customized audio with network-supplied audio, each of which is used over at least a portion of a video clip from among the plurality of video clips. The method, wherein: a video clip from among the plurality of video clips is reformatted to repeat at least a portion of the video; network-supplied audio is used with one portion of the reformatted video clip and customized audio is used with a different portion of the reformatted video clip; and the customized audio refers to fantasy point information of a specific user. The method, wherein overlaying the audio comprises mixing generic audio intended for a plurality of users with custom audio intended for one or more users associated with a specific fantasy league or specific fantasy team. The method, wherein a portion of a video clip which is overlaid by the customized audio is adjustable. The method, wherein a bias vs. neutrality of the customized audio may be adjusted by the user.

A server, comprising: a content segment generator to create a plurality of video clips from at least one content stream; a video clip annotator to associate at least some of the plurality of video clips with fantasy point information; an audio generator to overlay at least some of the plurality of video clips with audio customized based at least in part on the fantasy point information; and an interleaver service to select at least some of the plurality of video clips for transmission to each of a plurality of clients based at least in part on fantasy point information. The server, wherein the audio generator provides different audio for a same video clip sent to different clients. The server, wherein the audio generator provides crowd noise to accompany discussion by one or more announcers. The server, wherein the audio generator allows selection of computer generated voices and/or human announcer voices. The server, wherein: the server receives uploaded audio covers for video clips; and the server provides the uploaded audio cover to a user. The server, wherein the audio generator allows selection between an outrageous/extreme announcing style and a professional/conventional announcing style. The server, wherein the audio generator inserts a song or song segment into particular video clips based on fantasy point information.

A server, comprising: a content segment generator to create a plurality of video clips from at least one content stream; a scraper to obtain fantasy information from one or more local or remote servers; an audio generator to provide a soundtrack to at least some of the plurality of video clips; and an interleaver service to select at least some of the plurality of video clips for transmission to each of a plurality of clients based at least in part on the obtained fantasy point information. The server, wherein: the fantasy information is fantasy point information; and the audio generator creates the soundtrack for at least some of the plurality of video clips using the fantasy point information. The server, wherein the server provides a user interface to the plurality of clients, and provides the soundtrack based in at least in part on information received from the user interface.

A plurality of custom audio soundtracks for each of a plurality of copies of each of a plurality of video clips may be generated. The plurality of video clips may be segmented from at least one content stream, such as a sporting event. In one example, a content feed from each of several live games is segmented into "plays." At least some of the segmented video clips may be annotated with fantasy point information.

Portions of at least some of the plurality of video clips are overlaid with audio customized to vocalize fantasy point information and/or athlete accomplishment associated with a particular user. Each user may receive a different mix of the plurality of video clips, each having a different soundtrack based at least in part on the annotated fantasy point information associated with each video clip and fantasy team(s) of the particular user, the user's opponent, etc.

Additional Examples

The following paragraphs describe additional examples that relate to providing custom content to users. Each of these additional examples may be implemented alone or in combination with any one or more others of the other examples described herein. Some of these additional examples are described in isolation (i.e., without reference to the foregoing discussion). However, unless specifically described to the contrary, any of these additional examples may be implemented using or in combination with the examples and implementations described above.

Overview of an Example Server in Push Mode

In some examples, server(s) receive content, such as audio/video feeds (hereinafter, "video feeds") of a plurality of athletic contests (e.g., football or baseball games). The content is segmented into "video clips," which may include short periods of play within the game. In the context of an example related to fantasy football, a video clip may show one play or down, several plays (e.g., a goal line stand by the defense), or other segment of a game. In the context of baseball, the video clip may show one pitch and any resulting play (base running) or one "up" by a batter. In the context of car racing, the video clip may show a lead change, a pit stop, or other action.

Each video clip may be annotated or scored by assigning "fantasy" points to one or more athletes (e.g., the quarterback) or groups of athletes (e.g., the defense) within the clip. The annotation process may or may not involve attachment of metadata to the video clip. The fantasy point information may be associated with the clip (e.g., by a database) or attached to the clip.

The annotation process may involve assignment of different fantasy point values to the performance of athletes based on factors including: a provider of the fantasy sports host or website used by the user's league; particular point characteristics of the user's leagues (e.g., as set by the league's commissioner), or other factors. Thus, the fantasy points assigned to any particular athlete for any particular play may vary among different users in different leagues, using different fantasy sports website hosts, etc.

The assignment of fantasy points may be performed in a manual or automated manner. In an example of manual assignment of fantasy points, a reviewer watches the clip, and assigns fantasy points based on the observation. The result may be both subjective and objective, particularly if the exact yardages of a gain are not immediately known.

Alternatively, fantasy points for one or more video clips may be obtained from different fantasy sport/league/team hosts—such as Yahoo! Sports, etc.—in an automated manner. Thus, the exact number of fantasy points that each league (based on that leagues rules, etc.), and/or each fantasy sports host, assigns to an athlete in a particular clip may be obtained (scraped) from servers of that league. Accordingly, a slightly different number of fantasy points may be attached to an athlete's performance depending on the fantasy sports host, the fantasy league, and other factors. Such points may be obtained from a fantasy sports user's account, e.g., by use of the user's login and password, through an account of a fellow league member of the user, or by other means.

Appropriate video clips (particularly those in which one or more athletes was assigned a fantasy point) may be sent (i.e., "pushed") by servers (e.g., the interleaver) to appropriate clients (i.e., the client devices of users). In some examples, each clip is sent to the devices of those users having an interest in one or more of the athletes depicted in the clip. The user's interest may be that an athlete depicted in the clip may be on a roster of fantasy team(s) of the user, the athlete may (even if not on the user's fantasy team) be a favorite of the user, the athlete may be on an opponent's fantasy team or on the fantasy team within the user's league. The athlete may play for a real-life favorite team of the user. The athlete may have performed a favorite play (e.g., touchdown or homerun) of the user. The servers may also send video clips to clients according to other reasons, such as required by settings or rules which may have been established by the server or client.

Depending on time available at the client to play the video clips, which are pushed or sent by the server, the client may require either shorter or longer versions of the clips, or follow-up information related to one or more clips. For example, if the client is currently scoring many fantasy points and currently receiving many video clips, shorter versions of the video clips (perhaps lacking commentator or announcer discussion) may be sent. However, if the client is currently scoring fewer fantasy points, and receiving fewer video clips than the client has time to play, longer video clips may be sent. Such longer clips may include more instant replays (perhaps in slow motion), color commentator annotations (or more such additions), longer coverage of the extra point after a touchdown, etc.

An example method, comprising: under control of one or more processors configured with executable instructions: creating a video clip from content; associating point information with the video clip; selecting clients based at least in part on the point information; and transmitting the video clip to the selected clients.

The method of any preceding example, wherein creating the video clip comprises: segmenting a play from a game; wherein the game is football or baseball.

The method of any preceding example, wherein associating point information comprises: awarding point data to at least one athlete active within the video clip; wherein the awarding is based at least in part on activity of the at least one athlete.

The method of any preceding example, wherein selecting clients comprises: selecting a client to whom the point information changes a score of a game in which the client is participating.

The method of any preceding example, wherein selecting clients comprises: selecting a client if the point information is relevant to a bench of the client or relevant to a league of the client.

The method of any preceding example, wherein selecting clients comprises: selecting clients based at least in part on an indication that the video clip is of interest to the client.

The method of any preceding example, wherein transmitting the video clip comprises: transmitting the video clip to some clients at different times to different clients, based at least in part on timing of other video clips transmitted to each of the different clients.

The method of any preceding example, additionally comprising: transmitting commercial messages to clients; and directing interspersed display of the commercial messages and video clips associated with point information.

An example system may comprise: a segmenting tool configured to segment video content into a plurality of segments; a scoring tool configured to associate point information with at least one of the plurality of segments; a manager configured to determine which of the plurality of segments should be transmitted to each of a plurality of clients based in part on the point information; and a transmission manager configured to transmit the determined segments to each of the plurality of clients.

The system of any preceding example, wherein: the segmenting tool is additionally configured to segment a plurality of games into a plurality of plays; the scoring tool is additionally configured to determine point information earned by a plurality of athletes in the plurality of plays; the manager is additionally configured to consider if athletes within a play are associated with a team of a client; and the transmission manager is additionally configured to communicate with apps running on at least some of the plurality of clients.

The system of any preceding example, wherein the system is configured to: provide a user interface to a technician; and accept, through operation of the user interface, point information associated with at least one segment and at least one athlete in the at least one segment.

The system of any preceding example, wherein the system is configured to: access data associating athletes, clients and segments as part of process deciding which segments to send to which clients.

The system of any preceding example, wherein the system is configured to: access data including information about a play schedule of each client as part of process deciding which segments to send to which clients.

The system of any preceding example, wherein the system configured to: prioritize segments according to point value for transmission to each of the plurality of clients.

The system of any preceding example, wherein the system is configured to: transmit a commercial message to a client from among the plurality of clients at a time based in part on availability of segments associated with point information relevant to the client.

One or more computer-readable media storing computer-executable instructions that, when executed, cause one or more processors to perform acts comprising: creating a plurality of video clips from a plurality of video feeds, at least some of the plurality of video feeds overlapping in time; associating point information with at least some of the plurality of the clips, the point information associated with each video clip derived from performance of athletes within that video clip; selecting clients, for each video clip to which point information has been associated, the selecting based at least in part on the point information, wherein each client has a team comprising a roster of athletes, and the selecting compares the point information of a video clip to the roster of athletes for each client; and transmitting a video clip to the selected clients of that video clip.

The one or more computer-readable media of any preceding example, wherein:
each of the plurality of video clips comprise metadata accessible by a client; and
the plurality of video clips are configured according to at least two video formats.

The one or more computer-readable media of any preceding example, additionally comprising: selecting video clips for transmission to a client based in part on a lull in point-relevant video clips for the client; and transmitting the selected video clips to the clients.

The one or more computer-readable media of any preceding example, additionally comprising: selecting video clips for transmission to a client comprising video clips relevant to the client based on point information and video clips relevant to other clients; and transmitting the selected video clips to the clients.

The one or more computer-readable media of any preceding example, additionally comprising: selecting video clips for transmission to a client comprising video clips relevant to the client based on point information and video clips indicated by the client; and transmitting the selected video clips to the clients.

The one or more computer-readable media of any preceding example, additionally comprising: examining a buffer operational of a client for fullness; wherein the transmitting of the video clip comprises transmitting a different version of the video clip associated with a same fantasy point event depending on the fullness of the buffer.

Server in Push mode. Techniques for configuring and operating a sports network client are described herein. In some examples, an audio/video feed is associated with each of a plurality of games (e.g., a plurality of football games). A plurality of video clips may be created from each video feed. Point information may be associated with each video clip. For example, if a football quarterback throws a touchdown pass within a video clip, points may be awarded to the quarterback. Clients may be selected based in part on the point information. For example, fantasy football players (i.e., clients of the sports network) may be selected because athletes involved in the video clip are associated with fantasy team(s) associated with the clients. The video clip may be transmitted to the selected clients and/or other clients based on the awarded points, available bandwidth, etc.

An example method includes: segmenting a video stream into a plurality of clips; annotating at least some of the clips with metadata, where the metadata based at least in part on activity depicted in each clip; and transmitting at least some of the annotated clips to a plurality of clients, wherein clients receive clips based at least in part on metadata associated with each clip received.

An example method comprising: segmenting a video stream of an athletic contest into a plurality of clips; distinguishing clips from among the plurality of clips; and transmitting at least some of the distinguished video clips to each of a plurality of clients.

In some examples, clips are distinguished based on the athletic achievement, athletic personnel, athletic teams and/or athletic play type depicted in each video clip. More particularly, the clips may be distinguished from among a plurality of clips based at least in part on athletic achievement in each clip, wherein a plurality of clips are distinguished by an achievement by at least one athlete depicted in the clip. At least some of the distinguished video clips may be transmitted to each of a plurality of clients, wherein clients may receive clips based at least in part on which athlete performed the achievement, which team the athlete plays for, or what the achievement was.

An example method includes: segmenting a video stream of an athletic contest into a plurality of clips; distinguishing clips from among the plurality of clips based at least in part on athletic achievement in each clip, wherein a plurality of clips are distinguished by an achievement by at least one athlete depicted in the clip; and transmitting at least some of the distinguished video clips to each of a plurality of clients, wherein clients receive clips based at least in part on which athlete performed the achievement, which team the athlete plays for, or what the achievement was.

An example server farm includes one or more processors and memory programmed with instructions to perform techniques comprising: segmenting a video stream into a plurality of clips; distinguishing clips from among the plurality of clips based at least in part on a plurality of characteristics, wherein at least some of a plurality of the video clips are associated with one or more of the plurality of characteristics; and transmitting at least some of the distinguished video clips to each of a plurality of clients, wherein clients receive clips based at least in part on characteristics from among the plurality of characteristics with which each client is associated.

The plurality of characteristics may include: any of a plurality of fantasy point awards; any of a plurality of athlete identifications; any of a plurality of sports team identifications; or any of a plurality of different play types (e.g., pass, run, touchdown, strikeout, etc.).

The server farm of any preceding example, wherein the plurality of characteristics comprise at least one of: fantasy points; athlete identity; team identity; or play type.

In some examples, certain clients may have an association with certain fantasy point awards. In a more particular example, fantasy points awarded to a specific athlete may be relevant or associated with specific clients. The specific athlete may be on the team of the client, an opponent of the client's team, a potential recruit of the client's team, etc.

The server farm of any preceding example, wherein: distinguishing comprises distinguishing clips based on fantasy points indicated by each clip; and transmitting comprises transmitting clips to clients based at least in part on an association by each client with fantasy points.

An example server farm including one or more processors and memory storing instructions programmed to perform techniques comprising: segmenting a video stream into a plurality of clips; segregating clips based at least in part on performance of specific athletes in each clip; and transmitting at least some of the plurality of clips to a plurality of clients, wherein clients receive clips based at least in part on the segregation.

The server farm of any preceding example, to perform techniques comprising: segmenting a video stream into a plurality of clips; segregating clips based at least in part on fantasy points awarded in each clip; and transmitting at least some of the plurality of clips to each of a plurality of clients, wherein clients receive clips based at least in part on the fantasy points awarded.

An example server farm including one or more processors and memory storing instructions programmed to perform techniques comprising: segmenting each of a plurality of video streams into a plurality of clips; identifying clips based at least in part on fantasy points awarded in clips, teams involved in clips, or athletes involved in clips; and transmitting at least some of the plurality of clips to each of a plurality of clients, wherein clients receive clips based at least in part on the identifying.

An example server farm including: a segmenter (e.g., segmenting module) to segment one or more video streams into a plurality of clips; an annotator (or tagging module) to annotate at least some of the plurality of clips with data; an interleaver (e.g., interleaver module) to associated annotated clips with clients based at least in part on the annotations of each clip; and a transmitter (e.g., radio or communication connection) to transmit at least some of the annotated clips to each of a plurality of clients.

An example server farm including one or more processors and memory storing instructions programmed to perform techniques comprising: segmenting two or more video streams into a plurality of clips; annotating at least some of the plurality of clips with fantasy sport data; and transmitting at annotated clips to each of a plurality of clients, wherein which clips go to which clients is based in part on a relationship of each client to at least one fantasy team.

The server farm of any preceding example, wherein the two or more video streams are overlap at least in part in time.

The server farm of any preceding example, wherein the annotating comprises: assigning point inform to one or more athletes depicted in a clip based on performance of the respective one or more athletes shown in the clip.

The server farm of any preceding example, wherein the transmitting comprises: transmitting a clip to a client, wherein a fantasy team associated with the client includes an athlete included on the clip.

The server farm of any preceding example, wherein the transmitting comprises: transmitting a clip to a client, wherein the clip includes an athlete associated with:
 a fantasy team of the client;
 a fantasy team opponent of the client;
 a team of interest to the client; or
 an athlete of interest to the client.

An example method includes:
 under control of one or more processors configured with executable instructions:
 segmenting one or more video streams into a plurality of clips;
 annotating at least some of the plurality of clips with data; and
 transmitting at least some of the annotated clips to each of a plurality of clients.

The method of any preceding example, wherein the data comprises at least one of:
 an identity of a team playing in a clip;
 an identify of an athlete playing in the clip;
 an achievement of an athlete playing in the clip; and
 an athletic achievements within the clip.

The method of any preceding example, wherein:
 the annotating associates sports information with at least some of the clips; and
 the transmitting is based in part on an association between a client and sports information associated with a clip.

The method of any preceding example, wherein:
 the annotating associates performance of athletes with clips; and
 the transmitting is based in part on a link between a client and data about an athlete associated with a clip.

The method of any preceding example, wherein:
 the annotating links data about performance of athletes with clips in which the athletes performed, respectively; and
 the transmitting comprises sending clips to clients based on data associated.

The method of any preceding example, wherein the segmenting comprises:
 segmenting two or more video streams into the plurality of clips, wherein at least some of the plurality of video clips include an audio track; and
 transmitting at least some of the annotated clips to each of a plurality of clients.

The method of any preceding example, wherein the annotating comprises:
 associating fantasy point information with the at least some of the plurality of clips.

The method of any preceding example, wherein the annotating comprises:
 associating point information with the at least some of the plurality of clips; attaching the associated point information;
 segmenting two or more video streams into the plurality of clips, wherein at least some of the plurality of video clips include an audio track; and
 transmitting at least some of the annotated clips to each of a plurality of clients.

The method of any preceding example, wherein the segmenting comprises:
 segmenting two or more video streams into the plurality of clips, wherein at least some of the plurality of video clips include an audio track; and
 transmitting at least some of the annotated clips to each of a plurality of clients.

The method of any preceding example, wherein the segmenting comprises:
 segmenting two or more video streams into the plurality of clips, wherein at least some of the plurality of video clips include an audio track;
 segmenting the; and
 transmitting at least some of the annotated clips to each of a plurality of clients.

In some examples, aspects of the "pull mode" for client and/or server (discussed above) may be combined with aspects of the client's user interface (UI). In some examples, the video clips pushed to a client may not provide a continuous video feed. In such an example, the pushed video clips may be based on fantasy sports points. The scoring of fantasy points may not result in sufficient video clips to fill the time a user is will to a lot to watching the client device. The client may therefore ask for more content, such as additional video clips. The video clips may include replays of prior shown video clips, highlights of various games that may not involve fantasy points relevant to the user, video clips related to athletes that the user is "scouting" for possible draft to the user's fantasy team, etc. In other examples, when the client's buffer is empty or low, servers may provide suggestions (e.g., suggestions sent to the client's UI) of video clips for the user watch. The UI may also allow "pull mode"-type requests (e.g., requests for clips not directly related to the user's fantasy team) from the clients. The user may request video clips from one or more of the user's favorite teams, favorite athletes, etc., and may watch a stream of such clips, optionally interleaved with fantasy point related clips. The server may respond to requests from the clients and their UI's with many options for video clips and/or other content. In an example, if there are 32 NFL teams, there could be 100+ touchdowns on a typical Sunday, and clients could request download of clips so that the user could watch them all (perhaps interleaved with commercial messages). The user and/or client could request such video clips at any time during the week (not just Sunday).

In some examples, a user may want to scout or otherwise review performance of athletes not on a fantasy team of the user.

An example method includes:
 under control of one or more processors configured with executable instructions:
 creating a plurality of clips comprising a plurality of plays, respectively, from each of a plurality of games;
 associating fantasy points with athletes within at least some of the plurality of clips based on performance of the athletes;
 receiving a request for clip from a client, wherein the request is based on part on fantasy points that do not change a score of a fantasy game of the client; and
 transmitting the requested clip to the requesting client.

In some examples, the request may be based on "plays" (e.g., portions of a game) during with an athlete was awarded fantasy points.

The method of any preceding example, wherein receiving the request comprises:

receiving a request having parameters expressed in part utilizing fantasy points.

Transmitting the requested clip may involve sending clips having fantasy point information in common.

The method of any preceding example, additionally comprising:

determining which of the plurality of clips are consistent with fantasy point criteria expressed by the request.

In several examples, for purposes of illustration, fantasy point criteria can be based on real life team, athlete, play type or other factor.

The method of any preceding example, wherein determining which of the plurality of clips are consistent with fantasy point criteria expressed by the request comprises:

determining which of the plurality of clips involve one or more particular real life teams;

determining which of the plurality of clips involve one or more particular athletes; or determining which of the plurality of clips involve one or more particular play types.

One or more computer-readable media storing computer-executable instructions that, when executed, cause one or more processors to perform example acts comprising:

segmenting one or more audio/video content feeds into a plurality of clips;

annotating at least some of the plurality of clips to indicate fantasy event information earned by one or more athletes; and transmitting clips to a plurality of clients based on a relationship between annotations of the transmitted clips and characteristics of the clients.

One or more computer-readable media as recited in any previous example, wherein a length of at least some of the clips is based in part grouping together related fantasy event information.

One or more computer-readable media as recited in any previous example, wherein a length of at least some of the clips is based in part grouping together related fantasy event information, the related fantasy event information comprising:

fantasy event information regarding a pass and a reception of the pass;

fantasy event information regarding a pass, a reception of the pass by a receiver and a tackle of the receiver;

fantasy event information regarding a pass, a reception and a touchdown;

fantasy event information regarding a pass and an interception;

fantasy event information regarding rushing yardage;

fantasy event information regarding rushing yardage and a tackle;

fantasy event information regarding rushing yardage and a touchdown;

fantasy event information regarding a punt and a return;

fantasy event information regarding a kick and a return;

fantasy event information regarding a field goal; or fantasy event information regarding a blocked field goal attempt.

One or more computer-readable media as recited in any previous example, wherein the fantasy event information comprises information sufficient to award fantasy points based on plurality of different fantasy point award schedules.

One or more computer-readable media as recited in any previous example, wherein the fantasy event information comprises information sufficient to allow a third party to attach fantasy points.

Overview of an Example Server Pull Mode

As in push mode, feeds of a plurality of games are segmented into video clips and assigned fantasy points, such as by the interleaver, the host of the fantasy sports website, the fantasy league or other arbiter of fantasy points. However, a fantasy team "owned" by a user (a person operating a client device) may not include all of the athletes of interest to the user. The user may request clips that would not have otherwise been sent to the user, based on the user's fantasy team, the opponent of the user's fantasy team or other reasons. Accordingly, servers acting in a "pull" mode may fulfill requests for clips from clients, particularly when the requested clips have not been previously pushed to the client(s). The server may be configured to receive requests for clips according to a plurality of parameters. For example, the server may fulfill requests for clips based on: athlete(s) involved; fantasy points scored by athlete(s) in a clip; fantasy point type (e.g., touchdown, strikeout, etc.); real life team associated with the clip; fantasy points scored by a real life team in the clip; etc. Thus, users may request, and server(s) may provide, clips based on user's favorite and/or of-interest real life team(s), athlete(s), play type (e.g. touchdowns, field goals, interceptions, strikeouts, homeruns, etc.), etc. Additionally, in pull mode the servers may respond to requests for clips including non-fantasy point content and/or clips, based on: cheerleader action on the sidelines, halftime shows, color commentators, end zone dances/celebrations, cheerleader interviews, particular commercial messages, commercial message types, commercial message sponsor, interviews of athletes, coaching interviews, etc.

An example method, comprising:

under control of one or more processors configured with executable instructions:

creating a plurality of clips comprising a plurality of plays, respectively, from each of a plurality of games;

associating points with athletes within at least some of the plurality of clips based on performance of the athletes;

receiving a request for a clip from a client, wherein the client sending the request has accumulated points associated with other clips; and transmitting the requested clip to the requesting client.

The method of any preceding example, additionally comprising:

storing the requested clip in a database prior to the request; and obtaining the clip from the database at least in part in response to the request.

The method of any preceding example, additionally comprising:

storing the clip in a database;

indexing the play according to actions of a plurality of athletes depicted in the play; and obtaining the clip from the database based on a match between the index and athlete information contained in the request.

The method of any preceding example, wherein the client from whom the request was received has a fantasy team that does not include athletes in the clip.

The method of any preceding example, wherein the client from whom the request was received has a fantasy team active in a league including an athlete in the clip associated with the request.

The method of any preceding example, wherein receiving the request comprises:

receiving the request for the clip from a client to whom a plurality of plays have previously been pushed.

The method of any preceding example, wherein receiving the request comprises:

receiving the request for the clip from a client referenced within a database as associated with a team with which points have been assigned.

An example system, comprising:

a database comprising indications of a plurality of leagues, a plurality of teams and a plurality of clients, each team associated with a plurality of athletes;

a segmenting tool configured to segment audio/video content into a plurality of segments;

a scoring tool configured to associate point information with the plurality of segments based on performance of athletes in each of the respective segments;

a manager configured to receive requests for segments from clients present in the database; and a transmission manager configured to transmit the plurality of segments to selected clients.

The system of any preceding example, wherein the scoring tool is additionally configured to:

provide a user interface to a technician to allow review of a segment; and annotate the segment with point information as indicated by input received by the provided user interface.

The system of any preceding example, wherein the scoring tool is additionally configured to:

receive input from a technician; and annotate the segment with the received input.

The system of any preceding example, wherein the manager is additionally configured to:

receive requests for segments from clients, wherein the clients sending requests are configured to accumulate points indicated by entries in the database.

The system of any preceding example, wherein the manager is additionally configured to:

receive requests for segments from clients, wherein the clients sending requests are configured to accumulate points based at least in part on points assigned by the scoring tool to segments.

The system of any preceding example, wherein the manager is additionally configured to:

receive requests for segments based at least in part on athletes featured in the requested segments.

The system of any preceding example, wherein the manager is additionally configured to:

receive requests for segments based at least in part on action featured in the requested segments.

The system of any preceding example, wherein the manager is additionally configured to:

receive requests for segments based at least in part on scoring which happened in the requested segments.

The system of any preceding example, wherein the manager is additionally configured to:

receive requests for segments based at least in part on action by a real life team in the segments.

One or more example computer-readable media storing computer-executable instructions that, when executed, cause one or more processors to perform acts comprising:

creating a plurality of clips from each of a plurality of games;

associating points with at least some of the plurality of clips based on performance of athletes;

receiving a request for a clip from a client, wherein the client sending the request is associated with a team that has accumulated points associated with other clips; and transmitting the requested clip to the requesting client.

The one or more computer-readable media of any preceding example, wherein receiving the request comprises:

receiving a request for one or more clips associated with one or more real life teams.

The one or more computer-readable media of any preceding example, wherein receiving the request comprises:

receiving a request for one or more clips associated with one or more athletes.

The one or more computer-readable media of any preceding example, wherein receiving the request comprises:

receiving a request for one or more clips associated with one or more types of plays.

SERVER IN PULL MODE. Techniques for configuring and operating a sports network are described herein. In some examples, an audio/video feed is associated with each of a plurality of games (e.g., football, baseball, etc.). A plurality of video clips may be created from each video feed. Point information may be associated with each video clip. For example, if a football quarterback throws a touchdown pass within a video clip, points may be awarded to the quarterback. The point information may be utilized to determine winners in fantasy games, wherein a plurality of clients are each associated with at least one fantasy team. A request may be received from one of the plurality of clients for one or more video clips. The video clip may be transmitted to the requesting client(s).

Overview of an Example Client in Push Mode

The client may comprise a computer, tablet or mobile device, and "push" is from the server point of view. Thus, the client may receive content, or links to content, "pushed" from the servers. In push mode, the client receives and plays video clip data, or buffers video clip data for later playback. The data may or may not come in smoothly from the servers, since plays for which the client has an interest (e.g., plays having fantasy points relevant to the client's team) may happen irregularly. Thus, buffer management allows each client to maintain a buffer of clips, or links to clips, from which to provide a customized stream of video to a display of the client. The user of the client may have a fantasy team, and therefore the client will receive a sequence pushed video clips that have fantasy point information that is relevant and/or related to the client's fantasy game. For example, the video segments pushed by the server to the client may be based at least in part on the roster of athletes on the client's fantasy team, the client's opponent's fantasy team, teams within a fantasy league of which the user is member, etc.

An example method, comprising:

under control of one or more processors configured with executable instructions:

fielding a fantasy team of athletes;

receiving a plurality of clips, wherein at least some of the plurality of clips have point information associated with the fantasy team of athletes; and displaying the received video clips.

The method of any preceding example, wherein fielding the fantasy team of athletes comprises:

distinguishing between fielded athletes and benched athletes, wherein the distinguishing is communicated to a server;

wherein a conflict between video clips involving a fielded athlete and a benched athlete is resolved by favoring the video clip associated with a fielded athlete.

The method of any preceding example, wherein fielding the fantasy team of athletes comprises:

selecting athletes involved in a fantasy game and for which point totals will be associated.

The method of any preceding example, wherein receiving the plurality of clips comprises:
receiving video clips associated with fielded athletes, benched athletes and opposing team athletes.

The method of any preceding example, wherein receiving the plurality of clips comprises:
buffering the plurality of clips before playback; and
providing an indication of content of one or more of the plurality of clips.

The method of any preceding example, wherein displaying the received video clips comprises:
altering an order of the received plurality of clips; and
displaying the plurality of video clips in the altered order.

The method of any preceding example, wherein displaying the received video clips comprises:
providing an indication of content of one or more of the plurality of clips to a user through a user interface; and
displaying one or more clips in response to direction received through the user interface.

An example client device, comprising:
a queue configured to store a plurality of video clips;
a display tool configured to:
obtain at least one video clip from the queue;
display the obtained video clip on a screen of the client device; and
display point information associated with at least one athlete associated with the displayed video clip, wherein the point information is associated with at least one fantasy team.

The system of any preceding example, the display of point information comprises:
a visual display of how the point information affects a fantasy team of a viewer of the displayed video clip.

The system of any preceding example, additionally comprising:
a priority tool to order display of the plays in the queue based in part on the point information.

The system of any preceding example, additionally comprising:
a download tool to download video clips and associated fantasy point information and to locate the downloaded video clips in the queue.

The system of any preceding example, additionally comprising:
an index allowing access to particular video clips in the queue based at least in part on fantasy point information.

The system of any preceding example, additionally comprising:
an index allowing access to particular video clips in the queue based at least in part on fantasy team affiliation of athletes in the video clips.

The system of any preceding example, additionally comprising:
an index allowing access to particular video clips in the queue based at least in part on chronological order of events resulting in award of the point information;
wherein the point information is fantasy point information.

The system of any preceding example, wherein the display tool is additionally configured to:
display commercial messages while simultaneously displaying fantasy point information.

An example of one or more computer-readable media storing computer-executable instructions that, when executed, cause one or more processors to perform acts comprising:
receiving a plurality of clips, wherein at least some of the plurality of clips are associated with point information of a fantasy team of athletes; and
displaying at least some of the received video clips with an indication of an effect to the fantasy team of athletes; and
displaying at least some of the point information of the clips in a cumulative manner according to the fantasy team of athletes.

The one or more computer-readable media of any preceding example, wherein displaying the point information for the clip comprises:
displaying point information associated with one or more athletes awarded points for performance shown by the clip.

The one or more computer-readable media of any preceding example, additionally comprising:
receiving at least one commercial message; and
interleaving the at least one commercial message with the received plurality of video clips;
wherein the commercial message is displayed at a time based in part on the point information.

The one or more computer-readable media of any preceding example, wherein the indication of an effect to the fantasy team of athletes comprises:
an identification of an athlete on the fantasy team of athletes within a video clip; and
an identification of accomplishment of the athlete.

The one or more computer-readable media of any preceding example, wherein displaying at least some of the point information comprises:
displaying point information of an athlete in a clip while that clip is displayed.

CLIENT IN PUSH MODE. Techniques for configuring and operating a sports network client are described herein. In some examples, a client may be associated with a fantasy team comprising a plurality of athletes. The client may receive clips associated with portions of a plurality of audio/video feeds, each feed associated with a game (e.g., a football game). Some of the received clips may be associated with athletes on the fantasy team of the client. The client may display one or more of the received clips. The client may also display fantasy point information in a play-related and/or cumulative manner.

Overview of an Example Client in Pull Mode

In a pull mode, a server provides content, such as video clips, to the client based on requests received from the client. The client may be software running on a user's computer or mobile device. In push mode, the client receives content that is assumed to be desired, e.g., content based on the rosters of the client's fantasy team and that team's current opponent. In contrast, in pull mode the client requests desired content, which is "pulled" from the server to the client. Thus, in pull mode the client is configured to (without limitation to these few examples): (1) present a user interface (UI) to the user, the UI configured to allow the user to select content that the user desires the server(s) to send the user's client device; (2) request clips depicting favorite and/or of-interest plays, athletes and/or teams, whether or not the clips are related to the client's fantasy team; (3) request analysis of such plays, athletes and/or teams by the commentators in the booth or on the sidelines, or by non-broadcast color commentators; (4) request key plays (e.g., touchdowns, big yardage gainers, interceptions, strikeouts and/or homeruns) in games which were not "pushed" to the client; (5) request clips of cheerleaders (by name or generally, cheering or interviewed) of one/more/all teams; (6) request any specific play or score; (7) clips of sports commentators discussion; (8) clips of color commentators that may not part of a televised game; (9) clips of coaches' and/or athletes' interviews; (10) cheerleaders cheering; and (11) request any other content, not necessarily related to fantasy points, but available on the servers. The user may indicate to the UI aspects of how the received clips are to be prioritized in the client's buffer.

An example method of operating a client in communication with a server, comprising:

under control of one or more processors configured with executable instructions:

requesting a video clip associated with fantasy point information;

receiving the video clip and the fantasy point information associated with the clip; and displaying the video clip on a video screen.

The method of any preceding example, additionally comprising:

transmitting fantasy point parameters with the request;

wherein the fantasy point parameters are sufficient to distinguish video clips as responsive or not responsive to the request.

The method of any preceding example, additionally comprising:

displaying the fantasy point information in the course of displaying the video clip.

The method of any preceding example, wherein requesting the video clip comprises requesting the video clip based at least in part on at least one of:

fantasy point information associated with a fantasy team of the client;

fantasy point information associated with a particular athlete; and fantasy point information associated with a particular type of play.

The method of any preceding example, wherein requesting the video clip comprises requesting the video clip based on at least one of:

fantasy point information associated with a fantasy team in a league of the client;

fantasy point information associated with an opposing team of the client; and fantasy point information associated with scouted athletes.

The method of any preceding example, wherein requesting the video clip comprises requesting the video clip based on:

requesting clips associated with a plurality of athletes of a real team, the requested clips identified based at least in part on fantasy points.

The method of any preceding example, additionally comprising:

providing a user interface to receive fantasy point parameters;

wherein the requesting is based at least in part on the fantasy point parameters.

An example client, comprising:

a user interface to allow entry of at least one fantasy point parameter;

a communications interface to request video clips based at least in part on the at least one fantasy point parameter; and a display engine to display video clips received in response to the request.

The client of any preceding example, wherein the at least one fantasy point parameter comprises:

award of fantasy points for touchdowns;

award of fantasy points for a particular athlete; or award of fantasy points for a particular real life team.

The client of any preceding example, wherein the user interface comprises tools to receive fantasy point parameters comprising:

a tool to allow entry of one or more real life teams;

a tool to allow entry of one or more particular athletes;

a tool to allow entry of one or more particular positions;

a tool to allow entry of one or more particular play types; and a tool to allow entry of one or more fantasy point threshold values.

The client of any preceding example, additionally comprising:

an interleaver to mix a sequence of the video clips received in response to the request with other video clips received without request.

The client of any preceding example, additionally comprising:

an interleaver to mix a sequence of the video clips received in response to the request with commercial messages received without request.

The client of any preceding example, additionally comprising:

an interleaver to prioritize video clips into a sequence for display based at least in part on input from the user interface, wherein the video clips comprise:

the requested video clips;

video clips received without request and received based on fantasy point information; and commercial messages received without request.

The client of any preceding example, additionally comprising:

a data structure to store the received video clips, in association with fantasy point information associated with at least some of the stored video clips, for later playback.

One or more computer-readable media storing example computer-executable instructions that, when executed, cause one or more processors to perform acts comprising:

obtaining, at the client, parameters based in part on fantasy points;

requesting a video clip be sent to the client, the video clip based at least in part on the obtained parameters;

receiving, at the client, the requested video clip; and displaying the received video clip.

The one or more example computer-readable media of any preceding example, wherein obtaining parameters comprises:

obtaining indicators of one or more real life teams;

obtaining indicators of one or more particular athletes; or obtaining indicators of one or more particular play type.

The one or more example computer-readable media of any preceding example, wherein the displaying comprises:

displaying the video clip together with display data based on the fantasy points.

The one or more example computer-readable media of any preceding example, wherein receiving the requested video clip comprises:

receiving a video clip featuring athletes consistent with a fantasy team of a user of the client.

The one or more example computer-readable media of any preceding example, wherein receiving the requested video clip comprises:

receiving a video clip featuring athletes associated with the fantasy points; and receiving a commercial message interleaved with the video clip and other video clips.

The one or more example computer-readable media of any preceding example, wherein displaying the received video clip comprises displaying interleaved video clips pushed from one or more servers, the interleaved video clips including both video clips pushed and pulled from the one or more servers.

CLIENT IN PULL MODE. Techniques for configuring and operating a sports network client are described herein. In some examples, a client may be associated with a fantasy team comprising a plurality of athletes. The client may request clips associated with portions of a plurality of audio/video feeds, each feed associated with a game (e.g., a football game). Some of the requested clips may be associated with athletes on fantasy teams of interest to the client. The client may display one or more of the requested clips after receipt. The client may also display fantasy point information in a play-related and/or cumulative manner.

Overview of an Example Transitional Score Estimate During Play

A fantasy sport (e.g., football) application may provide an estimated score at, or prior to, the beginning of a fantasy game. Fantasy football applications may also provide a running total of the fantasy points earned by different fantasy teams. However, this running total is problematic when compared to other fantasy team's running totals, because some fantasy teams have more athletes in either earlier or later games. Accordingly, while one fantasy team may have more points, the other fantasy team is in a better position, since it has many athletes who have not even begun to play.

The innovation uses the "full" projected score only for the athletes who have not yet played. The projected score may be used "in part" for athletes whose game is in progress. However, as real life play progresses, the projected score may be supplemented or altered by use of actual, rather than estimated, fantasy scores for the athletes who are playing or have played. Thus, as real life games progress, substitution of actual fantasy point information for estimated fantasy point information becomes a progressively better estimate of the actual fantasy game score.

In some examples, an estimated score of a fantasy game may be sent (e.g., from a server) to a user interface (e.g., operable on a client) for reference before the fantasy game. Since real life play has not yet started, an estimate of a user's fantasy team score may be made in part by reference to past performance of each athlete fielded by a fantasy team. As real life play is performed, the fantasy points that will be earned by each athlete on a user's team are more easily estimated. For example, after one or two quarters of play of a real life game, each athlete's fantasy points could be multiplied by four or two, respectively, as an estimate of the entire game's fantasy points. Alternatively, at halftime, the before-game estimate could be reduced by half and added to the athlete's current fantasy point total as a revised estimate. Accordingly, a variety of algorithms could be used to provide increasingly better fantasy point estimates for each athlete (and the user's entire fantasy team), as that athlete's play progresses in the real life game. Accordingly, the user interface at the client could be caused to update an estimate each athlete's fantasy points and/or the user's fantasy team points as real life games progress. And further, this progressively better estimate could be used to compare to the user's fantasy league opponent as play progresses.

An example method, comprising:
under control of one or more processors configured with executable instructions:
sending an estimated score of a fantasy game to a user interface;
iteratively replacing estimated scores of athletes used to calculate the estimated score based in part on actual scores of the athletes, thereby creating a refinement of the estimated score;
sending the refinement of the estimated score for display on the user interface; and
sending a final score of the fantasy sports game, upon conclusion of participation of all athletes of the fantasy sports game.

The method of any preceding example, additionally comprising:
calculating the estimated score of the fantasy game, for use at least before the fantasy game begins;
wherein the estimated score is based at least in part on previous performance of at least some athletes participating in the fantasy sports game.

The method of any preceding example, additionally comprising:
performing another iteration each time an athlete ends participation in the fantasy game.

The method of any preceding example, wherein iteratively replacing estimated scores of athletes comprises:
extrapolating a fraction of a performance of an athlete to replace an estimated score of the athlete; and
updating the fraction used periodically as a game involving the athlete progresses.

The method of any preceding example, wherein:
the calculating is performed on either a client or a server; and
the user interface is operable on the client.

The method of any preceding example, wherein the estimated score, the refinement of the estimated score or the final score may be altered to reflect utilization of benched athletes according to alternative scenarios.

The method of any preceding example, additionally comprising:
providing tools of the user interface to allow selection of:
scores of an opponent of a user of the user interface involved in the fantasy game; or
scores of opponents of the user of the user interface involved in other games in a fantasy league of the user.

An example server, comprising:
a processor;
memory, in communication with the processor; and
a score calculation module, defined within the memory, configured to:
send an estimated score information for a fantasy game to a user interface;
transition the estimated score of the fantasy game into a real score of the fantasy game; and
send a final score of the fantasy sports game, upon conclusion of participation of all athletes of the fantasy sports game.

The server of any preceding example, wherein the estimated score information comprises:
information to calculate an estimated score for the fantasy game.

The server of any preceding example, wherein the estimated score information comprises:
estimated point information on a plurality of fielded athletes on both teams in the fantasy game.

The server of any preceding example, wherein the transitioning comprises:
updating an estimated score of an athlete based on at least one earned point by the athlete; and
updating the estimated score of the fantasy game based in part on the updated estimated score of the athlete.

The server of any preceding example, wherein the transitioning comprises:
updating an estimated score of an athlete based on a failure of the athlete to score within a portion of a game involving the athlete; and
updating the estimated score of the fantasy game based in part on the updated estimated score of the athlete.

The server of any preceding example, wherein the transitioning comprises:
changing the estimated score of the fantasy game as the fantasy game progresses as indicated by results of a plurality of real athletes in a plurality of real games.

The server of any preceding example, wherein the transitioning comprises:
changing the estimated score of the fantasy game as underlying real games progress.

One or more computer-readable media storing example computer-executable instructions that, when executed, cause one or more processors to perform acts comprising:
under control of one or more processors configured with executable instructions:
send an estimated score information for a fantasy game to a user interface;
display a plurality of updates to the estimated score as athletes perform in a plurality of real life games; and
send a final score of the fantasy sports game, upon conclusion of participation of all athletes of the fantasy sports game.

The one or more computer-readable media of any preceding example, wherein the display of the plurality of updates comprises:
receiving an indication of an alternative team lineup; and
displaying at least one of the plurality of updates based on the alternative team lineup.

The one or more computer-readable media of any preceding example, wherein the display of the plurality of updates comprises:
basing at least one of the plurality of updates on an arbitrary team in a fantasy league.

The one or more computer-readable media of any preceding example, wherein display of the plurality of updates comprises:
displaying a listing of teams in a fantasy league within which the fantasy game was played; and
displaying, for each of a plurality of the teams in the listing, an updated score based on performance of athletes on each team.

The one or more computer-readable media of any preceding example, wherein display of the plurality of updates comprises:
displaying a listing of teams; and
displaying an updated score for each team, wherein the updated score is a revision of an original estimated score.

The one or more computer-readable media of any preceding example, wherein display of the plurality of updates comprises:
replacing estimated score information with actual score information as the actual scores become available.

TRANSITION SCORE ESTIMATE. Techniques for fantasy sport score reporting are described herein. An example fantasy football team may include a number of athletes that play for a number of professional teams in a football league. Performance of the athletes in their real life games earns each athlete points, which aid the fantasy teams with which they are associated. In a game between the two fantasy teams, an initial estimated score is provided, based at least in part on information on athletes on each team. As real life games are played by the real life athletes, how well certain athletes performed, and therefore portions of the estimated score, become known. As the information becomes known, the estimated score is refined. Ultimately, the estimated score is completely replaced with an actual score.

Overview of an Example Client User Interface

Some users may watch and control operation of downloaded clips and other content on devices including a TV, laptop, tablet or cell phone, etc. using a client user interface (UI). The UI may enable functionality including moving athletes from bench to game, trading athletes with other teams, or acquiring "free agents." The UI may provide fantasy point information, estimated score information, transition score information, individual athlete estimated point information, transition point information and/or final fantasy point information. The UI may display video clips related to fantasy point information. For example, a video clip of a completed pass of a strikeout may be displayed. The UI may allow the user to alter an order of the queued video clips in the video buffer. In some examples, the UI may show that a touchdown is present in the buffer, and may allow the client may move it to a higher priority. In other examples, the UI may provide information about clips in the buffer, such as by annotations (e.g., touchdown, interception, short gain, etc.). The UI may allow the client to "page" through icons, links or other representations of available clips (previously seen and/or unseen) in the buffer. The UI may allow the client to replay clips. The UI may allow the client to pause a clip, or switch to a different clip. The UI may allow the client to filter plays (e.g., for point importance). The user interface may allow the client to order and/or request plays in the buffer (e.g., by chronology or importance). The UI may allow the client to rewind, freeze frame, zoom in, etc. The UI may allow the client to enter "pull mode" or to perform pull mode functions and to make general or specific requests for content. The requested content may include video clips, such as specific clips, clips having some characteristic (such a certain fantasy point score characteristic). The UI may allow a request for other content (e.g., requests for specific color commentators, types of commercials, plays by particular team(s), cheerleaders cheering, cheerleader interviews, end zone dances, etc). Some clients may be in multiple fantasy leagues and may use the UI to switch back and forth between teams, leagues and/or sports.

In some examples, users may watch and control operation of downloaded video clips and other content on devices including a TV, laptop, tablet or cell phone, etc., in part by operation using a client user interface (UI).

An example user interface of a client device, the client device of a type having a processor, a memory in communication with the processor and a screen in communication with the processor, the user interface comprising:
a region to display video clips comprising athletes and athletic play;
a region to display fantasy point information associated with the video clip comprising athletes and athletic play; and
a region to display fantasy point information associated with a fantasy team of a user.

In some examples, the UI allows a user of a client device to select between display of at least two or more different commercial video clips. In a particular example, a first frame of each video clip, or a logo of a sponsor of one or both video clips, or some other selection information, is displayed. The user may select a desired commercial video clip to watch, such as by clicking on a logo of a preferred company or by clicking on a more interesting-looking picture, etc.

The user interface of any preceding example, wherein the user interface further comprises:
a selector to allow a user to select between display of at least two commercial video clips.

In some examples, the UI allows a user of a client device to set priorities (e.g., set a hierarchy of importance) between classes or groups of video clips. One class of video clips may include video clips related to a fantasy team of the user.

Another class of video clips may include video clips related to a competitor of the user in a fantasy league. Another class of video clips may include video clips related to favorite athletes of the user, even if those athletes are not on the user's fantasy team. Another class of video clips may include video clips related to one or more favorite (real life) teams of the user. Another class of video clips may include video clips related to athletes that are not on a team in the user's fantasy league, and are therefore available for draft. Another class of video clips may include video clips related to certain types of plays (e.g., touchdowns or homeruns) or that have greater than a threshold fantasy point value (e.g., game highlights). Other classes of video clips are easily understood or envisioned. The UI allows the user to prioritize such classes, to obtain video clips of greater interest to the user.

The user interface of any preceding example, wherein the user interface further comprises:

a selector to prioritize classes of video clips that the user would like to have displayed on the screen.

In some examples, the user simply selects a class of video clips that the user wants the UI to display. In a particular example, the user may simply request to see video clips showing touchdowns.

The user interface of any preceding example, wherein the user interface further comprises:

a selector to select a class of video clips to be displayed on the screen.

In some examples, the UI allows a user to enter user information associated with two or more (e.g., a plurality) of users, and to thereby indicated to server(s) that video clips associated with fantasy point information that is relevant to any of the plurality of users. In a particular example, if several users are all fantasy football (or baseball, etc.) athletes, they may "sign in" to a UI to indicate that they intend to watch content as a group. The UI then displays video clips having fantasy point information that is relevant to at least one of the plurality of users.

The user interface of any preceding example, wherein the user interface further comprises:

a device to allow a plurality of users to indicate group utilization of the screen;

wherein the screen displays video clips having fantasy point information to each of the plurality of users during operation.

In some examples, some users are more interested in the athletics associated with fantasy point information, while other users may be more interested in watching color commentators. Thus, the UI may allow the user to vary or balance the relative or total amount of time spent displaying different classes of content on the screen. In a particular example, the UI allows the user to select (such as by operation of a slide bar) between greater emphasis and time spent watching (A) video clips related to the athletics that resulted in fantasy point award, or (B) video clips or, or related to, color commentators.

The user interface of any preceding example, wherein the user interface further comprises:

a selector to vary a relative amount of time spent displaying classes of content on the screen;

wherein the classes include video clips of athletic that resulted in fantasy point award and video clips of color commentators.

In some examples, users may have preferences for particular color commentators, whether the color commentators are individuals (e.g., a sportscaster, a comedian, a cheerleader, etc.) or groups (e.g., a musical band) etc. In a particular example, the UI allows the user to select and/or prioritize between different color commentators. Accordingly, when color commentary is available from a plurality of color commentators, the UI will prioritize that content, so that preferred color commentary is displayed to the user.

The user interface of any preceding example, wherein the user interface further comprises:

a device to allow the user to prioritize color commentators, and to thereby indicate a preference for content that is displayed on the screen.

In some examples, the user may want to "send" a second user content, such as a video clip to which fantasy points have been awarded, a video clip by a color commentator, etc. In a particular example, the user enters a user name or similar of another user and indicates the content to be sent. The content may be sent by the user or by servers of the second user. Optionally, the second user may be required to accept the content. The second user may see a notification of the content's arrival, and may be able to view an indication of the content in the second user's buffer or queue.

The user interface of any preceding example, wherein the user interface further comprises:

a control to allow selection of a second user; and a control to indicate what content is to be sent to the second user.

In some examples, users may watch fantasy sports in groups. Several of the users may watch their own cellular phones or tablets. As they watch, one user may want to see content that was (or is being) displayed to another user. In a particular example, a second user may want to see a specific athletic play or a specific color commentator that was displayed to a first user. Accordingly the second user may learn of new favorite athletes, color commentators and/or other content providers. In a further example, the second user may provide information to the UI of the second user, identify the first user, and thereby identify and/or access content sent to the first user. In a particular example, the second user may provide an email address of the first user to the UI of the second user. The UI may provide the second user with a look at the past and present queue of the first user, and the second user may select content that the second user may desire.

The user interface of any preceding example, wherein the user interface further comprises:

a device to allow a second user to enter an identification of a first user;

a device to allow the second user to select content based at least in part on content previously displayed to the first user.

In some examples, a user may want to look at a queue or buffer of available content, and select a preferred video clip first. In some examples, the video clips may have already been downloaded by the client device. In other examples, the video clips may be available for download. In either example, the user may indicate, such as by entry to the UI, which video clip, and/or what content, the user wants to see next. In a variation, the user may also want to look into the queue or buffer of a cooperating friend, and select content that is available to the friend. The content available for download may depend on a number of factors, such as: (A) which of the user's fantasy athletes have scored fantasy points due to their play in real life games; (B) what video clips of what color commentators have been triggered by different fantasy points awards; (C) what video clips the user has asked for, or shown interest in; (D) video clips related to the user's real life favorite teams; (E) and other video clips and content. Accordingly, considerable content may be available to the user. Using the UI, the user may select video clips and/or other content that the user prefers to see at any time.

The user interface of any preceding example, wherein the user interface further comprises:
    a device to allow the user to learn of available content; and
    a device to allow the user to select from available content.

In some examples, a user may be involved with more than one fantasy team, in more than one league, and possibly in more than one sport. In some instances, real life play may happen at the same time. Accordingly, a plurality of fantasy teams "owned" by the user may receive fantasy point information at overlapping or partially overlapping times. As a result, the user may want to switch between viewing different ones of the user's teams. In the example, the UI may allow the user to switch between the user's teams as desired by the user.

The user interface of any preceding example, wherein the user interface further comprises:
    a control to allow the user to select between two or more fantasy teams;
    wherein changing from a first fantasy team to a second fantasy team by operation of the control results in receipt of different content from a server.

In some examples, "hot keys" or "defined key" may be configured to allow the user to quickly reconfigure what content is displayed by the user interface. Accordingly, activation of a defined key may result in download of additional content and/or reordering of a buffer or queue in a manner consistent with a purpose of the defined key. A defined key may be available to show a series of video clips of touchdowns or homeruns. A defined key may be available to show video clips of a particular color commentator or a plurality of different color commentators. A defined key may be available for customization for content of particular interest to the user.

The user interface of any preceding example, wherein the user interface further comprises:
    a defined key to reorder content to be displayed on the screen;
    wherein activation of the defined key results in at least one of download of additional content and reordering of content in a buffer of the client.

Overview of an Example Commercial Interleave and Interrupt

Each client may receive a combination of video clips and commercial video clips. In some examples, a commercial may be sent by servers and may be located in a buffer by the client. The user interface (UI) may describe the commercial to the user, and may allow the user to swap it for a different commercial. The commercial may work its way to the first spot in the buffer and then be displayed. In some examples, the client may be able to pay or otherwise provide value and avoid the commercial. The commercials may be sent by the server at "off" times, when fewer clips (e.g., clips with fantasy points associated with the user's fantasy team) for which the client has interest are available. In some examples, commercials may be repositioned from an original reception order. At any given time during a commercial (particularly upon arrival of an important play, i.e., video clip) the commercial may be abruptly stopped ("commercial interrupt") and the video clip started. The abrupt stop to the commercial may coincide with an audio and/or video "logo." An algorithm may be used to determine a value of an event that can interrupt a commercial. In examples, commercials may be interrupted by video clips of a touchdown, a home run, or other important play, etc.

In some examples, each client may receive a combination of video clips and commercial video clips. In the example, a commercial may be sent by servers and may be located in a buffer by the client. The user interface (UI) may describe the commercial to the user, and may allow the user to swap it for a different commercial. The commercial may work its way to the first spot in the buffer and then be displayed. In a further example, the client may be able to pay or otherwise provide value and avoid the commercial. The commercials may be sent by the server at "off" times, when fewer clips (e.g., clips with fantasy points associated with the user's fantasy team) for which the client has interest are available. In a further example, commercials may be repositioned from an original reception order. At any given time during a commercial (particularly upon arrival of an important play, i.e., video clip) the commercial may be abruptly stopped ("commercial interrupt") and the video clip started. The abrupt stop to the commercial may coincide with an audio and/or video "logo." An algorithm may be used to determine a value of an event that can interrupt a commercial. In additional examples, commercials may be interrupted by video clips of a touchdown, a home run, or other important play, etc.

An example method, comprising:
    under control of one or more processors configured with executable instructions:
    fielding a fantasy team of athletes;
    receiving a plurality of video clips, wherein at least some of the plurality of video clip have point information associated with the fantasy team of athletes;
    receiving a commercial video clip;
    buffering the received plurality of video clips and the received commercial video clip;
    displaying one of the plurality of received video clips; and
    displaying a commercial video clip.

The method of any preceding example, additionally comprising:
    interrupting display of a commercial video clip, wherein the interrupting is based in part on fantasy point information of a received video clip.

An example method comprising:
    presenting content on a display;
    suspending presentation of the content to present an advertisement on the display;
    receiving an interrupt command; and
    responsive to receipt of the interrupt command, interrupting the advertisement prior to completion of the advertisement and resuming presentation of the content.

The method of any preceding example, wherein the content comprises one or more segments of audio, video, images, and/or text.

The method of any preceding example, wherein the content comprises a stream of successive segments of audio, video, images, and/or text.

The method of any preceding example, wherein the advertisement comprises audio, video, images, and/or text.

The method of any preceding example, wherein the advertisement comprises a video advertisement.

The method of any preceding example, wherein the video advertisement has a duration of at least about 5 seconds and at most about 60 seconds.

The method of any preceding example, wherein the interrupt command comprises a user request to interrupt or skip the advertisement.

The method of any preceding example, wherein the interrupt command further comprises payment, or agreement to pay, by the user to interrupt or skip the advertisement.

The method of any preceding example, wherein an amount of the payment, or agreement to pay, by the user to interrupt or skip the advertisement is based at least in part on a length of the advertisement.

The method of any preceding example, wherein the advertisement has a duration which is undisclosed to the user.

The method of any preceding example, wherein the interrupt command comprises a command from a provider of the advertisement or a provider of the content at a time designed to encourage the user to watch the advertisement by causing the user to be uncertain about when the advertisement will conclude and the content will resume.

The method of any preceding example, wherein the interrupt command comprises a randomly generated command from a provider of the advertisement or a provider of the content.

The method of any preceding example, wherein the interrupt command further comprises user preference information provided by the user in exchange for skipping or interrupting the advertisement.

The method of any preceding example, wherein the advertisement comprises a plurality of selectable options, and wherein the interrupt command is generated in response to receipt of user selection of one of the selectable options.

The method of any preceding example, wherein each of the plurality of selectable options is associated with a product or service, and wherein the user selection of one of the selectable options indicates the user's preference for the respective product or service associated with the selected one of the selectable options.

The method of any preceding example, wherein each of the plurality of selectable options is associated with an answer to a question, and wherein the user selection of one of the selectable options indicates the user's answer to the question.

The method of any preceding example, wherein each of the plurality of selectable options is associated with an image, and wherein the user selection of one of the selectable options indicates the user's preference for the respective image associated with the selected one of the selectable options.

The method of any preceding example, wherein the interrupt command is generated in response to availability of a content segment meeting one or more criteria.

The method of any preceding example, wherein the one or more criteria comprise at least one of:
 a type of the content segment;
 a subject of the content segment;
 a tag associated with the content segment;
 a designated importance of the content segment;
 a relative popularity of the content segment exceeding a threshold popularity;
 a source of the content segment;
 a recommendation of the content segment by another user; or
 a freshness of the content segment.

One or more computer readable media storing example instructions that when executed by one or more processors configure the one or more processors to perform the method of any preceding example.

An example system comprising one or more processors and memory storing instructions that when executed by the one or more processors configure the one or more processors to perform the method of any preceding example.

Overview of an Example Commercial Vs. Question

In some examples, clients may give information to advertisers rather than watch commercial(s). In some examples, the client "likes" the advertiser on Facebook or loads the advertiser's website and/or cookies. In other examples, the user is allowed to pay, and avoid commercial messages.

In some examples, users may give information to advertisers rather than watch commercial(s). In some examples, the user "likes" the advertiser on Facebook or loads the advertiser's website and/or cookies. In other examples, the user is allowed to pay, and avoid commercial messages. In other examples, the user may select a commercial to watch, e.g., based on display of a first frame of two or more commercials. In a particular example, the user clicks on a logo of one of a plurality of companies.

An example method, comprising:
 under control of one or more processors configured with executable instructions:
  creating video clips from content;
  associating fantasy point information with the video clips;
  transmitting the video clips to a client based in part on the fantasy point information;
  transmitting commercial video clips to the client, based at least in part on a play time of the video clips transmitted to the client.

The method of any preceding example, additionally comprising:
 providing the client with a choice between at least two commercial video clips; and
 transmitting to the client a selected commercial video clip from among the at least two video clips in the choice.

The method of any preceding example, wherein:
 providing the client with the choice comprising providing the client with at least two frames between which to select; and
 the selected video clip is associated with a frame, from among the at least two frames, which was selected by the client.

Overview of an Example Multiple League Mode

Many users may be in two or more fantasy leagues (in one or more sports). Thus, they have an interest in many athletes. Because they have multiple fantasy teams, the video clips to be pushed may be based on more than one roster. This may result in the need to prioritize plays, and perhaps even abbreviate some clips to make room for the overall result. In some examples, a "full" and a "short" version of each clip may be available, and short clips may be requested and/or received if the buffer is overly full. The user interface (UI) may allow users with multiple fantasy teams to realize which team is affected by fantasy points associated with each video clip presented. Moreover, the UI may tell the user information about how each video clip effects one or more of the user's teams. In some examples, the client may run two or more different UIs and swaps between them. Each user interface may have its own buffer, or a single buffer may be shared.

Many users may be in two or more fantasy leagues (in one or more sports). Thus, they have an interest in many athletes. Because they have multiple fantasy teams, the video clips to be pushed may be based on more than one roster. This may result in the need to prioritize plays, and perhaps even abbreviate some clips to make room for the overall result. The user interface (UI) may allow users with multiple fantasy teams to realize which team is affected by fantasy points associated with each video clip presented. Moreover, the UI may tell the user information about how each video clip effects one or more of the user's teams. In some examples, the client may run two or more different UIs and swaps between them. Each user interface may have its own buffer, or a single buffer may be shared.

An example method, comprising:
 under control of one or more processors configured with executable instructions:
  creating video clips from content;
  associating fantasy point information with the video clips as indicated by events in each video clip;

examining information describing a client to determine fantasy point interest of the client, wherein the information indicates that the client has fantasy teams in two or more fantasy leagues; and transmitting the video clips to the client based at least in part on the examining.

The method of any preceding example, additionally comprising:

examining a buffer operational on the client;

wherein the transmitting of the video clips comprises transmitting different versions of a video clip associated with a same fantasy point event depending on buffer fullness of the client.

Overview of an Example Prioritization of Play Transmission

In some examples, each client may include a buffer containing a plurality of video clips (e.g., video clips of athletic game play(s) or other short video segments). Some clips may be touchdowns and some may be of lesser importance. In some examples, the user interface (UI) may allow change of the chronological order of the clips in the buffer. For example, the most important video clips may be moved forward, particularly if a UI receives a preference from a user. For example, many important plays may obviate interest in lesser plays. The client may want to prioritize his/her own scores over an opponent's scores, and perhaps the opponent's scores may be prioritized over scores by the client's bench (the bench being athletes the client "owns" but did not field for play). The client may also want to ask for abbreviated (shorter) plays if the buffer is fairly full. In some examples, a fast play mode shows shorter clips, while a detail play mode shows longer clips, and possibly includes more time devoted to color commentary associated with different clips. The buffer may contain actual content and/or links to content. The client may download some content while playing other content. During display of one video clip, the display may suspend and/or cancel that video clip and start a more important video clip.

In some examples, each client may include a buffer containing a plurality of video clips (e.g., video clips of athletic game play(s) or other short video segments). Some clips may be touchdowns and some may be of lesser importance. In some examples, the user interface (UI) may allow change of the chronological order of the clips in the buffer. For example, the most important video clips may be moved forward, particularly if a UI receives a preference from a user. For example, many important plays may obviate interest in lesser plays. The client may want to prioritize his/her own scores over an opponent's scores, and perhaps the opponent's scores may be prioritized over scores by the client's bench (the bench being athletes the client "owns" but did not field for play). The client may also want to ask for abbreviated (shorter) plays if the buffer is fairly full. In some examples, a fast play mode shows shorter clips, while a detail play mode shows longer clips, and possibly includes more time devoted to color commentary associated with different clips. The buffer may contain actual content and/or links to content. The client may download some content while playing other content. During display of one video clip, the display may suspend and/or cancel that video clip and start a more important video clip.

An example method, comprising:

under control of one or more processors configured with executable instructions:

receiving a plurality of video clips, wherein fantasy point information attached to at least some of the plurality;

buffering the plurality of video clips;

selecting a video clip from among the buffered video clips based in part on the fantasy points of video clips in the buffer; and displaying the selected video clip out-of-turn with respect to arrival of other video clips into the buffer.

The method of any preceding example, additionally comprising:

collecting user input indicating how fantasy point information should be used to prioritize the plurality of video clips; and selecting the video clip base in part on the collected user input.

Overview of an Example Replays, Highlights and Athlete Scouting

In some examples, aspects of the "pull mode" for client and/or server (discussed above) may be combined with aspects of the client's user interface (UI). In some examples, the video clips pushed to a client may not provide a continuous video feed. In such an example, the pushed video clips may be based on fantasy sports points. The scoring of fantasy points may not result in sufficient video clips to fill the time a user is will to a lot to watching the client device. The client may therefore ask for more content, such as additional video clips. The video clips may include replays of prior shown video clips, highlights of various games that may not involve fantasy points relevant to the user, video clips related to athletes that the user is "scouting" for possible draft to the user's fantasy team, etc. In other examples, when the client's buffer is empty or low, servers may provide suggestions (e.g., suggestions sent to the client's UI) of video clips for the user watch. The UI may also allow "pull mode"-type requests (e.g., requests for clips not directly related to the user's fantasy team) from the clients. The user may request video clips from one or more of the user's favorite teams, favorite athletes, etc., and may watch a stream of such clips, optionally interleaved with fantasy point related clips. The server may respond to requests from the clients and their UI's with many options for video clips and/or other content. In an example, if there are 32 NFL teams, there could be 100+ touchdowns on a typical Sunday, and clients could request download of clips so that the user could watch them all (perhaps interleaved with commercial messages). The user and/or client could request such video clips at any time during the week (not just Sunday).

In some examples, a user may want to have bet (e.g., gaming or good-natured bet between friends) placed on one or more games (e.g., football, baseball, etc.). The user may want see key plays (clips, segments, portions, etc.) of the one or more games. The one or more games may be played at least partly at the same time. Clips from the game(s) may be identified based at least in part on: (1) a threshold level of benefit to a team in one of the games; (2) a change in the likelihood of a final score of one of the games; (3) a change in the odds of a team winning one of the games; (4) a change in the odds of any factor on which the user has placed a wager; or (5) a change of concern or interest to a party to a wager on the game or contest. For example, a gain of yardage in football, a hit or strikeout in baseball, a lead change in NASCAR, etc., may result in identification of a clip. Once identified, the clip is transmitted to appropriate clients from among a plurality of clients.

An example method, comprising:

under control of one or more processors configured with executable instructions:

creating a plurality of clips from each of one or more games;

identifying clips, from among the plurality of clips, based at least in part on a threshold level of benefit to a team in a game; and transmitting at least some of the identified clips to each of a plurality of clients.

In some examples, creating the plurality of clips may be from a plurality of games that are being played simultaneously or at least partly at the same time.

The method of any preceding example, wherein the created the plurality of clips is created from two or more games played at least partly at the same time.

In some examples, clips may be identified based at least in part on fantasy point information.

The method of any preceding example, wherein identifying clips is based at least in part on fantasy point information associated with each clip.

In some examples, clips may be identified based at least in part on a change in odds of a winner of the game.

The method of any preceding example, wherein identifying clips is based at least in part on a change in odds of a team winning the game.

In some examples, clips may be transmitted to clients based at least in part on an expression of interest in the game by the client.

The method of any preceding example, wherein the transmitted clips are from at least one game for which the client has indicated interest.

In some examples, clips may be selected based at least in part on a measurement of fantasy points that have been, or could be, awarded to the clip(s). For example, if the award of fantasy points to a particular clip are greater than an average or greater than a threshold, then the clip could be identified, utilized and/or transmitted.

The method of any preceding example, wherein identifying clips comprises identifying clips that have at least one of:
  more fantasy points than an average clip; or
  more than a threshold number of fantasy points.

In some examples, the client identifies at least one game the client is interested in and/or which the client may have made a wager. Clips to which a greater number of fantasy points could potentially be attached are sent to the client. Clips to which fewer fantasy points could potentially be attached are not sent to the client.

The method of any preceding example, wherein:
  identifying clips has a result of:
  identifying clips to which a greater number of fantasy points could potentially be attached; and
  identifying clips to which a lesser number of fantasy points could potentially be attached; and
  transmitting at least some of the identified clips to the client comprises transmitting at least some of the clips to which the greater number of fantasy points could potentially be attached.

In some examples, the clips can actually have fantasy points assigned and the identifying of clips may be based on the assignment of fantasy points.

The method of any preceding example, additionally comprising:
  assigning fantasy points to at least some of the plurality of clips created;
  wherein the identifying is based at least in part on the assignment of fantasy points.

In some examples, the user may have bet on at least one game. Accordingly, a game score may be sent to the user, and updated as the game progresses.

The method of any preceding example, additionally comprising:
  transmitting a current score for each of the at least one game for which the client has indicated interest.

In some examples, the user may have bet on at least one game. Accordingly clips are sent to the user that are important to the at least one game. For example, scoring plays may be sent to the user. Also, a game score may be sent to the user, and updated as the game progresses.

The method of any preceding example, additionally comprising:
  transmitting a current score for each of the at least one game for which the client has indicated interest; and
  transmitting clips of scoring plays to the client.

In some examples, the client tells the server what games are of interest to a user of the client. In a further example, the games could be games for which the user has made wagers, and now wants feedback. In a still further example, the games could be favorite teams of the user.

The method of any preceding example, additionally comprising:
  receiving an indication of games of interest to a user of the client; and
  using the indication to determine which video clips should be transmitted to the client.

In some examples, a server farm provides video clips that are relevant to a user who has placed a legal bet on a contest, such as a game/race/etc. One or more video streams are segmented into a plurality of clips. The segmented clips are identified for relevance to an outcome of the contest. Once identified, the video clips are sent to clients based on interest of the client.

An example server farm, to perform techniques comprising:
  segmenting a video stream into a plurality of clips;
  identifying clips from among the plurality of clips that are of interest to a user having a wager on a contest shown by the video stream; and
  transmitting at least some of the plurality of clips to each of a plurality of clients, wherein each client is sent clips based at least in part on the identifying and at least in part on at least one wager of the client.

An example server farm, to perform techniques comprising:
  segmenting a plurality of video streams into a plurality of clips;
  identifying clips from among the plurality of clips based in part on importance to wagers on games in each of the plurality of video streams; and
  transmitting at least some of the plurality of clips to each of a plurality of clients, wherein clients are sent clips based at least in part on the identifying.

An example server farm, to perform techniques comprising:
  segmenting a plurality of video streams into a plurality of clips;
  identifying clips from among the plurality of clips based on relevance to different wagers; and
  transmitting at least some of the plurality of clips to each of a plurality of clients, wherein clients are sent clips based at least in part on the identifying.

Techniques for video clip generation, clip characteristic identification, clip sorting and/or clip transmission are described herein. In some examples, the video clips may be related to sports, games and/or contests, such as football, baseball, basketball, NASCAR, golf and others. In some instances, video feed(s) may be received at server(s), the video feed(s) may be segmented into clips, the clips may be annotated with metadata and/or other distinguishing identification, and appropriate clips may be sent to each client. A user associated with a client may have an interest (e.g., gaming, gambling or personal favorite team, etc.) in one or more of the athletes, contestants, teams, games or contests. If so, clips associated with those interest(s) may be transmitted to that client. The annotations may indicate clips that are of particular interest to users who have wagered on an event and may be used to flag clips for transmission to appropriate users.

Overview of an Example Saving Bandwidth Using Bluetooth

In some examples, bandwidth may be a problem for some clients. Their data plans may be overwhelmed if they use a mobile client without Wi-Fi. However, if two or more users are near to each other, and have Bluetooth or other RF system (e.g., near field communication), then if one of them downloads a video clip (and perhaps associated color commentary, commercial, etc.), the video clip(s) may be transmitted by RF/Bluetooth to the other friend(s). An algorithm could be utilized to decide which friend downloads a clip needed by two or more friends. In some examples, the downloading could be alternated between clients, the download could be performed by a client that has successfully has logged into Wi-Fi, or the download could be performed according to which client needs the clip first, etc. RF and/or Bluetooth friend-circles could be formed, and the video clips could be more economically downloaded and advantageously shared among the friends.

In some examples, bandwidth may be a problem for some clients. Their data plans may be overwhelmed if they use a mobile client without Wi-Fi. However, if two or more users are near to each other, and have Bluetooth or other RF system (e.g., field communication), then if one of them downloads a video clip (and perhaps associated color commentary, commercial, etc.), the video clip(s) may be transmitted by RF/Bluetooth to the other friend(s). An algorithm could be utilized to decide which friend downloads a clip needed by two or more friends. In some examples, the downloading could be alternated between clients, the download could be performed by a client that has successfully has logged into Wi-Fi, or the download could be performed according to which client needs the clip first, etc. RF and/or Bluetooth friend-circles could be formed, and the video clips could be more economically downloaded and advantageously shared among the friends.

An example method of operating a first mobile device, comprising:

under control of one or more processors configured with executable instructions:

associating the first mobile device with a second mobile device, whereby the association allows data transfer between the first and second mobile devices;

receiving a video clip at the first mobile device, wherein the video clip has fantasy point information of interest to both the first and second mobile devices;

sending the received video clip from the first mobile device to the second mobile device.

The method of any preceding example, additionally comprising:

indicating to a server that the second mobile device has obtained the video clip.

The method of any preceding example, wherein:

sending the received video clip from the first mobile device to the second mobile device comprises sending the received video clip using near field communications.

The method of any preceding example, wherein associating the first mobile device with the second mobile device comprises:

informing at least one of the first and second mobile devices of the fantasy point interests of the other mobile device.

Overview of an Example Party Mode

In some examples, several users could indicate though a user interface on one or more client devices that they are watching together (e.g., perhaps using a single, probably large, screen). The server(s) could then push clips of interests to one or more of the users, and all of the received clips could be interleaved. Thus, each video clip received by the client would be of interest to at least one of the users. Accordingly, each of the users (e.g., each of a plurality of friends) could view some content that is relevant to his/her team and some content that is of interest to his/her friends.

In some examples, several users could indicate though a user interface on one or more client devices that they are watching together (e.g., perhaps using a single, probably large, screen). The server(s) could then push clips of interests to one or more of the users, and all of the received clips could be interleaved. Thus, each video clip received by the client would be of interest to at least one of the users. Accordingly, each of the users (e.g., each of a plurality of friends) could view some content that is relevant to his/her team and some content that is of interest to his/her friends.

An example method, comprising:

under control of one or more processors configured with executable instructions:

receiving information indicating that a group of users is utilizing a single client;

creating a plurality of video clips from content;

associating fantasy point information with each video clip;

selecting video clips that have fantasy point information of interest to at least one user from among the group of users; and transmitting the video clip to the single client.

Overview of an Example of Clip Color Commentators

In some examples, the actual game announcers of a content provider (e.g., television network) could be used for the audio of one or more clips. Alternatively, "clip commentators," (CCs) could provide an audio track to the video clip(s) and/or could provide an accompanying video clip. The users' of fantasy sports clients could "subscribe" one or more CCs, who could add "color commentary" to the clips sent to the user. There might be CCs who would specialize in one team (e.g., Green Bay) or would specialize in several of their favorite (or disliked) athletes. Transmission of a CC clip to subscribing clients might be triggered by a fantasy point event, such as an award of fantasy points to an athlete(s) and/or a team. The transmission could be sent to all subscribing clients, perhaps based in part on conflict resolution with other CCs. The client user interface might allow the user to select from among the thousands of CCs, and each CC would try to develop a following. Conflicts between CCs might be resolved by the user interface. A conflict could be caused when a single event (e.g., an award of fantasy points to an "owned" athlete and a favorite team result from a single play. The user interface may allow the creation of a hierarchy of CCs, or could provide questions, such as: "Would the user rather listen to the CC specializing in Green Bay, or the CC specializing in some athlete who plays for GB?" Because real life games may overlap, one CC can't cover everything in a live mode. However, prerecorded CC audio (e.g., overlay on the video clips) or audio/video (e.g., accompany video clip(s)) may be made by CC. Such content may be transmitted to clients, such as if indicated by the user of the client on the user interface. In some examples, thousands of people (e.g., attentions seekers, cheerleaders, sports experts, etc.) could provide either audio overlays and/or accompanying video to clips (e.g., based on characteristics of the clip). CCs could pre-record clips to be shown along with (before, during and/or after) clips in the event of a touchdown by a certain athlete or team, a fumble, an interception, etc.

In some examples, a server provides video clips to the clients. Each video clip may that include one or more plays (e.g., touchdowns, home runs, goals, etc.) of real athletic games. Each clip may include fantasy point information (e.g., athlete(s) in the clip were awarded fantasy points). Each clip may be sent to clients who have an interest in the clip based on a roster of their fantasy team or an opponent's fantasy team. The clip may be sent to other clients, based on those clients' interest in the real life team, athlete, play type (e.g., touchdown), etc. In addition to the clips, as part of the clips or attached to the clips, etc., the server(s) may send clips to one or more clients that include professional or amateur "color commentators" (CC). The CC clips may be audio, and/or audio/video clips. Audio CC clips may be played while a video clip of athletes or other content is played. A user with a client device may request clips from preferred CCs in certain circumstances. The user may indicate by operation of a user interface (UI) of the client device that whenever a certain athlete is awarded fantasy points, that the associated clip should be sent to the client, along with a particular color commentator (e.g., color commentator "1", i.e., CC1). To continue the example, the user may also request clip(s) by CC2 to be sent along with clips of another athlete and clip(s) by CC3 whenever a certain type of play is made or a certain team scores, etc. Accordingly, the user may have a list of CCs to which the user subscribes. Thus, event(s) (e.g., events that are marked by award of fantasy points, scores by favorite teams, etc.) may trigger transmission by the server(s) to a client of one or more CC clips. The CC clips may be interleaved with clips sent to a client based on fantasy point information, etc.

An example method of providing video clips from a server to a client, comprising:

storing, in a memory communicatively coupled to a processor, computer-executable instructions for performing the method;

executing the instructions on the processor;

according to the instructions being executed:

segmenting content into video clips;

associating fantasy point information with one or more of the video clips;

selecting a client based at least in part on the fantasy point information;

selecting a color commentator clip depicting a color commentator based on:

an association between the color commentator depicted in the color commentator clip and fantasy points assigned to a video clip; and a preference indicated by the selected client for the color commentator;

providing the video clip to the selected client; and providing the selected color commentator clip to the selected client.

Overview of an Example Periods of Limited Content

During certain periods of time (e.g., overnight, non-game days, during an off season, etc.) there may be limited amounts new content segments available that match a user's subscriber profile. During such periods, the interleaver may provide the user with reruns of previously served segments, favorite segments, previously unviewed segments from past fantasy sports games, segments viewed by social contacts of the user, or various other content segments. The content segments served in such periods may be based at least in part on the user's subscriber profile.

In some examples, aspects of the "pull mode" for client and/or server (discussed above) may combined with aspects of the client's user interface (UI). In some examples, the video clips pushed to a client may not provide a continuous video feed. In such an example, the pushed video clips may be based on fantasy sports points. The scoring of fantasy points may not result in sufficient video clips to fill the time a user wants to allot to watching the client device. The client may therefore ask for more content, such as additional video clips. The video clips may include replays of prior shown video clips, highlights of various games that may not involve fantasy points relevant to the user, video clips related to athletes that the user is "scouting" for possible draft to the user's fantasy team, etc. In other examples, when the client's buffer is empty or low, servers may provide suggestions (e.g., suggestions sent to the client's UI) of video clips for the user watch. The UI may also allow "pull mode"-type requests (e.g., requests for clips not directly related to the user's fantasy team) from the clients. The user may request video clips from one or more of the user's favorite teams, favorite athletes, etc., and may watch a stream of such clips, optionally interleaved with fantasy point related clips. The server may respond to requests from the clients and their UI's with many options for video clips and/or other content. In an example, if there are 32 NFL teams, there could be 100+ touchdowns on a typical Sunday, and clients could request download of clips so that the user could watch them all (perhaps interleaved with commercial messages). The user and/or client could request such video clips at any time during the week (not just Sunday).

An example method, comprising:

under control of one or more processors configured with executable instructions:

creating a plurality of clips comprising a plurality of plays, respectively, from each of a plurality of games;

associating fantasy points with athletes within at least some of the plurality of clips based on performance of the athletes;

receiving a request for clip from a client, wherein the request is based on part on fantasy points that do not change a score of a fantasy game of the client; and transmitting the requested clip to the requesting client.

The method of any preceding example, wherein receiving the request comprises:

receiving a request having parameters expressed in part utilizing fantasy points.

The method of any preceding example, additionally comprising:

determining which of the plurality of clips are consistent with fantasy point criteria expressed by the request.

The method of any preceding example, wherein determining which of the plurality of clips are consistent with fantasy point criteria expressed by the request comprises:

determining which of the plurality of clips involve one or more particular real life teams;

determining which of the plurality of clips involve one or more particular athletes; or determining which of the plurality of clips involve one or more particular types of plays.

Overview of an Example Segmenting

Segmenting is a process by which content received from one or more content sources is divided into smaller clips or segments. Content may be segmented automatically and/or manually. Content may be segmented to include one or more discrete events. Content may be segmented based on video of the segment, audio of the segment, and/or metadata of the segment. The segments may be stored in a content store.

This method set is directed to the process of segmenting content. Dependent examples bring in the concepts of tagging the segments, storing the segments, matching them with a subscriber profile, and serving the segments to a client device An example method comprising:

under control of one or more processors configured with computer-executable instructions:

receiving content from one or more content sources;

determining one or more characteristics of the content;

selecting a segmenting technique to use to segment the content from among multiple available segmenting techniques, the selecting being based at least in part on the one or more characteristics of the content;

segmenting the content into multiple segments using the selected segmenting technique.

The method of any preceding example, wherein the content comprises video content.

The following examples disclose the concept that some segments are important (e.g., plays and commentary) while other segments are not (e.g., huddle).

The method of any preceding example, wherein the multiple segments include:

at least one salient segment designated as containing a salient event; and at least one non-salient segment designated as not containing a salient event.

The method of any preceding example, further comprising:

discarding the at least one non-salient segment; and storing the at least one salient segment in a content store.

The method of any preceding example, further comprising:

tagging the at least one salient segment with one or more tags related to subject matter depicted in the at least one salient segment; and storing the at least one salient segment as a tagged segment in a content store.

The method of any preceding example, further comprising:

tagging the at least one salient segment with one or more tags related to subject matter depicted in the at least one salient segment;

determining a subscriber profile to which the one or more tags are relevant; and serving the at least one salient segment to a client device associated with the subscriber profile.

The method of any preceding example, wherein the content comprises a depiction of a sporting event, and wherein the salient event comprises an event about which statistics are maintained by a governing body of the sporting event.

This example covers the concept that the segments are non-uniform.

The method of any preceding example, wherein the multiple segments include segments of different sizes.

This example covers the concept that content may be segmented in multiple ways (e.g., short and long versions of the same segment).

The method of any preceding example, wherein the multiple segments include:

a first segment including a first portion of the content; and a second segment including the first portion of content and a second portion of content different than the first portion of content.

The following examples describe different basis on which to segment the content.

The method of any preceding example, wherein:

the determining the one or more characteristics of the content comprises determining whether the content includes video, audio, and/or metadata, and the selecting the segmenting technique to use to segment the content comprises selecting to segment the content based on the determined video, audio, and/or metadata included in the content.

The method of any preceding example, wherein:

the determining the one or more characteristics of the content comprises determining that the content includes video, and the selecting the segmenting technique to use to segment the content comprises selecting a video-based segmenting technique to segment the content based on the video included in the content.

The method of any preceding example, wherein the video-based segmenting technique segments the content based on at least one of:

facial recognition of one or more people depicted in the video;

image recognition of one or more objects in the video; or text recognition of one or more textual characters in the video.

The method of any preceding example, wherein:

the determining the one or more characteristics of the content comprises determining that the content includes audio, and the selecting the segmenting technique to use to segment the content comprises selecting an audio-based segmenting technique to segment the content based on the audio included in the content.

The method of any preceding example, wherein the audio-based segmenting technique segments the content based on at least one of:

voice recognition of at least one word included in the audio;

voice signature recognition of at least one voice signature included in the audio;

sound recognition of at least one sound included in the audio; or pattern recognition of at least one pattern included in the audio.

The method of any preceding example, wherein:

the determining the one or more characteristics of the content comprises determining that the content includes metadata, and the selecting the segmenting technique to use to segment the content comprises selecting a metadata-based segmenting technique to segment the content based on the metadata included in the content.

The method of any preceding example, wherein the metadata-based segmenting technique segments the content based on at least one of:

closed captioning data included in the metadata and corresponding to audio included in the content;

metadata describing breaks in video of the content; or metadata describing subject matter depicted in video of the content.

The method of any preceding example 1, wherein:

the determining the one or more characteristics of the content comprises determining a source of the content, and the selecting the segmenting technique to use to segment the content comprises selecting to segment the content based on a predetermined segmenting technique for content from the determined source of the content.

The method of any preceding example, wherein segmenting the content into multiple segments comprises:

separating audio of the content from video of the content;

segmenting video of the content into multiple video segments using the selected segmenting technique; and appending a soundtrack to at least one video segment of the multiple video segments.

The method of any preceding example, wherein the soundtrack appended to the at least one video segment comprises at least one of:

a segment of audio that originally corresponded to video of the at least one video segment;

a segment of audio that originally overlapped with the video of the at least one video segment;

a segment of audio indicating a number of fantasy sports points attributable to an event included in the at least one video segment;

a computer generated segment of audio; or a segment of audio including a recording of a human announcer.

The method of any preceding example, wherein appending the soundtrack to the at least one video segment comprises at least one of aligning, trimming, or supplementing the soundtrack to correspond in length to the at least one video clip.

An example system comprising:

a network connection for sending and receiving information over a network; one or more processors; and memory storing instructions that, when executed by the one or more processors, configure the one or more processors to perform operations comprising:

reviewing content received by the network connection to identify salient events included in the content; and segmenting the content into multiple segments including:

at least one salient segment designated as containing a salient event; and at least one non-salient segment designated as not containing a salient event.

The system of any preceding example, the operations further comprising:

determining whether the content includes video, audio, and/or metadata, wherein the segmenting is performed based on the determined video, audio, and/or metadata included in the content.

The system of any preceding example, wherein the segmenting comprises segmenting the content based on at least one of:

facial recognition of one or more people depicted in video of the content;

image recognition of one or more objects depicted in video of the content;

text recognition of one or more textual characters depicted in video of the content;

voice recognition of at least one word included in audio of the content;

voice signature recognition of at least one voice signature included in audio of the content;

sound recognition of at least one sound included in audio of the content;

pattern recognition of at least one pattern included in audio of the content;

closed captioning data included in metadata of the content and corresponding to audio included in the content;

metadata describing breaks in video of the content; or metadata describing subject matter depicted in video of the content.

The system of any preceding example, the operations further comprising:

determining a source of the content, wherein the segmenting is performed using a predetermined segmenting technique for content from the determined source of the content.

The system of any preceding example, wherein the content comprises a depiction of a sporting event, and wherein the salient event comprises an event about which statistics are maintained by a governing body of the sporting event.

This example is focused on a fantasy sports embodiment

One or more computer-readable media storing instructions that, when executed by one or more processors, configure the one or more processors to perform example operations comprising:

receiving content including video depicting a sporting event from one or more content sources; and segmenting the content into multiple segments including:

at least one salient segment designated as containing an event about which statistics are maintained by a governing body of the sporting event; and at least one non-salient segment designated as not containing an event about which statistics are maintained by a governing body of the sporting event;

tagging the at least one salient segment with one or more tags related to subject matter depicted in the at least one salient segment;

storing the at least one salient segment as a tagged segment in a content store;

determining a subscriber profile to which the one or more tags are relevant; and serving the at least one salient segment to a client device associated with the subscriber profile.

Overview of an Example Tagging or Annotating

Each segment may be tagged (annotated) with tags describing the subject matter or event depicted in the respective segment, characteristics of the segment (e.g., duration, date and time of recording or of an event depicted in the segment, source of the segment, etc.). Additionally or alternatively, each segment may be tagged with one or more tags specific to a particular subscriber profile, such as an indication that the subscriber profile is entitled to fantasy points for an event depicted in the segment and/or a number of fantasy points to which the subscriber profile is entitled.

An example method comprising:

under control of one or more processors configured with executable instructions:

receiving a content segment comprising video content;

identifying one or more tags for the content segment by at least one of:

extracting one or more tags for the segment from at least one of video, audio, or metadata of the segment; or receiving one or more human assigned tags for the segment;

associating the one or more identified tags with the content segment;

comparing the one or more tags associated with the content segment to one or more subscriber profiles; and identifying one or more subscriber profiles to which the content segment is applicable based at least in part on the comparing.

The method of any preceding example, wherein the video content comprises a sporting event and the content segment depicts an event for which statistics are maintained by a governing body of the sporting event.

The method of any preceding example, further comprising causing the content segment to be served to a client device associated with at least one of the identified subscriber profiles to which the tagged content segment is applicable.

The method of any preceding example, further comprising:
 determining, for each subscriber profile to which the content segment is identified to be applicable, that the respective subscriber profile is entitled to fantasy points for an event depicted in the content segment;
 causing the content segment to be served to a client device associated with at least one of the identified subscriber profiles to which the content segment is applicable; and
 causing a notification to be served to the client device indicating that the subscriber profile is entitled to fantasy points for the event depicted in the content segment.

The method of any preceding example, wherein the notification is caused to be embedded in, overlaid on, or appended to the content segment.

The method of any preceding example, further comprising:
 determining, for each subscriber profile to which the content segment is identified to be applicable, a number of fantasy points to which the respective subscriber profile is entitled for an event depicted in the content segment;
 causing the content segment to be served to a client device associated with at least one of the identified subscriber profiles to which the content segment is applicable; and
 causing the number of fantasy points to which the respective subscriber is entitled to be served to the client device.

The method of any preceding example, wherein the number of fantasy points is caused to be embedded in, overlaid on, or appended to the content segment.

The method of any preceding example, further comprising calculating and assigning a tag score to each tag associated with the content segment.

The method of any preceding example, wherein each tag score comprises at least one of:
 an indication of a relevance of the tag to the content segment;
 an indication a number of times that the tag has been associated with the content segment;
 a specificity of the tag; or
 a historical importance of the tag to users.

The method of any preceding example, wherein the one or more tags comprise a subject tag describing a subject depicted in the content segment and an event tag describing an event depicted in the content segment.

The method of any preceding example, wherein the identifying one or more tags for the content segment comprises extracting one or more tags for the segment by at least one of:
 facial recognition of one or more people depicted in the content segment;
 image recognition of one or more objects depicted in the content segment;
 text recognition of one or more textual characters depicted the content segment;
 voice recognition of at least one word included in audio of the content segment;
 voice signature recognition of at least one voice signature included in audio of the content segment;
 sound recognition of at least one sound included in audio of the content segment;
 pattern recognition of at least one pattern included in audio of the content segment;
 closed captioning data included in metadata of the content segment;
 metadata describing structure in video of the content segment; or
 metadata describing subject matter depicted in the content segment.

This example focuses on tagging segments with fantasy sports information. Later examples add in details of tagging segments with tags describing the content segment.

An example system comprising:
 one or more processors; and
 memory communicatively coupled to the one or more processors and storing executable instructions that, when executed by the one or more processors, configure the one or more processors to perform operations comprising:
 receiving a content segment comprising video content depicting an event;
 identifying one or more subscriber profiles to which the content segment is applicable;
 determining, for each subscriber profile to which the content segment is identified to be applicable, that the respective subscriber profile is entitled to fantasy points for the event depicted in the content segment; and
 tagging the content segment with at least one of:
 a notification that the respective subscriber profile is entitled to fantasy points; or
 a notification of a number of fantasy points to which the respective subscriber is entitled for the event depicted in the content segment.

The system of any preceding example, wherein tagging the content segment comprises causing the notification to be embedded in, overlaid on, or appended to the content segment.

The system of any preceding example, the operations further comprising:
 causing the content segment to be served to a client device associated with at least one of the identified subscriber profiles to which the content segment is applicable; and
 causing the notification to be served to the client device.

The system of any preceding example, the operations further comprising tagging the content segment with one or more subject tags, each subject tag describing a subject depicted in the content segment, and with one or more event tags, each event tag describing an event depicted in the content segment.

The system of any preceding example, the operations further comprising calculating and assigning a tag score to each tag associated with the content segment.

The system of any preceding example, wherein each tag score comprises at least one of:
 an indication of a relevance of the tag to the content segment;
 an indication a number of times that the tag has been associated with the content segment;
 a specificity of the tag; or
 a historical importance of the tag to users.

The system of any preceding example, the operations further comprising, prior to tagging the content segment, extracting the one or more subject matter tags and/or the one or more event tags with which to tag the content segment by at least one of:
 facial recognition of one or more people depicted in the content segment;
 image recognition of one or more objects depicted in the content segment;
 text recognition of one or more textual characters depicted the content segment;

voice recognition of at least one word included in audio of the content segment;

voice signature recognition of at least one voice signature included in audio of the content segment;

sound recognition of at least one sound included in audio of the content segment;

pattern recognition of at least one pattern included in audio of the content segment;

closed captioning data included in metadata of the content segment;

metadata describing breaks in video of the content segment; or metadata describing subject matter depicted in the content segment.

This example is focused on tagging as applied to a fantasy sports embodiment.

One or more computer-readable media storing instructions that, when executed by one or more processors, configure the one or more processors to perform example operations comprising:

receiving a content segment comprising video depicting a sporting event;

identifying one or more tags for the content segment by at least one of:

extracting one or more tags for the segment from at least one of video, audio, or metadata of the segment; or receiving one or more human assigned tags for the segment;

associating the one or more identified tags with the content segment;

comparing the one or more tags associated with the content segment to one or more subscriber profiles;

identifying one or more subscriber profiles to which the content segment is applicable based at least in part on the comparing;

determining, for each subscriber profile to which the content segment is identified to be applicable, that the respective subscriber profile is entitled to fantasy points for an event depicted in the content segment;

causing the content segment to be served to a client device associated with at least one of the identified subscriber profiles to which the content segment is applicable; and causing a notification to be served to the client device indicating that the subscriber profile is entitled to fantasy points for the event depicted in the content segment.

The one or more computer readable media of any preceding example, wherein the notification includes a number of fantasy points to which the respective subscriber profile is entitled.

The one or more computer readable media any preceding example, wherein the notification is served contemporaneously with the content segment.

The one or more computer readable media any preceding example, further comprising, subsequent to causing the notification to be served to the client device, causing a number of fantasy points to which the respective subscriber profile is entitled to be served to the client device.

Overview of an Example Subscriber Profiles

Subscribe profiles may be created for one or more subscribers to an interleaver service. The subscriber profiles may identify one or more topics of interest to a user. At least some of the topics of interest may be determined based at least in part on a fantasy sports account of the user. The subscriber profile also includes one or more explicit and/or implicit user preferences.

An example method comprising:

under control of one or more processors configured with executable instructions:

receiving a request to generate a subscriber profile for a user;

accessing a fantasy sports account of the user;

obtaining fantasy sports information from the fantasy sports account of the user; and generating a subscriber profile for the user based at least in part on the fantasy sports information obtained from the fantasy sports account of the user.

The method of any preceding, wherein the information about the fantasy sports account of the user comprises a roster of athletes on one or more fantasy sports teams associated with the fantasy sports account of the user.

The method of any preceding example, wherein accessing the fantasy sports account comprises:

receiving a login credential for the fantasy sports account of the user; and logging in to the fantasy sports account of the user.

The method of any preceding example, wherein accessing the fantasy sports account of the user comprises calling an API of an entity administering the fantasy sports account of the user.

The method of any preceding example, wherein generating the subscriber profile comprises defining subscriptions to one or more topics associated with the fantasy sports account.

The method of any preceding example, wherein the one or more topics comprise one or more athletes on a fantasy sports team associated with the fantasy sports account of the user.

The method of any preceding example, wherein the one or more topics further comprise at least one of:

one or more athletes on a fantasy sports team of a current opponent of the user; or one or more athletes on a fantasy sports team of another user in a fantasy sports league of the user.

The method of any preceding example, further comprising:

determining a content segment that is applicable to the subscriber profile; and causing the content segment to be served to a client device associated with the subscriber profile.

The method of any preceding example, further comprising:

determining that the subscriber profile is entitled to fantasy points for an event depicted in the content segment; and causing a notification to be served to the client device indicating that the subscriber profile is entitled to fantasy points for the event depicted in the content segment.

An example system comprising:

one or more processors; and memory communicatively coupled to the one or more processors and storing executable instructions that, when executed by the one or more processors, configure the one or more processors to perform any preceding method.

An example method comprising:

under control of one or more processors configured with executable instructions:

receiving information about a fantasy sports account of a user; and generating a subscriber profile for the user based at least in part on the fantasy sports account of the user, the subscriber profile defining subscriptions to one or more topics associated with the fantasy sports account.

The method of any preceding example, wherein the information about the fantasy sports account of the user comprises a roster of athletes on one or more fantasy sports teams associated with the fantasy sports account of the user.

The method of any preceding example, wherein the information about the fantasy sports account comprises a login credential usable to access the fantasy sports account of the user, and the method further comprising accessing the fantasy sports account.

The method of any preceding example, further comprising calling an application programming interface (API) of an entity administering the fantasy sports account of the user, wherein the information about the fantasy sports account of the user is received responsive to the calling of the API.

The method of any preceding example, wherein the one or more topics comprise one or more athletes on a fantasy sports team associated with the fantasy sports account of the user.

The method of any preceding example, wherein the one or more topics further comprise at least one of:
  one or more athletes on a fantasy sports team of a current opponent of the user; or
  one or more athletes on a fantasy sports team of another user in a fantasy sports league of the user.

The method of any preceding example, further comprising storing the subscriber profile in a subscription store.

The method of any preceding example, further comprising:
  determining a content segment that is applicable to one or more topics to which the subscriber profile includes a subscription; and
  causing the content segment to be served to a client device associated with the subscriber profile.

The method of any preceding example, further comprising:
  determining that the subscriber profile is entitled to fantasy points for an event depicted in the content segment; and
  causing a notification to be served to the client device indicating that the subscriber profile is entitled to fantasy points for the event depicted in the content segment.

An example system comprising:
  one or more processors; and
  memory communicatively coupled to the one or more processors and storing executable instructions that, when executed by the one or more processors, configure the one or more processors to perform the method of any preceding example.

Overview of an Example Interleaving of Content

Interleaving describes the process of identifying content segments that are applicable a subscriber profile based at least in part on the subscriptions and preferences indicated in the subscriber profile, and providing the content segments to the subscriber. The interleaver may also interleave ads with the content segments.

An example method comprising:
  under control of one or more processors configured with executable instructions:
  determining one or more topics of interest to a user based at least in part on a fantasy sports account of the user;
  identifying multiple content segments that are relevant to the one or more topics of interest to the user; and
  causing the multiple content segments to be served to a client device of the user.

The method of any preceding example, wherein determining one or more topics of interest to the user based at least in part on the fantasy sports account of the user comprises accessing a subscriber profile of the user, the subscriber profile of the user including one or more subscriptions to topics of interest to the user.

The method of any preceding example, wherein the topics of interest to the user comprise athletes on a roster of a fantasy team associated with the fantasy sports account of the user.

The method of any preceding example, wherein the topics of interest further comprise at least one of:
  one or more athletes on a fantasy sports team of a current opponent of the user; or
  one or more athletes on a fantasy sports team of another user in a fantasy sports league of the user.

The method of any preceding example, wherein the topics of interest further comprise at least one of:
  one or more favorite teams of the user;
  one or more favorite athletes of the user;
  teams associated with a location of the user;
  one or more favorite cheerleaders of the user;
  one or more favorite cheerleading squads of the user;
  one or more favorite analysts of the user; or
  one or more social connections of the user.

The method of any preceding example, further comprising, prior to causing the multiple content segments to be served to the client device of the user, prioritizing an order in which to serve the multiple content segments based at least in part on one or more user preferences.

The method of any preceding example, wherein the one or more user preferences comprise implicit preferences inferred from information of the fantasy sports account of the user.

The method of any preceding example, wherein the one or more user preferences comprise explicit preferences specified by the user.

The method of any preceding example, further comprising, prior to causing the multiple content segments to be served, adding the multiple content segments to a segment buffer of content segments to be served to the client device.

The method of any preceding example, further comprising:
  receiving a request to reorder the content segments in the buffer; and
  reordering the content segments in the buffer responsive to receiving the request to reorder the content segments.

The method of any preceding example, further comprising interleaving one or more ads between the multiple content segments.

An example method comprising:
  under control of one or more processors configured with executable instructions:
  receiving content from multiple sources;
  segmenting the content into content segments, each content segment depicting a portion of a sporting event;
  tagging each content segment with one or more tags;
  matching one or more of the content segments with a subscriber profile based at least in part on:
  the one or more tags of each content segment; and
  one or more topics to which the subscriber profile includes a subscription; and
  causing the one or more content segments to be served to a client device of the user.

The method of any preceding example, wherein the one or more topics to which the subscriber profile includes the subscription are based at least in part on a fantasy sports account of the user.

The method of any preceding example, wherein the one or more topics to which the subscriber profile includes the subscription comprise athletes on a roster of a fantasy team associated with the fantasy sports account of the user.

The method of any preceding example, wherein the one or more topics to which the subscriber profile includes the subscription further comprise at least one of:
  one or more athletes on a fantasy sports team of a current opponent of the user; or
  one or more athletes on a fantasy sports team of another user in a fantasy sports league of the user.

The method of any preceding example, wherein the one or more topics to which to the subscriber profile includes the subscription further comprise at least one of:
  one or more favorite teams of the user;
  one or more favorite athletes of the user;
  teams associated with a location of the user;
  one or more favorite cheerleaders of the user;
  one or more favorite cheerleading squads of the user;
  one or more favorite analysts of the user; or
  one or more social connections of the user.

The method of any preceding example, further comprising, prior to causing the one or more content segments to be served, adding the one or more content segments to a segment buffer of content segments to be served to the client device.

The method of any preceding example, further comprising:
  receiving a request to reorder the content segments in the segment buffer; and
  reordering the content segments in the segment buffer responsive to receiving the request to reorder the content segments.

The method of any preceding example, further comprising interleaving one or more ads with the one or more content segments served to the client device.

An example system comprising:
  one or more processors; and
  memory communicatively coupled to the one or more processors, the memory storing:
    a content store including multiple content segments, each content segment being tagged with one or more tags;
    a subscription store including multiple subscriber profiles, each subscriber profile including subscriptions to one or more topics, the subscriptions of each subscriber profile being based at least in part on a fantasy sports account; and
    executable instructions that, when executed by the one or more processors, configure the one or more processors to perform operations comprising:
      identifying, based at least in part on the tags, content segments from among the multiple content segments that are applicable to one or more of the subscriber profiles; and
      causing the identified content segments to be served to client devices of the respective subscriber profiles to which the content segments are applicable.

The system of any preceding example, wherein the one or more topics to which to the subscriber profile includes the subscriptions comprise athletes on a roster of a fantasy team associated with the fantasy sports account.

An example method comprising:
  under control of one or more processors configured with executable instructions:
    identifying multiple content segments that are relevant to the one or more topics of interest to a user from a pool of available content segments; and
    adding the one or more content segments to a segment buffer of content segments to be served to the client device, the content segments in the segment buffer being in a priority order based at least in part on a fantasy sports account of the user; and
    causing the multiple content segments to be served to a client device of the user in the priority order.

The method of any preceding example, wherein the identifying, comprises:
  matching one or more of the content segments with a subscriber profile of the user based at least in part on:
    the one or more tags of each content segment; and
    one or more topics to which to the subscriber profile includes a subscription.

The method of any preceding example, further comprising:
  receiving a request to reorder the content segments in the segment buffer; and
  reordering the content segments in the segment buffer responsive to receiving the request to reorder the content segments.

Overview of an Example Scraping

Scraping is a process by which information associated with each of a plurality of "owners" of fantasy sports teams (e.g., the users of fantasy sports computer program applications) may be obtained from servers operated by Fantasy Sports Providers. The information may include the roster of athletes on the user's team, as well as which athletes are fielded and which are benched. The information may also include the names of other teams in the user's fantasy league, and athletes on those team(s). The information may additionally or alternatively include fantasy point information which may be scraped in substantially real-time or at periodic intervals while underlying sporting events are actually being played, broadcast, or other in-progress. In some examples, a user may be in a fantasy sports league that is hosted by a website, such as Yahoo. The user may have a fantasy sports application on the user's computer, tablet and/or smart phone, etc. Because the user's fantasy sports team(s) is hosted by the website, the website tracks and/or records, etc., the athletes on the user's fantasy sports team, and which athletes are on the field and which are on the bench, points scored or attributable to athletes, etc. Similarly, the website also tracks the athletes on fantasy sports teams in the league of the user, and which may be the user's opponent(s). Thus, the scraping process obtains information associated with the user's team and/or other teams in the user's league from the Fantasy Sports Provider. The scraped information may be used to build a database of user profiles, to use such a database to determine which video clips should be sent to the user and/or to other users in the user's fantasy league. The scraped information may additionally or alternatively be used to determine fantasy points to which the user is entitled and/or fantasy points attributable to a particular clip.

In an embodiment, the fantasy sport data associated with a plurality of users may be obtained from their respective servers (i.e., fantasy sports providers of the users). In a specific example, fantasy sport data may be obtained from a plurality users of Yahoo by accessing Yahoo servers.

An example method of configuring fantasy sport data comprises:
  under control of one or more processors configured with executable instructions:
    accessing at least one server;
    obtaining information about a fantasy sports team of each of a plurality of users from the server; and
    building a database using the obtained information; and
    using the database to determine to which of each of the plurality of users to send particular video clips.

The method of any preceding example, wherein accessing the at least one server comprises:
  logging into an account of the user;
  wherein the account allows management of a fantasy sports team of the user.

The method of any preceding example, wherein:
  accessing the server comprises logging into an account of the user; and
  obtaining information comprises obtaining a roster of athletes of the fantasy sports team of the user.

The method of any preceding example, wherein obtaining information comprises obtaining a list of at least some athletes on a fantasy team of the user.

The method of any preceding example, wherein obtaining information comprises obtaining fantasy sports information about a fantasy sports league including the fantasy sports team of the user.

The method of any preceding example, wherein using the database comprises:

selecting video clips from among a plurality of video clips based at least in part on the obtained information; and sending the selected video clips to the user.

The method of any preceding example, wherein using the database comprises:

selecting video clips from among a plurality of video clips for an individual user from among the plurality of users;

wherein the selecting is based at least in part on correlation between a fantasy sports team of the individual user and athletes depicted in the selected video clips.

In an embodiment, the fantasy sports data of a plurality of users may be obtained from one or more servers. The servers may be configured by fantasy sports providers such as Yahoo, ESPN or others. A scraper may be configured to access one or more servers and "scrape," read or otherwise access or obtain fantasy sports data associated with each of a plurality of fantasy sports providers. A database may be constructed and/or maintained using at least some of the information obtained. An interleaver may be configured to send video segments to users based at least in part on information in the database. Thus, the interleaver is configured to use the database as a tool to determine to which of a plurality of users particular video clips should be sent.

An example system, comprising:

a scraper, configured to access one or more servers and to obtain fantasy sports information about a plurality of users;

a database, configured to include the fantasy sports information about the plurality of users; and an interleaver, configured to associate video segments with users based at least in part on fantasy sports information in the database.

In an example embodiment, the scraper may be configured to log into accounts of each of the plurality of users and obtain fantasy team roster information. The roster information may indicate fielded athletes, benched athletes and information regarding an opponent of each user's team.

The system of any preceding example, wherein the scraper is additionally configured to:

log into accounts of each of the plurality of users; and obtain fantasy team roster information from each of the accounts logged into.

In an example embodiment, the scraper may utilize an applications programming interface (API) that is configured for accessing a server (e.g., Yahoo! or other fantasy sports provider). The API may be configured to return fantasy team roster information for each of a plurality of users. The fantasy team roster information may indicate fielded athletes, benched athletes, athletes on a team in opposition to a user, etc.

The system of any preceding example, wherein the scraper is additionally configured to:

utilize an applications programming interface (API) to access one or more of the plurality of servers; and obtain fantasy team roster information for each of the plurality of users.

In an example embodiment, the scraper may obtain publicly displayed records of each of a plurality of users. That is, a log-in is not required for the scraper to obtain the information. The publicly displayed information may be read, and the associated records may be used to build a profile or database of user information.

The system of any preceding example, wherein the scraper is additionally configured to:

obtain publicly displayed information on each of a plurality of users from one or more servers;

wherein the database is additionally configured include the publicly displayed information.

In an example embodiment, the scraper may scrape a server of a fantasy sports provider for fantasy sports information related to a user, such as prior to sending video segments to the user. Using that fantasy sports information, the interleaver may associated video segments with the user. The video segments may show or depict athletes indicated by the fantasy sports information of the user.

The system of any preceding example, wherein the scraper is additionally configured to:

access a server associated with a user prior to transmission of video segments to the user;

wherein video segments transmitted to the user show athletes indicated by the fantasy sports information.

In an example embodiment, the database may include information that constitutes a profile for each of a plurality of fantasy sports users. The profile may include fantasy sports information, including team members on a fantasy team of each user.

The system of any preceding example, wherein the database comprises:

a profile for each of the plurality of users;

wherein the profile for one or more of the plurality of users includes the fantasy sports information, and wherein the fantasy sports information includes team members associated with each user.

Known systems derive fantasy sports information, such as roster information regarding specific fantasy teams, from the users who log into the known systems and manage those fantasy teams. This requires an install base of users and presentation of user interfaces to each user. In an embodiment, at least one server is accessed. Fantasy sports information is obtained from each of the one or more servers. A database of user profile may be built. Each user profile may contain at least some of the fantasy sports information.

One or more computer-readable media storing computer-executable instructions that, when executed, cause one or more processors to perform example acts comprising:

obtaining fantasy sports information from each of a plurality of servers; and building a database comprising a plurality of user profiles, each user profile containing at least some of the fantasy sports information;

wherein at least some of the user profiles comprise fantasy team roster information and schedule information regarding fantasy games.

In an example embodiment, obtaining fantasy sports information involves reading information from a fantasy sports server regarding one or more of: a fantasy sports team; a fantasy sports league that includes the fantasy sports team; and/or a fantasy sports roster of the fantasy sports team.

The one or more computer-readable media of any preceding example, wherein obtaining fantasy sports information comprises:

obtaining, for each of a plurality of users, information regarding a fantasy sports team, a fantasy sports league that includes the fantasy sports team and a fantasy sports roster of the fantasy sports team.

In an example embodiment, a user interface (UI) is presented to a user. In a specific example, the UI may present a user interface providing fantasy sports information to a user with whom the fantasy sports information is associated.

The one or more computer-readable media of any preceding example, additionally comprising instructions for:

presenting a user interface providing fantasy sports information to a user with whom the fantasy sports information is associated.

In an example embodiment, a UI is presented to a user that displays video segments according to fantasy sports information associated with the user.

The one or more computer-readable media of any preceding example, additionally comprising instructions for:

presenting a user interface providing video segments according to fantasy sports information associated with the user.

In an example embodiment, the database is built by entering information associated with each user, including one or more of: a fantasy team of the user; a fantasy team of an opponent of the user; a fantasy league of the user; a favorite team of the user; favorite athlete(s) of the user; favorite plays (e.g., touchdowns, homeruns or NASCAR wrecks); and/or games and/or teams on which the user has wagered.

The one or more computer-readable media of any preceding example, wherein information in one or more user profile comprises:

a fantasy team of the user;
a fantasy team of an opponent of the user;
a fantasy league of the user;
a favorite team of the user;
a favorite athlete of the user;
a favorite play of the user; and
a game on which the user has wagered.

In an example embodiment, a UI may be provided to the user to allow the user to contribute information to the database. For example, the user may indicate a favorite team of the user; a favorite athlete of the user; a favorite play of the user; and/or a game on which the user has wagered.

The one or more computer-readable media of any preceding example, additionally comprising instructions implementing a UI to gather information comprising:

a favorite team of the user;
a favorite athlete of the user;
a favorite play of the user; and
a game on which the user has wagered.

In an example embodiment, fantasy sports information may be obtained from one or more servers when those server(s) open a channel (e.g., according to a file transfer protocol (FTP)) to intentionally transfer data to be used in building the database. Accordingly, a fantasy sports provider having one or more servers may provide data to the database in an efficient manner.

The one or more computer-readable media of any preceding example, wherein obtaining fantasy sports information comprises:

opening a channel to a server; and
downloading fantasy sports information over the channel to populate portions of the database.

Scraper Configured to Obtain Data for Fantasy Sports Network. Techniques for "scraping" and/or obtaining fantasy sports data from one or more server are described herein. In an example implementation, a fantasy sports server is accessed. The access may be made by means of accessing publicly available data, by accessing data for which a user's username and/or password are required, and/or accessing data by operation of an applications programming interface provided by the server(s) or by a file transfer protocol (FTP) provided by the server(s), etc. Upon gaining access, fantasy sports information may be obtained for a plurality of users. The fantasy sports information may include fantasy team roster information, fantasy team game schedule, etc. The fantasy sports information may be used to create a profile of each of a plurality of fantasy sports users. The database may be used with an interleaver or other association machine to determine which of a plurality of video clips of athletes should be sent to each of a plurality of users.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

A module may provide one or more functions, and may be configured in software executed by one or more processors (e.g., central processing units, graphics processing units, etc.), configured in hardware, such as an application specific integrated circuit (ASIC) or field programmable gate array (FPGA), or may be configured in a combination of software and hardware. A module defined in software may be a subroutine or a stand-alone application. In a data center or cloud environment, a module may be configured using an arbitrary number of servers or other processing devices. A module may be an arbitrary grouping of techniques and/or functionality, based on particular design goals or resource availability.

While various modules, services, devices, managers, etc., have been discussed, it should be realized that these examples are representative of more general techniques. Accordingly, the techniques and concepts discussed herein could be performed by other functional blocks in a manner that group functions and techniques differently. Accordingly, the structures, techniques and methods described herein are intended to be representative of a set of functions and may be performed using more, less or different modules, managers, methods, etc.

Additionally, a number of related topics are described herein. These topics may be performed individually, or grouped with others, as desired to achieve particular design goals.

What is claimed is:

1. A method comprising:
under control of one or more processors executing instructions stored in memory, performing operations comprising:
determining, by the one or more processors, athletes on a roster of a fantasy sports team of a user;
receiving video content of a game or sporting event, the video content of the game or sporting event depicting multiple athletes; and
identifying, the one or more processors, at least one athlete of interest that is:
on the roster of the fantasy sports team of the user; and
depicted in the video content of the game or sporting event;
causing, by the one or more processors, presentation of the video content of the game or sporting event on a display; and
causing, by the one or more processors, presentation, on the display, of a visual indicator associated with the at least one athlete of interest to indicate that the athlete of interest is on the roster of the fantasy sports team of the user, wherein the visual indicator is caused to be presented at or proximate to a location on the display at which the at least one athlete of interest is presented on the display, and wherein the visual indicator tracks the motion of the at least one athlete of interest, such that when the at least one athlete of interest moves on the display, the visual indicator moves with the at least one athlete of interest.

2. The method of claim 1, wherein the method is performed by a client device that is at a same location as the display.

3. The method of claim 1, wherein the method is performed by a computing device that is at a site remote from the display.

4. The method of claim 1, wherein the visual indicator comprises at least one of a halo, silhouette, shadow, arrow, helmet graphic, shoe graphic, or uniform graphic associated with the at least one athlete of interest.

5. The method of claim 1, further comprising:
receiving an input selecting the visual indicator associated with the at least one athlete of interest; and
causing presentation of a control usable to control playback of the video content.

6. The method of claim 5, wherein the control usable to control playback of the video content comprises:
an alternate camera angle control usable to select an alternate camera view of the events depicted in the video content,
a center control usable to center a displayed view on the at least one athlete of interest with which the visual indicator is associated; or
a skip control usable to skip to another portion of the video content depicting a play or event for which the at least one athlete of interest with which the visual indicator is associated was awarded or decremented fantasy points.

7. The method of claim 1, further comprising:
receiving an input selecting the visual indicator associated with the at least one athlete of interest; and
causing display of a fantasy roster of the user including the at least one athlete of interest with which the visual indicator is associated.

8. The method of claim 1, wherein identifying at least one athlete of interest that is on the roster of the fantasy sports team of the user comprises querying one or more fantasy sports services with which the user has an account.

9. The method of claim 1, wherein identifying at least one athlete of interest that is depicted in the video content of the game or sporting event comprises at least one of:
detecting one or more annotations in the video content identifying the at least one athlete of interest in the video content;
using image recognition or facial recognition to identify the at least one athlete of interest in the video content;
using optical character recognition to identify a name and/or number of the at least one athlete of interest in the video content;
reading a machine readable code identifying the at least one athlete of interest in the video content; or
receiving a human identification of the at least one athlete of interest in the video content.

10. The method of claim 1, further comprising:
determining that no athletes on the roster of the fantasy sports team of the user are currently depicted in the video content of the game or sporting event; and
tuning to video content of another game or sporting event that does depict one or more athletes on the roster of the fantasy sports team of the user.

11. A computing device, comprising:
one or more processors; and
memory communicatively coupled to the one or more processors, the memory storing instructions that, when executed by the one or more processors, cause the one or more processors to perform operations comprising:
receiving, by the one or more processors, video content of a game or sporting event, the video content of the game or sporting event depicting multiple athletes;
determining, by the one or more processors, athletes on a roster of a fantasy sports team of a user; and
identifying, by the one or more processors, at least one athlete of interest that is:
on the roster of the fantasy sports team of the user; and
depicted in the video content of the game or sporting event;
causing, by the one or more processors, presentation of the video content of the game or sporting event on a display; and
causing, by the one or more processors, presentation, on the display, of a visual indicator indicating a location of the at least one athlete of interest on the display to indicate that the athlete of interest is on the roster of the fantasy sports team of the user.

12. The computing device of claim 11, the operations further comprising:
determining that no athletes on the roster of the fantasy sports team of the user are currently depicted in the video content of the game or sporting event; and
tuning to video content of another game or sporting event that does depict one or more athletes on the roster of the fantasy sports team of the user.

13. The computing device of claim 11, wherein the visual indicator comprises at least one of a halo, silhouette, shadow, arrow, text, helmet graphic, shoe graphic, or uniform graphic associated with the athlete of interest.

14. The computing device of claim 11, wherein the visual indicator tracks the motion of the athlete of interest, such that when the athlete of interest moves on the display, the visual indicator moves with the athlete of interest.

15. The computing device of claim 11, wherein the identifying at least one athlete of interest that is on the roster of the fantasy sports team of the user comprises querying one or more fantasy sports services with which the user has an account.

16. The computing device of claim 11, wherein the identifying at least one athlete of interest that is depicted in the video content of the game or sporting event comprises detecting one or more annotations in the video content identifying the athletes depicted in the video content.

17. A computing device, comprising:
one or more processors; and
memory communicatively coupled to the one or more processors, the memory storing instructions that, when executed by the one or more processors, cause the one or more processors to perform operations comprising:
determining, by the one or more processors, athletes on a roster of a fantasy sports team of a user; and
tuning, by the one or more processors, to video content of a game or sporting event that depicts at least one athlete of interest that is on the roster of the fantasy sports team of the user;
causing, by the one or more processors, presentation of the video content of the game or sporting event on a display; and
causing, by the one or more processors, presentation, on the display, of a visual indicator associated with the at least one athlete of interest to indicate that the athlete of interest is on the roster of the fantasy sports team of the user and is depicted in the video content of the game or sporting event.

18. The computing device of claim 17, wherein the video content of the game or sporting event comprises a live broadcast.

19. The computing device of claim 17, wherein:

the visual indicator is caused to be presented at or proximate to a location on the display at which the at least one athlete of interest is presented on the display, and the visual indicator tracks the motion of the at least one athlete of interest, such that when the at least one athlete of interest moves on the display, the visual indicator moves with the at least one athlete of interest.

20. The computing device of claim 17, further comprising:

receiving an input selecting the visual indicator associated with the at least one athlete of interest; and causing presentation of a control usable to control playback of the video content.

21. The computing device of claim 17, wherein tuning to the video content of the game or sporting event that depicts one or more athletes on the roster of the fantasy sports team of the user is performed automatically based at least in part on the determining the athletes on the roster of the fantasy sports team of the user.

* * * * *